(12) United States Patent
Zheng et al.

(10) Patent No.: US 10,367,718 B2
(45) Date of Patent: *Jul. 30, 2019

(54) METHOD FOR ACQUIRING, BY SDN SWITCH, EXACT FLOW ENTRY, AND SDN SWITCH, CONTROLLER, AND SYSTEM

(71) Applicant: Huawei Technologies Co., Ltd., Shenzhen (CN)

(72) Inventors: Xiuli Zheng, Beijing (CN); Bailin Wen, Hangzhou (CN); Rong Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 29 days.

This patent is subject to a terminal disclaimer.

(21) Appl. No.: 15/681,659

(22) Filed: Aug. 21, 2017

(65) Prior Publication Data

US 2017/0346716 A1 Nov. 30, 2017

Related U.S. Application Data

(63) Continuation of application No. 15/137,963, filed on Apr. 25, 2016, now Pat. No. 9,742,656, which is a (Continued)

(30) Foreign Application Priority Data

Oct. 26, 2013 (CN) .......................... 2013 1 0514564

(51) Int. Cl.
*H04L 12/26* (2006.01)
*H04L 12/751* (2013.01)
(Continued)

(52) U.S. Cl.
CPC .............. *H04L 45/02* (2013.01); *H04L 45/26* (2013.01); *H04L 45/38* (2013.01); *H04L 45/42* (2013.01);
(Continued)

(58) Field of Classification Search
CPC ......... H04L 45/02; H04L 45/38; H04L 45/64; H04L 45/26; H04L 45/42; H04L 45/54; H04L 69/16
(Continued)

(56) References Cited

U.S. PATENT DOCUMENTS

| 8,942,085 B1* | 1/2015 | Pani .................. H04L 45/02 370/225 |
| 9,118,544 B2 | 8/2015 | Bajpay et al. |

(Continued)

FOREIGN PATENT DOCUMENTS

| CN | 102594689 A | 7/2012 |
| CN | 102710432 A | 10/2012 |

(Continued)

OTHER PUBLICATIONS

"Notes on in Band Controller Connection Design", Indigo Project, May 11, 2012, total 3 pages.

(Continued)

*Primary Examiner* — Thai D Hoang
(74) *Attorney, Agent, or Firm* — Kilpatrick Townsend & Stockton, LLP

(57) ABSTRACT

Embodiments disclose a method for acquiring, by a switch deployed in a software defined network (SDN), an exact flow entry, where the SDN network includes an SDN controller and multiple SDN switches, the SDN controller being configured to communicate with each SDN switch in an inband communication manner. The method includes establishing, by a first SDN switch, a reliable connection to the SDN controller, and sending a first control message based on a packet corresponding to a protocol for the reliable connection. Path information of the first SDN switch is added to the control message. Each SDN switch that receives the first control message adds path information of (Continued)

each SDN switch to the first control message, so that the SDN controller is provided with an entire path, so as to deliver a flow table to the first SDN switch.

21 Claims, 20 Drawing Sheets

Related U.S. Application Data continuation of application No. PCT/CN2014/086484, filed on Sep. 15, 2014.

(51) Int. Cl.
  *H04L 12/721* (2013.01)
  *H04L 12/715* (2013.01)
  *H04L 12/717* (2013.01)
  *H04L 12/741* (2013.01)
  *H04L 29/06* (2006.01)

(52) U.S. Cl.
  CPC .............. *H04L 45/54* (2013.01); *H04L 45/64* (2013.01); *H04L 69/16* (2013.01)

(58) Field of Classification Search
  USPC .................................. 370/352–356, 359–394
  See application file for complete search history.

(56) References Cited

U.S. PATENT DOCUMENTS

| | | | |
|---|---|---|---|
| 9,246,847 B2 | 1/2016 | Mishra et al. | |
| 2003/0189937 A1 | 10/2003 | Kawasaki | |
| 2011/0305168 A1 | 12/2011 | Koide | |
| 2012/0039338 A1 | 2/2012 | Morimoto | |
| 2012/0300615 A1 | 11/2012 | Kempf et al. | |
| 2013/0077481 A1 | 3/2013 | Philavong et al. | |
| 2013/0176888 A1 | 7/2013 | Kubota et al. | |
| 2013/0182581 A1 | 7/2013 | Yeung et al. | |
| 2014/0146664 A1* | 5/2014 | Amante | H04L 45/50 370/228 |
| 2014/0177634 A1 | 6/2014 | Jiang et al. | |
| 2014/0241247 A1* | 8/2014 | Kempf | H04L 12/4633 370/328 |
| 2014/0241345 A1* | 8/2014 | DeCusatis | H04L 49/25 370/355 |
| 2014/0241368 A1 | 8/2014 | Suzuki et al. | |
| 2014/0269708 A1 | 9/2014 | Zhu et al. | |
| 2015/0016456 A1* | 1/2015 | Ramanathan | H04L 45/72 370/392 |
| 2015/0016477 A1 | 1/2015 | Ogawa et al. | |
| 2015/0023150 A1* | 1/2015 | Chen | H04L 45/50 370/217 |
| 2015/0043383 A1* | 2/2015 | Farkas | H04L 45/22 370/254 |
| 2015/0043589 A1* | 2/2015 | Han | H04L 45/38 370/392 |
| 2015/0055654 A1* | 2/2015 | Song | H04L 45/34 370/392 |
| 2015/0063112 A1* | 3/2015 | Wu | H04L 45/302 370/235 |
| 2015/0071111 A1 | 3/2015 | Tao et al. | |
| 2015/0124625 A1* | 5/2015 | Aldrin | H04W 40/12 370/238 |
| 2015/0312142 A1* | 10/2015 | Barabash | H04L 45/42 370/400 |
| 2015/0334027 A1 | 11/2015 | Bosch et al. | |
| 2015/0334716 A1* | 11/2015 | Coffman | H04W 28/20 370/237 |
| 2016/0021028 A1 | 1/2016 | Koide | |
| 2017/0070423 A1* | 3/2017 | Lingafelt | H04L 45/38 |

FOREIGN PATENT DOCUMENTS

| | | | |
|---|---|---|---|
| CN | 103346922 A | 10/2013 | |
| EP | 3208977 A1 | 8/2017 | |
| JP | 2002325091 A | 11/2002 | |
| JP | 2003298613 A | 10/2003 | |
| KR | 20130052030 A | 5/2013 | |
| KR | 20170060102 A | 5/2017 | |
| WO | 2011080871 A1 | 7/2011 | |
| WO | 2011083785 A1 | 7/2011 | |
| WO | 2011083868 A1 | 7/2011 | |
| WO | 2012101692 A1 | 8/2012 | |
| WO | 2012164958 A1 | 12/2012 | |
| WO | 2013057960 A1 | 4/2013 | |
| WO | 2013078780 A1 | 6/2013 | |
| WO | 2013108761 A1 | 7/2013 | |
| WO | 2014136850 A1 | 9/2014 | |

OTHER PUBLICATIONS

Ryan Izard, "Welcome to OpenFlow Hub and Project Floodlight Documentation", Mar. 4, 2015, http://www.openflowhub.org/display/Indigo/In-Band+Management+for+Indigo, total 1 page.
Sachin Sharma et al., "A demonstration of automatic bootstrapping of resilient OpenFlow networks", Ghent University—iMinds, 2013 IFIP, 2013, total 2 pages.
Sachin Sharma et al., "Automatic bootstrapping of OpenFlow networks", Ghent University—iMinds, 2013, total 6 pages.
Sachin Sharma et al., "Fast failure recovery for in-band OpenFlow networks", Ghent University—iMinds, 2013, total 8 pages.
Kevin Benton et al., "OpenFlow Vulnerability Assessment", HotSDN'13, Aug. 16, 2013, total 2 pages.
"OpenFlow Switch Specification Version 1.2", Open Networking Foundation, Dec. 5, 2011, total 85 pages.
Koide, T. et al., "A consideration of unified topology discovery method of in-band control plane in OpenFlow-based networks," IEICE Technical Report, Mar. 2013. total 5 pages. English Abstract.
Koide, T. et al., "A study of the efficient construction mechanism of overlay control channels in OpenFlow-based networks," IEICE Technical Report, Jan. 2012. total 6 pages. English Abstract.
Detti, A. et al., "Wireless Mesh Software Defined Networks (wmSDN)," Wireless and Mobile Computing, Networking and Communications (WiMob), 2013 IEEE 9th International Conference on. IEEE, 2013.

\* cited by examiner

| | Match fields match fields | | | | | | | instructions instructions |
|---|---|---|---|---|---|---|---|---|
| | Switch Port | MAC Dst | MAC Src | IP Src | IP Dst | TCP Sport | TCP Dport | |
| Exact flow entry exact-match flow entry | 2 | 70-f3-98-0c-8a-1d | 70-86-2d-11-64-3f | 192.168.1.5 | 192.168.1.21 | 36653 | 6633 | 64 |
| | | | | ... | | | | |
| Wildcard-match flow entry wildcard-match flow entry | * | 70-f3-98-0c-8a-1d | * | * | 192.168.1.21 | 36653 | 6633 | 22 |
| | | | | ... | | | | |

FIG. 4

| | Switch Port | MAC Dst | MAC Src | IP Src | IP Dst | TCP Sport | TCP Dport | Instruction |
|---|---|---|---|---|---|---|---|---|
| Flow entry (51) | - | MAC_OFC | MAC_OFS5 | 192.168.1.9 | 192.168.1.21 | 36653 | 6633 | 52 |
| Flow entry (52) | 51 | MAC_OFC | MAC_OFS3 | 192.168.1.6 | 192.168.1.21 | 36653 | 6633 | 52 |
| Flow entry (53) | 51 | MAC_OFC | MAC_OFS1 | 192.168.1.5 | 192.168.1.21 | 36653 | 6633 | 52 |
| Flow entry (54) | 52 | MAC_OFS3 | MAC_OFC | 192.168.1.21 | 192.168.1.6 | 6633 | 36653 | 51 |
| Flow entry (55) | 52 | MAC_OFS1 | MAC_OFC | 192.168.1.21 | 192.168.1.5 | 6633 | 36653 | 51 |

| | Switch Port | MAC Dst | MAC Src | IP Src | IP Dst | TCP Sport | TCP Dport | Instruction |
|---|---|---|---|---|---|---|---|---|
| Flow entry (31) | - | MAC_OFC | MAC_OFS3 | 192.168.1.6 | 192.168.1.21 | 36653 | 6633 | 32 |
| Flow entry (32) | 31 | MAC_OFC | MAC_OFS1 | 192.168.1.5 | 192.168.1.21 | 36653 | 6633 | 32 |
| Flow entry (33) | 32 | MAC_OFS1 | MAC_OFC | 192.168.1.21 | 192.168.1.5 | 6633 | 36653 | 31 |

| | Switch Port | MAC Dst | MAC Src | IP Src | IP Dst | TCP Sport | TCP Dport | Instruction |
|---|---|---|---|---|---|---|---|---|
| Flow entry (11) | - | MAC_OFC | MAC_OFS1 | 192.168.1.5 | 192.168.1.21 | 36653 | 6633 | 11 |

FIG. 19

METHOD FOR ACQUIRING, BY SDN SWITCH, EXACT FLOW ENTRY, AND SDN SWITCH, CONTROLLER, AND SYSTEM

CROSS-REFERENCE TO RELATED APPLICATIONS

This application is a continuation of U.S. patent application Ser. No. 15/137,963, filed on Apr. 25, 2016, which is a continuation of International Application No. PCT/CN2014/086484, filed on Sep. 15, 2014. The International Application claims priority to Chinese Patent Application No. 201310514564.2, filed on Oct. 26, 2013. All of the aforementioned patent applications are hereby incorporated by reference in their entireties.

TECHNICAL FIELD

The present invention relates to the field of communications technologies, and in particular, to a method for acquiring, by a software defined network (SDN) switch, an exact flow entry, an SDN switch, an SDN controller, and an SDN system.

BACKGROUND

A software defined network (SDN) is a new network architecture, and is being increasingly studied and applied, and a current SDN is implemented mainly based on the OpenFlow (openflow) protocol. An SDN network based on the OpenFlow protocol is referred to as an OpenFlow network below, and the OpenFlow network includes an openflow controller (OFC) and an openflow switch (OFS). The OFS maintains a flow table (Flow Table) locally, where the flow table includes multiple flow entries. If a packet to be forwarded has a corresponding flow entry in the flow table, the packet is forwarded according to the flow table, and if there is no corresponding flow entry in the flow table, the OFS requests an instruction from the OFC, the OFC delivers a flow entry in the flow table to the OFS after receiving the request of the OFS, and the OFS obtains the delivered flow entry and then adds the flow entry to a flow table, so as to forward the packet according to a new flow table.

In an OpenFlow network, an OFS generally needs to acquire an initial flow table (that is, the OFS sends a request to an OFC, and the OFC delivers a flow entry after receiving the request), so that the OFS can forward a packet. In the prior art, generally, a flow table is acquired in a manner that a control plane is separated from a data plane.

Refer to FIG. 1, which is a schematic diagram of an architecture of an OpenFlow network in the prior art, which includes an OFC, a conventional switch, multiple OFSes (an OFS1 to an OFS6), where the conventional switch, the OFS1 to the OFS6, and the OFC form a control plane, and the OFS1 to the OFS6 and the OFC form a data plane. The OFS first initializes, in working mode of the conventional switch and based on a protocol such as the Link Layer Discovery Protocol (LLDP) or the Spanning Tree Protocol (STP), the control plane, that is, various OpenFlow control messages are forwarded by using a forwarding table generated by using a protocol such as the STP, after the control plane is initialized, the OFC may deliver an initial flow entry to the OFS by using the control plane, and the OFS receives the flow entry and then adds the flow entry to a flow table of the OFS, so as to acquire an initial flow table. Further, a packet is processed according to the flow table, and the packet is forwarded by using the data plane.

In the prior art, a control plane and a data plane are two different physical networks, and one or more conventional switches are further required, which increases hardware costs; in addition, two network management systems further need to be maintained for the two physical networks, which also increases maintenance costs.

SUMMARY

Embodiments of the present invention provide a method for acquiring, by a software defined network SDN switch, an exact flow entry, a corresponding SDN switch, an SDN controller, and an SDN system; the embodiments of the present invention further provide a method for forwarding, by an SDN switch, a packet, and an SDN switch corresponding to the method; and finally, the embodiments of the present invention further provide a method for collecting, by an OFS, path information, and an OFS corresponding to the method. The method for acquiring, by an SDN switch, an exact flow entry that is provided by the embodiments of the present invention is used to resolve a problem, existing in the prior art, that hardware costs and maintenance costs are high.

In a first implementation manner of a first aspect, an embodiment of the present invention discloses a method for acquiring, by a software defined network SDN switch, an exact flow entry, applied to a second SDN switch, where the second SDN switch is connected to a first SDN switch and an SDN controller, to form an SDN network, the SDN controller communicates with each SDN switch in an inband communication manner, and the method includes:

receiving a first control message sent by the first SDN switch and used for collecting path information, where the first control message carries path information of the first SDN switch, and the first control message is carried in a packet corresponding to a protocol used by a reliable connection established between the first SDN switch and the SDN controller;

adding path information of the second SDN switch to the first control message, to obtain an updated first control message; and forwarding, to the SDN controller, the updated first control message to which the path information of the second SDN switch is added, so that after receiving a finally updated first control message including the updated first control message, the SDN controller determines a routing path between the SDN controller and the first SDN switch according to path information added by each SDN switch to the finally updated first control message, and delivers an exact flow entry to the first SDN switch according to the routing path.

With reference to the first implementation manner of the first aspect, in a second possible implementation manner of the first aspect, the reliable connection established between the first SDN switch and the SDN controller includes a TCP connection, the packet corresponding to the protocol used by the reliable connection is a TCP/IP packet, and the TCP connection is established by forwarding, by the second SDN switch, a TCP/IP packet carrying information about three-way TCP handshake performed between the first SDN switch and the SDN controller.

With reference to the first implementation manner of the first aspect, in a third possible implementation manner of the first aspect, the second SDN switch stores an exact flow table, where the exact flow table includes multiple exact flow entries, and each exact flow entry includes multiple match fields and an instruction corresponding to the multiple match fields; and the forwarding, by the second SDN switch, a TCP/IP packet carrying a message of three-way TCP handshake performed between the first SDN switch and the SDN controller includes:

receiving, by the second SDN switch, a first TCP/IP packet sent from the first SDN switch;

acquiring multiple pieces of feature information in the received first TCP/IP packet, where the feature information corresponds to match fields in an exact flow entry in the exact flow table in the second SDN switch; and performing exact matching between the multiple pieces of feature information and the exact flow table in the second SDN switch, if the exact matching fails and it is determined that the received first TCP/IP packet carries a first type of TCP handshake message, performing wildcard-match matching between one or more pieces of feature information in the multiple pieces of feature information and the exact flow table, where a forwarding route determined by using an instruction corresponding to one or more match fields used during the wildcard-match matching is a route that can finally reach the SDN controller, and if the wildcard-match matching succeeds, processing, according to an instruction in an exact flow entry that succeeds in the wildcard-match matching, the received first TCP/IP packet that carries the first type of TCP handshake message, so as to forward the first TCP/IP packet to the SDN controller, where the first type of TCP handshake message is a message of first TCP handshake or a message of third TCP handshake.

With reference to the third implementation manner of the first aspect, in a fourth possible implementation manner of the first aspect, the forwarding, by the second SDN switch, a TCP/IP packet carrying a message of three-way TCP handshake performed between the first SDN switch and the SDN controller further includes:

receiving, by the second SDN switch, a third TCP/IP packet sent from the SDN controller, where the third TCP/IP packet carries a message of second handshake;

acquiring multiple pieces of feature information in the third TCP/IP packet, where the feature information corresponds to match fields in an exact flow entry in the exact flow table in the second SDN switch; and performing exact matching between the multiple pieces of feature information and the exact flow table in the second SDN switch, if the exact matching succeeds, performing forwarding according to an instruction in an exact flow entry that succeeds in the matching, and if the matching fails and it is determined that the third TCP/IP packet carries the message of second TCP handshake, broadcasting the third TCP/IP packet.

With reference to any implementation manner of the second implementation manner to the fourth implementation manner of the first aspect, in a fifth possible implementation manner of the first aspect, the second SDN switch stores the exact flow table, where the exact flow table includes multiple exact flow entries, and each exact flow entry includes multiple match fields and an instruction corresponding to the multiple match fields; and the receiving a first control message sent by the first SDN switch and used for collecting path information; adding path information of the second SDN switch to the first control message, to obtain an updated first control message; and forwarding, to the SDN controller, the updated first control message to which the path information of the second SDN switch is added include:

receiving, by the second SDN switch, a second TCP/IP packet sent from the first SDN switch and carrying the first control message, where the second TCP/IP packet includes multiple pieces of feature information, where the feature information corresponds to match fields in an exact flow entry in the exact flow table in the second SDN switch; and performing, by the second SDN switch, exact matching between the feature information in the second TCP/IP packet and the exact flow table, after the exact matching fails and it is determined that the received second TCP/IP packet carries the first control message, performing wildcard-match matching according to one or more pieces of feature information in the TCP/IP packet and the exact flow table, where a forwarding route determined by using an instruction corresponding to one or more match fields used during the wildcard-match matching is a route that can finally reach the SDN controller, and if the wildcard-match matching succeeds, adding the path information of the second SDN switch to the first control message, to obtain the updated first control message to which the path information of the second SDN switch is added, and forwarding the updated first control message to the SDN controller according to an instruction in an exact flow entry that succeeds in the wildcard-match matching.

With reference to the fifth implementation manner of the first aspect, in a sixth possible implementation manner of the first aspect, if the wildcard-match matching fails, an available output port of the second SDN switch is acquired, the path information, of the second SDN switch, corresponding to each available output port is added to the first control message, and the updated first control message to which the path information, of the second SDN switch, corresponding to each available output port is added is forwarded to the SDN controller from the available output port.

With reference to any one of the third to the sixth implementation manners of the first aspect, in a seventh possible implementation manner of the first aspect, the feature information includes: destination MAC, a destination IP, and a destination port number; match fields, used for wildcard-match matching, in a flow entry in the exact flow table are: destination MAC, a destination IP, and a destination port number; and the performing wildcard-match matching between one or more pieces of feature information in the multiple pieces of feature information and the exact flow table, and if the wildcard-match matching succeeds, processing, according to an instruction in an exact flow entry that succeeds in the wildcard-match matching, the received first TCP/IP packet that carries the first type of TCP handshake message includes:

performing matching between destination MAC, a destination IP, and a destination port number in the multiple pieces of feature information and destination MAC, a destination IP, and a destination port number in a flow entry, and if the matching succeeds, processing the received first TCP/IP packet according to an instruction in an exact flow entry that succeeds in the matching.

With reference to any one of the first to the seventh implementation manners of the first aspect, in an eighth possible implementation manner of the first aspect, the SDN network is implemented based on the OpenFlow protocol, the first control message includes an OFPT_HELLO message defined in the OpenFlow protocol, and a body field of the OFPT_HELLO message is used for carrying the path information after being extended;

the adding path information of the second SDN switch to the first control message, to obtain an updated first control message includes:

adding the path information of the second SDN switch to the extended body field, used for carrying the path information, in the OFPT_HELLO message, to obtain an updated OFPT_HELLO message; and the forwarding, to the SDN controller, the updated first control message to which the path information of the second SDN switch is added, so that after receiving a finally updated first control message including the updated first control message, the SDN controller determines a routing path between the SDN controller and the first SDN switch according to path information added by each SDN switch to the finally updated first control message, and delivers an exact flow entry to the first SDN switch according to the routing path includes:

forwarding, to the SDN controller, the updated OFPT_HELLO message to which the path information of the second SDN switch is added, so that after receiving a finally updated OFPT_HELLO message including the updated OFPT_HELLO message, the SDN controller determines, according to the path information added by each SDN switch to the finally updated OFPT_HELLO message, the routing path between the SDN controller and the first SDN switch, and delivers an exact flow entry to the first SDN switch according to the routing path.

With reference to any one of the first to the eighth implementation manners of the first aspect, in a ninth possible implementation manner of the first aspect, the forwarding, to the SDN controller, the updated first control message to which the path information of the second SDN switch is added includes:

directly forwarding, to the SDN controller, the updated first control message to which the path information of the second SDN switch is added, where the finally updated first control message is the updated first control message; or, indirectly forwarding, to the SDN controller by using one or more other SDN switches, the updated first control message to which the path information of the second SDN switch is added, where the finally updated first control message is a first control message that is finally sent by each of the other SDN switches to the SDN controller after each of the other SDN switches receives a first control message sent by a previous SDN switch and adds path information of each of the other SDN switches to the first control message.

With reference to any one of the first to the ninth implementation manners of the first aspect, in a tenth possible implementation manner of the first aspect, the SDN network is implemented based on the OpenFlow protocol, and the method further includes:

receiving an OFPT_FLOW_MOD message sent from the SDN controller and defined in the OpenFlow protocol, where the OFPT_FLOW_MOD message carries multiple exact flow entries required by a destination SDN switch; and when it is determined that the received message is an OFPT_FLOW_MOD message sent to the second SDN switch, extracting the multiple exact flow entries carried in the OFPT_FLOW_MOD message and then adding the multiple exact flow entries to a local exact flow table.

With reference to any one of the first to the ninth implementation manners of the first aspect, in an eleventh possible implementation manner of the first aspect, the SDN network is implemented based on the OpenFlow protocol, and the method further includes:

receiving an OFPT_FLOW_MOD message sent from the SDN controller and defined in the OpenFlow protocol, where the OFPT_FLOW_MOD message carries multiple exact flow entries required by multiple SDN switches located on the routing path and path information corresponding to each SDN switch on the routing path, where each SDN switch on the routing path uses one or more exact flow entries; and when it is determined that the received message is an OFPT_FLOW_MOD message sent to the second SDN switch, extracting, according to the path information corresponding to the second SDN switch, one or more exact flow entries that need to be used by the second SDN switch, and forwarding the OFPT_FLOW_MOD message after the extraction is completed to a next node on the routing path.

With reference to any one of the first to the eleventh implementation manners of the first aspect, in a twelfth possible implementation manner of the first aspect, the path information includes: an ID of an SDN switch that sends or receives the first control message, a port number used for receiving the first control message, and a port number used for sending the first control message.

In a first implementation form of a second aspect, an embodiment of the present invention discloses a method for acquiring, by a software defined network SDN switch, a flow table, applied to an SDN controller, where the SDN controller is connected to a second SDN switch, the second SDN switch is connected to a first SDN switch, to form an SDN network, the SDN controller communicates with each SDN switch in an inband communication manner, and the method includes:

receiving a finally updated first control message forwarded by the second SDN switch, where the finally updated first control message includes an updated first control message, the updated first control message is obtained by adding, by the second SDN switch after the second SDN switch receives a first control message sent by the first SDN switch and used for collecting path information, path information of the second SDN switch to the first control message, the first control message carries path information of the first SDN switch, and the first control information is carried in a packet corresponding to a protocol used by a reliable connection established between the first SDN switch and the SDN controller;

acquiring a routing path between the SDN controller and the first SDN switch according to path information added by each SDN switch and carried in the finally updated first control message; and delivering an exact flow entry to the first SDN switch according to the routing path.

With reference to the first implementation manner of the second aspect, in a second possible implementation manner of the second aspect, the reliable connection established between the first SDN switch and the SDN controller includes a TCP connection, the packet corresponding to the protocol used by the reliable connection is a TCP/IP packet, and the TCP connection is established by forwarding, by the second SDN switch, a TCP/IP packet carrying a message of three-way TCP handshake performed between the first SDN switch and the SDN controller.

With reference to either one of the first to the second implementation manners of the second aspect, in a third possible implementation manner of the second aspect, the SDN network is implemented based on the OpenFlow protocol, the first control message includes an OFPT_HELLO message defined in the OpenFlow protocol, and a body field of the OFPT_HELLO message is used for carrying the path information after being extended.

With reference to any one of the first to the third implementation manners of the second aspect, in a fourth possible implementation manner of the second aspect, the receiving a finally updated first control message forwarded by the second SDN switch includes:

directly receiving the finally updated first control message forwarded by the second SDN switch, where the finally updated first control message is the updated first control message;

or, for the updated first control message to which the path information of the second SDN switch is added, indirectly receiving, by using one or more other SDN switches, the finally updated first control message forwarded by the second SDN switch, where the finally updated first control message is a first control message that is finally sent by each of the other SDN switches to the SDN controller after each of the other SDN switches receives a first control message sent by a previous SDN switch and adds path information of each of the other SDN switches to the first control message.

With reference to any one of the first to the fourth implementation manners of the second aspect, in a fifth possible implementation manner of the second aspect, the SDN network is implemented based on the OpenFlow protocol, and the delivering an exact flow entry to the first SDN switch according to the routing path includes:

adding multiple exact flow entries required by the first SDN switch to an OFPT_FLOW_MOD message defined in the OpenFlow protocol; and sending the OFPT_FLOW_MOD message to the first SDN switch according to the routing path, so that after receiving the OFPT_FLOW_MOD message, the first SDN switch extracts the multiple exact flow entries carried in the OFPT_FLOW_MOD message and then adds the multiple exact flow entries to a local exact flow table.

With reference to any one of the first to the fifth implementation manners of the second aspect, in a sixth possible implementation manner of the second aspect, the SDN network is implemented based on the OpenFlow protocol, and the delivering an exact flow entry to the first SDN switch according to the routing path includes:

adding multiple exact flow entries required by multiple SDN switches located on the routing path and path information corresponding to each SDN switch on the routing path to an OFPT_FLOW_MOD message defined in the OpenFlow protocol, where each SDN switch on the routing path needs one or more exact flow entries; and delivering the OFPT_FLOW_MOD message to the other SDN switch according to the routing path, so that after receiving the OFPT_FLOW_MOD message, the other SDN switch extracts, according to the path information and the path information in the OFPT_FLOW_MOD message, an exact flow entry required by the other SDN switch, forwards a remaining exact flow entry, and finally forwards an exact flow entry required by the first SDN switch to the first SDN switch.

In a first implementation manner of a third aspect, an embodiment of the present invention discloses a software defined network SDN switch, where the SDN switch is a second SDN switch, the second SDN switch is connected to a first SDN switch and an SDN controller, to form an SDN network, the SDN controller communicates with each SDN switch in an inband communication manner, and the second SDN switch includes:

a connection establishment unit, configured to perform message exchange between the first SDN switch and the SDN controller, so that a reliable connection is established between the first SDN switch and the SDN controller;

a first receiving unit, configured to receive a first control message sent by the first SDN switch and used for collecting path information, where the first control message carries path information of the first SDN switch, and the first control information is carried in a packet corresponding to a protocol used by the reliable connection;

a path adding unit, add path information of the second SDN switch to the first control message received by the first receiving unit, to obtain an updated first control message; and a forwarding unit, configured to forward, to the SDN controller, the updated first control message to which the path adding unit adds the path information of the second SDN switch, so that after receiving a finally updated first control message including the updated first control message, the SDN controller determines a routing path between the SDN controller and the first SDN switch according to path information added by each SDN switch to the finally updated first control message, and delivers an exact flow entry to the first SDN switch according to the routing path.

With reference to the first implementation manner of the third aspect, in a second possible implementation manner of the third aspect, the reliable connection established between the first SDN switch and the SDN controller includes a TCP connection, and the packet corresponding to the protocol used by the reliable connection is a TCP/IP packet; and the connection establishment unit is specifically configured to forward a TCP/IP packet carrying a message of three-way TCP handshake performed between the first SDN switch and the SDN controller, so that a TCP connection is established between the first SDN switch and the SDN controller.

With reference to the second implementation manner of the third aspect, in a third possible implementation manner of the third aspect, the second SDN switch includes an exact flow table, where the exact flow table includes multiple exact flow entries, and each exact flow entry includes multiple match fields and an instruction corresponding to the multiple match fields; and the connection establishment unit includes:

a receiving subunit, configured to receive a first TCP/IP packet sent from the first SDN switch;

a feature information acquiring subunit, configured to acquire multiple pieces of feature information in the first TCP/IP packet received by the receiving subunit, where the feature information corresponds to match fields in an exact flow entry in the exact flow table in the second SDN switch; and a first matching subunit, configured to perform exact matching between the multiple pieces of feature information in the first TCP/IP packet that are acquired by the feature information acquiring subunit and the exact flow table in the second SDN switch, if the exact matching fails and it is determined that the received first TCP/IP packet carries a first type of TCP handshake message, perform wildcard-match matching between one or more pieces of feature information in the multiple pieces of feature information and the exact flow table, where a forwarding route determined by using an instruction corresponding to one or more match fields used during the wildcard-match matching is a route that can finally reach the SDN controller, and if the wildcard-match matching succeeds, process, according to an instruction in an exact flow entry that succeeds in the wildcard-match matching, the received first TCP/IP packet that carries the first type of TCP handshake message, so as to forward the first TCP/IP packet to the SDN controller, where the first type of TCP handshake message is a message of first TCP handshake or a message of third TCP handshake.

With reference to the third implementation manner of the third aspect, in a fourth possible implementation manner of the third aspect, the receiving subunit is further configured to receive a third TCP/IP packet sent from the SDN controller, where the third TCP/IP packet carries a message of second handshake;

the feature information acquiring subunit is further configured to acquire multiple pieces of feature information in the third TCP/IP packet received by the receiving subunit, where the feature information corresponds to match fields in an exact flow entry in the exact flow table in the second SDN switch; and the first matching subunit is further configured to perform exact matching between the multiple pieces of feature information in the third TCP/IP packet that are acquired by the feature information acquiring subunit and the exact flow table in the second SDN switch, if the exact matching succeeds, perform forwarding according to an instruction in an exact flow entry that succeeds in the matching, and if the matching fails and it is determined that the third TCP/IP packet carries the message of second TCP handshake, broadcast the third TCP/IP packet.

With reference to any one of the first to the fourth implementation manners of the third aspect, in a fifth possible implementation manner of the third aspect, the second SDN switch stores the exact flow table, where the exact flow table includes multiple exact flow entries, and each exact flow entry includes multiple match fields and an instruction corresponding to the multiple match fields;

the first receiving unit is specifically configured to:

receive a second TCP/IP packet sent from the first SDN switch and carrying the first control message, where the second TCP/IP packet includes multiple pieces of feature information, where the feature information corresponds to match fields in an exact flow entry in the exact flow table in the second SDN switch; and the path adding unit includes:

a second matching subunit, configured to perform exact matching according to the feature information in the second TCP/IP packet received by a second receiving subunit and the exact flow table, and after the exact matching fails and it is determined that the received second TCP/IP packet carries the first control message, perform wildcard-match matching according to one or more pieces of feature information in the TCP/IP packet and the exact flow table, where a forwarding route determined by using an instruction corresponding to one or more match fields used during the wildcard-match matching is a route that can finally reach the SDN controller; and an adding subunit, configured to: when the wildcard-match matching of the second matching subunit succeeds, add the path information of the second SDN switch to the first control message, to obtain the updated first control message to which the path information of the second SDN switch is added; and the forwarding unit includes a first forwarding subunit, configured to forward the updated first control message obtained after processing of the adding subunit to the SDN controller according to an instruction in an exact flow entry that succeeds in the wildcard-match matching.

With reference to the fifth possible implementation manner of the third aspect, in a sixth possible implementation manner of the third aspect, the adding subunit is further configured to: if the wildcard-match matching of the second matching subunit fails, acquire an available output port of the second SDN switch, and add the path information, of the second SDN switch, corresponding to each available output port to the first control message; and the forwarding unit further includes a second forwarding subunit, configured to forward, to the SDN controller from the available output port, the updated first control message to which the adding subunit adds the path information, of the second SDN switch, corresponding to each available output port.

With reference to any one of the first to the sixth implementation manners of the third aspect, in a seventh possible implementation manner of the third aspect, the SDN network is implemented based on the OpenFlow protocol, the first control message includes an OFPT_HELLO message defined in the OpenFlow protocol, and a body field of the OFPT_HELLO message is used for carrying the path information after being extended;

the first receiving unit is specifically configured to receive, by using the reliable connection established by the connection establishment unit, the OFPT_HELLO message sent by the first SDN switch and used for collecting the path information, where the extended body field, used for carrying the path information, in the OFPT_HELLO message carries the path information of the first SDN switch;

the path adding unit is specifically configured to add the path information of the second SDN switch to the extended body field, used for carrying the path information, in the OFPT_HELLO message received by the first receiving unit, to obtain an updated OFPT_HELLO message; and the forwarding unit is specifically configured to forward, to the SDN controller, the updated OFPT_HELLO message to which the path adding unit adds the path information of the second SDN switch, so that after receiving a finally updated OFPT_HELLO message including the updated OFPT_HELLO message, the SDN controller determines, according to the path information added by each SDN switch to the finally updated OFPT_HELLO message, the routing path between the SDN controller and the first SDN switch, and delivers an exact flow entry to the first SDN switch according to the routing path.

With reference to any one of the first to the seventh implementation manners of the third aspect, in an eighth possible implementation manner of the third aspect, the forwarding unit is specifically configured to directly forward, to the SDN controller, the updated first control message to which the path information of the second SDN switch is added, where the finally updated first control message is the updated first control message; or, indirectly forward, to the SDN controller by using one or more other SDN switches, the updated first control message to which the path information of the second SDN switch is added, where the finally updated first control message is a first control message that is finally sent by each of the other SDN switches to the SDN controller after each of the other SDN switches receives a first control message sent by a previous SDN switch and adds path information of each of the other SDN switches to the first control message.

With reference to any one of the first to the eighth implementation manners of the third aspect, in a ninth possible implementation manner of the third aspect, the SDN network is implemented based on the OpenFlow protocol, and the SDN switch further includes:

a second receiving unit, configured to receive an OFPT_FLOW_MOD message sent from the SDN controller and defined in the OpenFlow protocol, where the OFPT_FLOW_MOD message carries multiple exact flow entries required by a destination SDN switch; and a first flow entry processing unit, configured to: when it is determined that the message received by the second receiving unit is an OFPT_FLOW_MOD message sent to the second SDN switch, extract the multiple exact flow entries carried in the OFPT_FLOW_MOD message and then add the multiple exact flow entries to a local exact flow table.

With reference to any one of the first to the eighth implementation manners of the third aspect, in a tenth possible implementation manner of the third aspect, the SDN network is implemented based on the OpenFlow protocol, and the SDN switch further includes:

a third receiving unit, configured to receive an OFPT_FLOW_MOD message sent from the SDN controller and defined in the OpenFlow protocol, where the OFPT_FLOW_MOD message carries multiple exact flow entries required by multiple SDN switches located on the routing path and path information corresponding to each SDN switch on the routing path, where each SDN switch on the routing path uses one or more exact flow entries; and a second flow entry processing unit, configured to: when it is determined that the message received by the third receiving unit is an OFPT_FLOW_MOD message sent to the second SDN switch, extract, according to the path information corresponding to the second SDN switch, one or more exact flow entries that need to be used by the second SDN switch, and forward the OFPT_FLOW_MOD message after the extraction is completed to a next node on the routing path.

With reference to any one of the first to the tenth implementation manners of the third aspect, in an eleventh possible implementation manner of the third aspect, the path information includes: an ID of an SDN switch that sends or receives the first control message, a port number used for receiving the first control message, and a port number used for sending the first control message.

In a first implementation manner of a fourth aspect, an embodiment of the present invention discloses a software defined network SDN controller, where the SDN controller is connected to a second SDN switch, the second SDN switch is connected to a first SDN switch, to form an SDN network, the SDN controller communicates with each SDN switch in an inband communication manner, and the SDN controller includes:

a first receiving unit, configured to receive a finally updated first control message forwarded by the second SDN switch, where the finally updated first control message includes an updated first control message, the updated first control message is obtained by adding, by the second SDN switch after the second SDN switch receives a first control message sent by the first SDN switch and used for collecting path information, path information of the second SDN switch to the first control message, the first control message carries path information of the first SDN switch, and the first control information is carried in a packet corresponding to a protocol used by a reliable connection established between the first SDN switch and the SDN controller;

a path acquiring unit, configured to acquire a routing path between the SDN controller and the first SDN switch according to path information added by each SDN switch and carried in the finally updated first control message received by the first receiving unit; and a flow table delivering unit, configured to deliver an exact flow entry to the first SDN switch through the routing path acquired by the path acquiring unit.

With reference to the first implementation manner of the fourth aspect, in a second possible implementation manner of the fourth aspect, the reliable connection established between the first SDN switch and the SDN controller includes a TCP connection, the packet corresponding to the protocol used by the reliable connection is a TCP/IP packet, and the TCP connection is established by forwarding, by the second SDN switch, a TCP/IP packet carrying a message of three-way TCP handshake performed between the first SDN switch and the SDN controller.

With reference to either one of the first to the second implementation manners of the fourth aspect, in a third possible implementation manner of the fourth aspect, the SDN network is implemented based on the OpenFlow protocol, the first control message includes an OFPT_HELLO message, and a body field of the OFPT_HELLO message is used for carrying the path information after being extended.

With reference to any one of the first to the third implementation manners of the fourth aspect, in a fourth possible implementation manner of the fourth aspect, the first receiving unit is specifically configured to:

directly receive the finally updated first control message forwarded by the second SDN switch, where the finally updated first control message is the updated first control message;

or, indirectly receive, by using one or more other SDN switches, the finally updated first control message forwarded by the second SDN switch, where the finally updated first control message is a first control message that is finally sent by each of the other SDN switches to the SDN controller after each of the other SDN switches receives a first control message sent by a previous SDN switch and adds path information of each of the other SDN switches to the first control message.

With reference to any one of the first to the fourth implementation manners of the fourth aspect, in a fifth possible implementation manner of the fourth aspect, the SDN network is implemented based on the OpenFlow protocol, and the flow table delivering unit is specifically configured to:

add an exact flow entry required by the first SDN switch to an OFPT_FLOW_MOD message defined in the Open-Flow protocol; and send the OFPT_FLOW_MOD message to the first SDN switch through the routing path, so that the first SDN switch acquires an exact flow entry according to the OFPT_FLOW_MOD message.

With reference to any one of the first to the fourth implementation manners of the fourth aspect, in a sixth possible implementation manner of the fourth aspect, the flow table delivering unit is specifically configured to:

add multiple exact flow entries required by multiple SDN switches located on the routing path and path information corresponding to each SDN switch on the routing path to an OFPT_FLOW_MOD message defined in the OpenFlow protocol, where each SDN switch on the routing path needs one or more exact flow entries; and deliver the OFPT_FLOW_MOD message to the other SDN switch through the routing path, so that after receiving the OFPT_FLOW_MOD message, the other SDN switch extracts, according to the path information and the path information in the OFPT_FLOW_MOD message, an exact flow entry required by the other SDN switch, forwards a remaining exact flow entry, and finally forwards an exact flow entry required by the first SDN switch to the first SDN switch.

In a first implementation manner of a fifth aspect, an embodiment of the present invention discloses a software defined network system, including: a first SDN switch, a second SDN switch, and an SDN controller, where the second SDN switch is connected to the first SDN switch and the SDN controller, to form an SDN network, and the SDN controller communicates with each SDN switch in an inband communication manner;

the first SDN switch is configured to send a first control message used for collecting path information to the second SDN switch, where the first control message carries path information of the first SDN switch, and the first control information is carried in a packet corresponding to a protocol used by a reliable connection established between the first SDN switch and the SDN controller;

the second SDN switch is configured to receive the first control message, add path information of the second SDN switch to the first control message, to obtain an updated first control message, and forward, to the SDN controller, the updated first control message to which the path information of the second SDN switch is added; and the SDN controller is configured to receive a finally updated first control message sent by the second SDN switch and including the updated first control message, determine a routing path between the SDN controller and the first SDN switch according to path information added by each SDN switch to the finally updated first control message, and deliver an exact flow entry to the first SDN switch according to the routing path.

With reference to the first implementation manner of the fifth aspect, in a second possible implementation manner of the fifth aspect, the reliable connection established between the first SDN switch and the SDN controller includes a TCP connection, the packet corresponding to the protocol used by the reliable connection is a TCP/IP packet, and the TCP connection is established by forwarding, by the second SDN switch, a TCP/IP packet carrying a message of three-way TCP handshake performed between the first SDN switch and the SDN controller.

With reference to the second implementation manner of the fifth aspect, in a third possible implementation manner of the fifth aspect, the second SDN switch stores an exact flow table, where the exact flow table includes multiple exact flow entries, and each exact flow entry includes multiple match fields and an instruction corresponding to the multiple match fields; and the second SDN switch is specifically configured to receive a first TCP/IP packet sent from the first SDN switch; acquire multiple pieces of feature information in the received first TCP/IP packet, where the feature information corresponds to match fields in an exact flow entry in the exact flow table in the second SDN switch; and perform exact matching between the multiple pieces of feature information and the exact flow table in the second SDN switch, if the exact matching fails and it is determined that the received first TCP/IP packet carries a first type of TCP handshake message, perform wildcard-match matching between one or more pieces of feature information in the multiple pieces of feature information and the exact flow table, where a forwarding route determined by using an instruction corresponding to one or more match fields used during the wildcard-match matching is a route that can finally reach the SDN controller, and if the wildcard-match matching succeeds, process, according to an instruction in an exact flow entry that succeeds in the wildcard-match matching, the received first TCP/IP packet that carries the first type of TCP handshake message, so as to forward the first TCP/IP packet to the SDN controller, where the first type of TCP handshake message is a message of first TCP handshake or a message of third TCP handshake, so as to implement an exchange, of a message used for establishing the reliable connection, between the first SDN switch, the other OFS, and the SDN controller, to establish the reliable connection.

With reference to either one of the second to the third implementation manner of the fifth aspect, in a fourth possible implementation manner of the fifth aspect, the second SDN switch stores the exact flow table, where the exact flow table includes multiple exact flow entries, and each exact flow entry includes multiple match fields and an instruction corresponding to the multiple match fields;

the second SDN switch is specifically configured to receive a second TCP/IP packet sent from the first SDN switch and carrying the first control message, where the second TCP/IP packet includes multiple pieces of feature information, where the feature information corresponds to match fields in an exact flow entry in the exact flow table in the second SDN switch; and perform exact matching according to the feature information in the second TCP/IP packet and the exact flow table, after the exact matching fails and it is determined that the received second TCP/IP packet carries the first control message, perform wildcard-match matching according to one or more pieces of feature information in the TCP/IP packet and the exact flow table, where a forwarding route determined by using an instruction corresponding to one or more match fields used during the wildcard-match matching is a route that can finally reach the SDN controller, and if the wildcard-match matching succeeds, add the path information of the second SDN switch to the first control message, to obtain the updated first control message to which the path information of the second SDN switch is added, and forward the updated first control message to the SDN controller according to an instruction in an exact flow entry that succeeds in the wildcard-match matching.

With reference to any one of the first to the fourth implementation manners of the fifth aspect, in a fifth possible implementation manner of the fifth aspect, the SDN network is implemented based on the OpenFlow protocol, the first control message includes an OFPT_HELLO message defined in the OpenFlow protocol, and a body field of the OFPT_HELLO message is used for carrying the path information after being extended.

With reference to any one of the first to the fifth implementation manners of the fifth aspect, in a sixth possible implementation manner of the fifth aspect, the second SDN switch is specifically configured to:

directly forward, to the SDN controller, the updated first control message to which the path information of the second SDN switch is added, where the finally updated first control message is the updated first control message; or, indirectly forward, to the SDN controller by using one or more other SDN switches, the updated first control message to which the path information of the second SDN switch is added, where the finally updated first control message is a first control message that is finally sent by each of the other SDN switches to the SDN controller after each of the other SDN switches receives a first control message sent by a previous SDN switch and adds path information of each of the other SDN switches to the first control message.

With reference to any one of the first to the sixth implementation manners of the fifth aspect, in a seventh possible implementation manner of the fifth aspect, the SDN network is implemented based on the OpenFlow protocol, and the second SDN switch is further configured to:

receive an OFPT_FLOW_MOD message sent from the SDN controller and defined in the OpenFlow protocol, where the OFPT_FLOW_MOD message carries multiple exact flow entries required by a destination SDN switch; and when it is determined that the received message is an OFPT_FLOW_MOD message sent to the second SDN switch, extract the multiple exact flow entries carried in the OFPT_FLOW_MOD message and then add the multiple exact flow entries to a local exact flow table.

With reference to any one of the first to the sixth implementation manners of the fifth aspect, in an eighth possible implementation manner of the fifth aspect, the SDN network is implemented based on the OpenFlow protocol, and the second SDN switch is further configured to:

receive an OFPT_FLOW_MOD message sent from the SDN controller and defined in the OpenFlow protocol, where the OFPT_FLOW_MOD message carries multiple exact flow entries required by multiple SDN switches located on the routing path and path information corresponding to each SDN switch on the routing path, where each SDN switch on the routing path uses one or more exact flow entries; and when it is determined that the received message is an OFPT_FLOW_MOD message sent to the second SDN switch, extract, according to the path information corresponding to the second SDN switch, one or more exact flow entries that need to be used by the second SDN switch, and forward the OFPT_FLOW_MOD message after the extraction is completed to a next node on the routing path.

With reference to any one of the first to the eighth implementation manners of the fifth aspect, in a ninth possible implementation manner of the fifth aspect, the path information includes: an ID of an SDN switch that sends or receives the first control message, a port number used for receiving the first control message, and a port number used for sending the first control message.

In a first implementation manner of a sixth aspect, an embodiment of the present invention discloses a method for forwarding, by a software defined network SDN switch, a packet, where the SDN switch is a second SDN switch, the second SDN switch stores an exact flow table, where the exact flow table includes at least one exact flow entry, and each exact flow entry includes multiple match fields and an instruction corresponding to the multiple match fields, and the method includes:

receiving a packet sent from a first SDN switch, where the packet includes multiple pieces of feature information, where the feature information corresponds to match fields in the exact flow entry;

acquiring the feature information in the packet; and performing exact matching between the feature information and an exact flow entry in the exact flow table, if the exact matching fails, performing wildcard-match matching between one or more features in the multiple pieces of feature information and an exact flow entry in the exact flow table, where a forwarding route determined by using an instruction corresponding to one or more match fields used during the wildcard-match matching is a route that can finally reach an SDN controller, and if the wildcard-match matching succeeds, forwarding the packet according to an instruction in an exact flow entry that succeeds in the wildcard-match matching.

With reference to the first implementation manner of the sixth aspect, in a second possible implementation manner of the sixth aspect, if the exact matching succeeds, forwarding is performed according to an instruction in an exact flow entry that succeeds in the matching; and if the wildcard-match matching fails, the received packet is forwarded through broadcasting.

With reference to either one of the first to the second implementation manners of the sixth aspect, in a third possible implementation manner of the sixth aspect, the second SDN switch is connected to the first SDN switch and the SDN controller, to form an SDN network, and the SDN controller communicates with each SDN switch in an inband communication manner.

With reference to any one of the first to the third implementation manners of the sixth aspect, in a fourth possible implementation manner of the sixth aspect, the packet is a packet corresponding to a protocol used by a reliable connection established between the first SDN switch and the SDN controller, and the packet is used for carrying a first control message sent by the first SDN switch and used for collecting path information.

In a first implementation manner of a seventh aspect, an embodiment of the present invention discloses a software defined network SDN switch, where the SDN switch is a second SDN switch, the second SDN switch stores an exact flow table, where the exact flow table includes multiple exact flow entries, and each exact flow entry includes multiple match fields and an instruction corresponding to the multiple match fields, and the second SDN switch includes:

a receiving unit, configured to receive a packet sent from a first SDN switch, where the packet includes one or more pieces of feature information;

an acquiring unit, configured to acquire the feature information in the packet received by the receiving unit;

an exact matching unit, configured to perform exact matching between the one or more pieces of feature information acquired by the acquiring unit and an exact flow entry in the exact flow table, where the one or more pieces of feature information correspond to a match field in the exact flow entry in the exact flow table;

a wildcard-match matching unit, configured to: if the exact matching performed by the exact matching unit fails, perform wildcard-match matching between one or more features in the multiple pieces of feature information and an exact flow entry in the exact flow table, where a forwarding route determined by using an instruction corresponding to one or more match fields used during the wildcard-match matching is a route that can finally reach the SDN controller; and a forwarding unit, configured to: if the wildcard-match matching performed by the wildcard-match matching unit succeeds, forward the packet according to an instruction in an exact flow entry that succeeds in the matching.

With reference to the first implementation manner of the seventh aspect, in a second possible implementation manner of the seventh aspect, the matching and forwarding unit is further configured to:

if the exact matching succeeds, perform forwarding according to an instruction in an exact flow entry that succeeds in the matching; and if the wildcard-match matching fails, perform forwarding through broadcasting.

With reference to either one of the first to the second implementation manners of the seventh aspect, in a third possible implementation manner of the seventh aspect, the second SDN switch is connected to the first SDN switch and the SDN controller, to form an SDN network, and the SDN controller communicates with each SDN switch in an inband communication manner.

With reference to any one of the first to the third implementation manners of the seventh aspect, in a fourth possible implementation manner of the seventh aspect, the packet is a packet corresponding to a protocol used by a reliable connection established between the first SDN switch and the SDN controller, and the packet is used for carrying a first control message sent by the first SDN switch and used for collecting path information.

In a first implementation manner of an eighth aspect, an embodiment of the present invention discloses a method for collecting, by an openflow switch OpenFlow Switch OFS, path information, applied to a second OFS, where the second OFS is connected to a first OFS and an openflow controller OpenFlow Controller OFC, to form an OpenFlow network, the OFC communicates with each OFS in an inband communication manner, and the method includes:

receiving an OFPT_HELLO message sent by the first OFS, used for collecting path information, and defined in the OpenFlow protocol, where a body field of the OFPT_HELLO message is used for carrying the path information after being extended, the OFPT_HELLO message carries path information of the first OFS, and the OFPT_HELLO message is carried in a packet corresponding to a protocol used by a reliable connection established between the first OFS and the OFC;

adding path information of the second OFS to the OFPT_HELLO message, to obtain an updated OFPT_HELLO message; and forwarding the updated OFPT_HELLO message to the OFC, so that after receiving a finally updated OFPT_HELLO message including the updated OFPT_HELLO message, the OFC determines a routing path between the OFC and the first OFS according to path information added by each OFS to the finally updated OFPT_HELLO message, and delivers an exact flow entry to the first OFS according to the routing path.

With reference to the first implementation manner of the eighth aspect, in a second implementation manner of the eighth aspect, the path information includes: an ID of an OFS that sends or receives the OFPT_HELLO message, a port number used for receiving the OFPT_HELLO message, and a port number used for sending the OFPT_HELLO message.

With reference to either one of the first to the second implementation manners of the eighth aspect, in a third implementation manner of the eighth aspect, the forwarding the updated OFPT_HELLO message to the OFC includes:

directly forwarding the updated OFPT_HELLO message to the OFC, where the finally updated OFPT_HELLO message is the updated OFPT_HELLO message; or, indirectly forwarding the updated OFPT_HELLO message to the OFC by using one or more other OFSes, where the other OFS adds path information to the received updated OFPT_HELLO message, to obtain the finally updated OFPT_HELLO message.

In a first implementation manner of a ninth aspect, an embodiment of the present invention discloses an openflow switch OpenFlow Switch OFS, where the OFS is a second OFS, the second OFS is connected to a first OFS, an openflow controller OpenFlow Controller OFC, and at least one other OFS, to form an OpenFlow network, the OFC communicates with each OFS in an inband communication manner, and the second OFS includes:

a receiving unit, configured to receive an OFPT_HELLO message sent by the first OFS, used for collecting path information, and defined in the OpenFlow protocol, where a body field of the OFPT_HELLO message is used for carrying the path information after being extended, the OFPT_HELLO message carries path information of the first OFS, and the OFPT_HELLO message is carried in a packet corresponding to a protocol used by a reliable connection established between the first OFS and the OFC;

a path information adding unit, configured to add path information of the second OFS to the OFPT_HELLO message received by the receiving unit, to obtain an updated OFPT_HELLO message; and a forwarding unit, configured to forward, to the OFC, the updated OFPT_HELLO message to which the path information adding unit adds the path information of the second OFS, so that after receiving a finally updated OFPT_HELLO message including the updated OFPT_HELLO message, the OFC determines a routing path between the OFC and the first OFS according to path information added by each OFS to the finally updated OFPT_HELLO message, and delivers an exact flow entry to the first OFS according to the routing path.

With reference to the first implementation manner of the ninth aspect, in a second implementation manner of the ninth aspect, the path information includes: an ID of an OFS that sends or receives the OFPT_HELLO message, a port number used for receiving the OFPT_HELLO message, and a port number used for sending the OFPT_HELLO message.

With reference to either one of the first to the second implementation manners of the ninth aspect, in a third implementation manner of the ninth aspect, the forwarding unit is specifically configured to:

directly forward the updated OFPT_HELLO message to the OFC, where the finally updated OFPT_HELLO message is the updated OFPT_HELLO message; or, indirectly forward the updated OFPT_HELLO message to the OFC by using one or more other OFSes, where the other OFS adds path information to the received updated OFPT_HELLO message, to obtain the finally updated OFPT_HELLO message.

In the method for acquiring, by an SDN switch, an exact flow entry in the embodiments of the present invention, an SDN controller communicates with each SDN switch in an inband manner; and a reliable connection is first established, and then, a control message carrying path information of each SDN switch is transmitted based on the established reliable connection, so that the SDN controller can determine a routing path between the SDN controller and a first SDN switch according to the path information of each SDN switch that is carried in the received control message, and deliver an exact flow entry to the first SDN switch according to the path. In the foregoing manner, it does not need to maintain two physical networks, thereby reducing hardware costs and maintenance costs.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 4 is a schematic diagram of a flow table according to Embodiment 2 of the present invention;

FIG. 19 is a schematic diagram of a flow entry of an OFS according to Embodiment 5 of the present invention;

DESCRIPTION OF EMBODIMENTS

Figure 1:
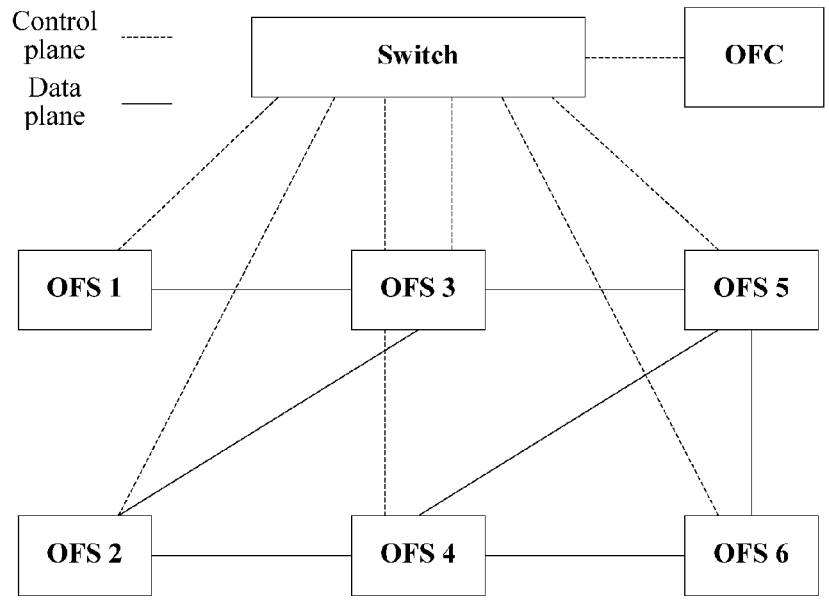
FIG. 1 is a schematic diagram of an architecture of an OpenFlow network in the prior art.

To make the objectives, technical solutions, and advantages of the present invention clearer and more comprehensible, the following further describes the present invention in detail by using specific embodiments and related drawings.

Embodiment 1

Embodiment 1 of the present invention provides a method for acquiring, by an SDN switch, an exact flow entry. In this embodiment, an architecture of an SDN network may be implemented based on an OpenFlow technology that is the most widely applied at present, or may be implemented by using another technology, which is not limited herein. In this embodiment, same as an architecture of an OpenFlow network, the architecture of the SDN network also includes one or more SDN switches and one or more SDN controllers. These SDN switches and SDN controllers may communicate by using the OpenFlow protocol or another protocol. If the OpenFlow protocol is used, an SDN switch may be referred to as an OpenFlow switch, and referred to as an OFS for short, and an SDN controller may be referred to as an OpenFlow controller, which is similar when another protocol is used.

In this embodiment and the following embodiments, this solution is mainly described in detail based on an OpenFlow network formed by an OFS and an OFC, and a person skilled in the art may consider that an SDN controller is equivalent to an OFC, and an SDN switch is equivalent to an OFS. Certainly, in the embodiments of the present invention, a related solution based on an OpenFlow network is also applicable to an SDN network implemented by using another similar protocol.

In this embodiment, the SDN network does not need a conventional switch, and a control plane and a data plane are both based on a same physical network, for example, when the SDN network is implemented based on an OpenFlow network, a physical port in an OFS is configured to send and receive a control packet and also configured to send and receive a packet. In this embodiment and the following embodiments, the concept of a "control plane" is similar to the concept of a "control plane" in the prior art, that is, some related nodes (such as an OFC and each OFS) and a link between theses nodes form a network plane used for transmitting a control message, and an OFS acquires, by means of an exchange of the control message between these nodes, a flow entry delivered by the OFC, but compared with the prior art, it does not need a conventional switch to complete the exchange of the control message between these nodes. The concept of a "data plane" is also similar to that mentioned in the Background, that is, some related nodes (an OFC and each OFS) and a link between these nodes form a network plane used for transmitting data information, and after each OFS receives a flow entry delivered by the OFC, the OFS forwards a received packet according to the flow entry. Such a communication manner based on a same physical network is referred to as "inband communication".

A method for acquiring and delivering a flow table in this embodiment is applied to a second SDN switch, that is, the method is performed by the second SDN switch. The "second SDN switch" refers to an SDN switch that forwards a control message of a first SDN switch (that is, an SDN switch that initiates a flow table acquiring request) to an SDN controller, and herein, forwarding a packet includes direct forwarding and indirect forwarding; therefore, when there are multiple SDN switches, configured to forward the control message of the first SDN switch, in a network, each of these SDN switches may be considered as the "second SDN switch". In this embodiment, a description is made based on a second SDN switch thereof, and it may be understood that, a processing procedure of another second SDN switch is also similar to the second SDN switch in an example in this embodiment, and the SDN switches are no longer described one by one in this embodiment. In this embodiment, the SDN controller communicates with each SDN switch in an "inband communication" manner.

Figure 2:
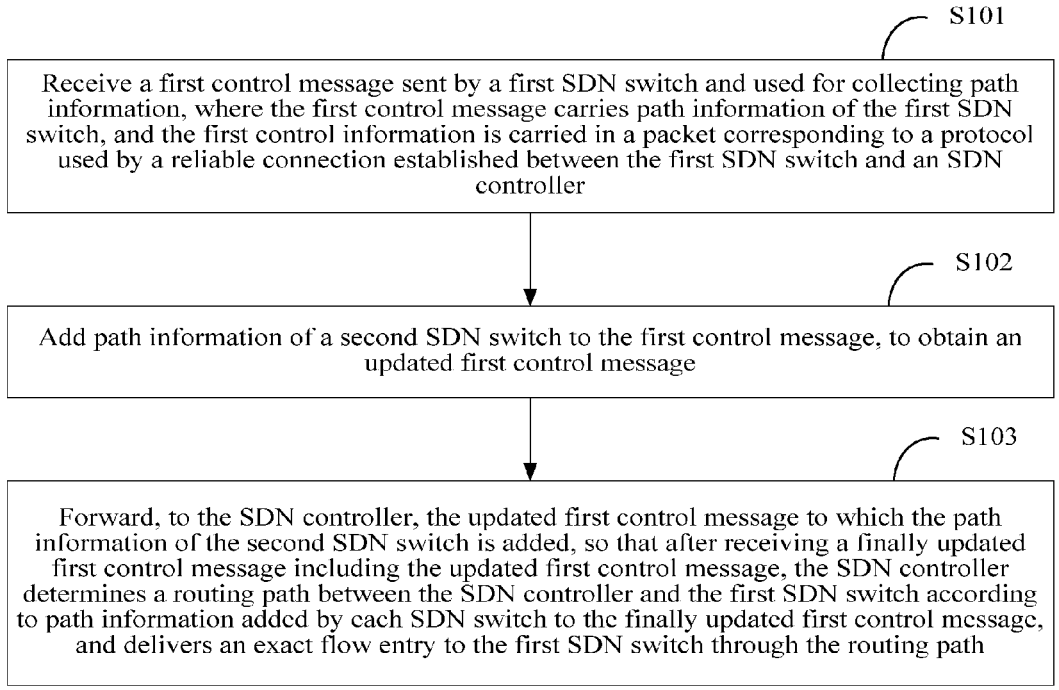
FIG. 2 is a flowchart of a method for acquiring, by an OFS, an exact flow entry according to Embodiment 1 of the present invention.

Specifically, referring to FIG. 2, a method for acquiring, by an SDN switch, a flow entry in Embodiment 1 includes:

S101: Receive a first control message sent by a first SDN switch and used for collecting path information, where the first control message carries path information of the first SDN switch, and the first control information is carried in a packet corresponding to a protocol used by a reliable connection established between the first SDN switch and an SDN controller.

Using an example in which an SDN network is an OpenFlow network, after one or more intermediate OFSes and an OFC exchange a message used for reliable connection establishment, a reliable connection is established in a first OFS. In this embodiment, each OFS may serve as a relay node, so as to transmit a message from one node (for example, the first OFS) to another node (for example, the OFC).

In this embodiment, a "reliable connection" refers to a connection established for ensuring communication reliability, and generally, the "reliable connection" has an retransmission mechanism, for example, a TCP connection (a connection established by using the TCP protocol) is considered as a typical reliable connection, and a UDP connection may be considered as an "unreliable connection". In this embodiment, the TCP connection or an SCTP connection (a connection using the SCTP protocol) may be used as the reliable connection, or a protocol such as the UDP or the SSH is added for implementation based on these protocols, for example, the TCP is used in combination with the SSH, or the TCP is used in combination with the UDP.

In this embodiment, "path information" is information used by an OFS node to identify a path of the OFS node in a network, and generally, a port number of the OFS is used as the "path information"; a path in the network refers to a transmission link on which a packet is sent from a port of a node (which may be an OFS or an OFC) to a port of another node; and in this embodiment and the following embodiments, a path is bidirectional, that is, channels on which a packet is sent and returned during transmission are the same path, for example, if an OFS1 sends a packet from a port 11 of the OFS1 to a port 33 of an OFS3, when the OFS3 needs to send a packet to the OFS1, the OFS3 also uses the port 33 to send the packet to the port 11 of the OFS1. The path information also carries an ID of the OFS to identify a port number of the OFS.

It should be noted that, in this embodiment, a port (port) of an OFS refers to a physical port rather than a protocol port (also referred to as a "software port", for example, a port 80 defined for an HTTP application). In the field of OpenFlow technologies and the field of Internet technologies, a port (port) may refer to either a physical port or a software port, and a person skilled in the art may know an actual meaning of a port according to context, for example, referring to FIG. 4, a port number that appears in an instruction field in a flow entry in an OFS is a physical port number, and a port number in an IP Port field indicates a protocol port number. In this embodiment and the following embodiments, in order to give consideration to use on a port by a person skilled in the art and convenience of description, for each port, whether the port indicates a "physical port" or a "protocol port" is not pointed out one by one, and a person skilled in the art may easily know, with reference to context, that a "port" is a port of which type.

In this embodiment, some control messages (herein, named "first control information") defined in the OpenFlow protocol may be extended to collect path information, for example, the first control information may be an OFPT_HELLO message. Specifically, a body field of the OFPT_HELLO message may be extended, to be used for carrying the path information. If it is implemented based on another protocol, a similar method of extending an existing protocol may also be used, or some new fields are defined in a protocol to implement the extension.

S102: Add path information of a second SDN switch to the first control message, to obtain an updated first control message.

Similar to content of the path information in step S101, using an example in which the SDN network is an OpenFlow network, the path information herein includes an ID and a port number of a second OFS. In this step, based on that path information of the first OFS already exists in the first control message, the path information is added to the first control message, to obtain the updated first control message. After this step is performed, path information of an intermediate node is added to the first control message; in this case, that the first OFS sends the first control message from which port and the second OFS receives the first control message from which port is known, and a path between the first OFS and the second OFS can be known.

It should be noted that, in this embodiment, the "first control message" is a control message in the OpenFlow protocol that is sent by the first OFS to the OFC, for example, an OPFT_HELLO message mentioned below.

Certainly, when the SDN network is implemented by using another protocol, the first control message may also be a control message based on the other protocol. The definition of the first control message is mainly determined by header information of the first control message. When content of another part of the message changes (for example, a path information of the second OFS may be added to some fields in the message when the message passes through the second OFS), the message is still referred to as the "first control message" in this embodiment, or, more accurately, is the "updated first control message". Unless otherwise stated for the "first control message", a person skilled in the art may understand the meaning of the first control message (a first control message that is sent by first OFS at the beginning or a first control message to which new path information is added after the first control message passes through each OFS) with reference to context.

S103: Forward, to the SDN controller, the updated first control message to which the path information of the second SDN switch is added, so that after receiving a finally updated first control message including the updated first control message, the SDN controller determines a routing path between the SDN controller and the first SDN switch according to path information added by each SDN switch to the finally updated first control message, and delivers an exact flow entry to the first SDN switch according to the routing path.

In this step, the forwarding is classified into direct forwarding and indirect forwarding, and correspondingly, the finally updated first control message is also different.

Still using an example in which the SDN network is an OFS network, if it is direct forwarding (that is, the second OFS directly forwards to the OFC and does not pass through any intermediate OFS), the finally updated first control message is the updated first control message; and if it is indirect forwarding (that is, the second OFS forwards the first control message to the OFC by using one or more other OFSes), after receiving a first control message sent by a previous OFS, each of the other OFSes adds path information of each of the other OFSes, so that the first control message is constantly updated, and a first control message including the path information of all the OFSes finally arrives at the OFC.

A manner in which the other OFS adds the path information is the same as that in which the second OFS adds the path information, that is, the other OFS may also add an ID and a port number of the other OFS to the first control message, to obtain the finally updated first control message. Because each OFS adds the path information of the each OFS, the OFC can know, according to the path information in the first control message, that the first OFS is connected to which intermediate OFSes and the first OFS uses which ports to send a message, so that the routing path (that is, a path on which the first control message sent by the first OFS passes through which intermediate OFSes and finally arrives at the OFC) can be acquired, and the flow entry is delivered to the first OFS through the routing path (in an actual application, a flow table may also be delivered to another related OFS based on the routing path, and for details, reference may be made to the following Embodiment 5).

After receiving the flow entry, the first OFS adds the flow entry to a local flow table, and subsequently, may forward a received packet according to each flow entry in the flow table. In an actual application, each OFS (or each SDN switch) is equal, another OFS may also acquire a flow entry like the first OFS in this embodiment, and the first OFS may also serve as an intermediate OFS to forward various types of messages like the "second OFS" or the "other OFS" in this embodiment.

In addition, the first control message forwarded in this step is also carried in a packet based on a corresponding protocol (such as the TCP/IP protocol), and some packet encapsulation procedures may also be involved, which all belong to the prior art, and these specific implementations are not described in detail herein.

In this embodiment, a flow entry can be delivered without needing one or more conventional switches, thereby saving costs. In addition, in this embodiment, because a data plane and a control plane may both belong to a same physical network, compared with the prior art, one physical network is reduced, which further reduces hardware costs; in addition, in this embodiment, two network management systems do not need to be separately maintained for two physical networks, which also reduces maintenance costs.

Embodiment 2

Based on the foregoing embodiment, using an example in which an SDN network is an OpenFlow network, a method for establishing a reliable connection is further described in this embodiment. In Embodiment 1, that the method for establishing a reliable connection may be establishing based on a protocol such as the TCP or the SCTP has been already described, in this embodiment, a further description is made based on the TCP that is widely used at present, and it may be understood that, by using this embodiment, a person skilled in the art may also use another similar protocol (such as the SCTP) for implementation.

In this embodiment, a basic exchange procedure of a TCP handshake message is the same as that in the prior art, in which three-way handshake (three-way handshake) needs to be completed, that is, a source node sends a SYN message to a destination node (first handshake), after receiving the SYN message, the destination node returns a SYN-ACK message (which may also be indicated by "SYN+ACK", that is, second handshake) to the source node, and then, the source node sends an ACK message to the destination node (third handshake), so as to complete three-way TCP handshake. Correspondingly, the SYN message, the SYN-ACK message, and the ACK message may be respectively referred to as a "message of first handshake", a "message of second handshake", and a "message of third handshake", each message is carried in the form of a packet (such as a TCP/IP packet), and these technologies are technologies well known by a person skilled in the art, which are not described in detail herein again.

In the OpenFlow network in this embodiment, there may be one or more OFSes between a first OFS and an OFC; therefore, in most cases, the first OFS cannot directly interact with the OFC, and a second OFS and one or at least one other OFS need to serve as relay nodes to transmit an exchanged message.

In order to enable these relay nodes to transmit the exchanged message, a method is that the first OFS broadcasts a TCP handshake message to all OFSes connected to the first OFS, and each OFS that receives the message also broadcasts the message to other OFSes, and finally transmits the TCP handshake message to the OFC, in addition, after receiving the TCP handshake message, the OFC first broadcasts the TCP handshake message to all connected OFSes, and after receiving a response message of the OFC, each OFS also broadcasts the message, and finally, transmits the TCP handshake message to the first OFS, so that an exchange of a message of three-way TCP handshake can be completed.

Figure 3:
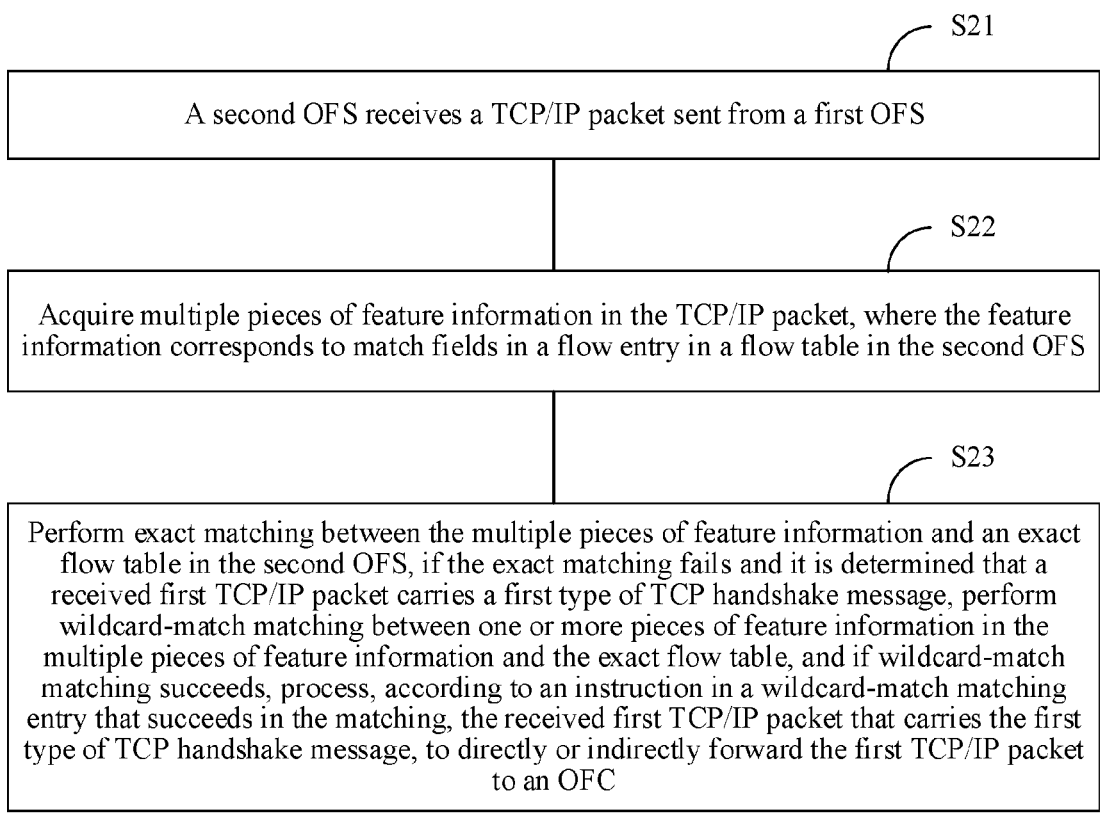
FIG. 3 is a schematic flowchart of processing, by a second OFS, a first type of TCP handshake message according to Embodiment 2 of the present invention.

Relatively more network resources are occupied by broadcasting, and it may cause a broadcast storm; therefore, in order to better use the network resources and reduce occurrence of the broadcast storm, this embodiment provides a new method for forwarding a TCP handshake message for an OFS between the first OFS and the OFC. Using an example in which the second OFS receives a first type of TCP handshake message (a message of first TCP handshake and a message of third TCP handshake) sent by the first OFS, and forwards the first type of TCP handshake message to the OFC by using another OFS, referring to FIG. 3, the method includes:

S21: A second OFS receives a TCP/IP packet sent from a first OFS.

It may be direct receiving (there is no other intermediate OFS) or indirect receiving (a first TCP/IP packet from the first OFS is received through multiple OFSes), and because this embodiment is based on the TCP/IP, various types of messages are all carried by using TCP/IP packets.

S22: Acquire multiple pieces of feature information in the TCP/IP packet, where the feature information corresponds to match fields in a flow entry in a flow table in the second OFS.

OFSes in the OpenFlow network all have a flow table used for forwarding, the flow table may include one or more flow entries (flow entry, or entry for short), each flow entry includes one or more match fields (match field, also referred to as a "field" for short below), and may specifically include match fields such as destination MAC, source MAC, a source IP, a destination IP, and a TCP port number; in addition, the flow entry may further have an instruction (instruction) corresponding to the flow entry, for example, forwarding through which port. When the received packet (used for carrying various types of messages) conforms to a flow table matching policy, the packet is forwarded according to an instruction in a flow entry.

Refer to FIG. 4, which is a schematic diagram of a flow table. The flow table includes an exact flow entry and a wildcard-match flow entry. Each flow entry includes match fields (such as destination MAC and a destination IP) and instructions (instructions) corresponding to these match fields. It should be noted that, in addition to the "match fields" and the "instructions", the flow entry may also include other items (such as counters, used for collecting statistics on a quantity of times that the flow entry is hit), for the match fields, in addition to several match fields shown in the figure, other match fields may also be included, and in this embodiment, for ease of description, all other information is not listed completely.

A difference between an exact flow entry and a wildcard-match flow entry lies in that, in the exact flow entry, each match field has an exact value, and only a value that is equal to the match field is considered to match the match field; while, in the wildcard-match flow entry, values of some match fields are not limited (indicated by a symbol "*" in FIG. 4), and any value can be considered to match the match field.

In FIG. 4, one flow table has multiple flow entries; in another embodiment, the flow table may also be divided into two flow tables: an "exact flow table" and a "wildcard-match flow table", the exact flow table only includes an exact flow entry, and the wildcard-match flow table only includes a wildcard-match flow entry; or in another embodiment, there may also be another logical division form, which is not limited herein.

In addition, a specific implementation manner of the "flow table" on a physical storage plane is not limited in this embodiment, for example, content in one or more flow tables nay be stored in a continuous physical space in order or stored in several physical spaces. The physical space may be a built-in storage space in a hardware device (such as an FPGA) or may be a general memory space, and specifically, an SDRAM, a DDR SDRAM, a flash or the like may be used as a storage medium of the physical space. When flow table matching is performed, matching may be performed based on a hardware device or matching may be performed by using software (by executing a software program by a CPU).

It should be noted that, in various embodiments of this solution, for ease of description, unless otherwise stated, a flow table refers to an exact flow table, that is, a flow table only including an exact flow entry. For a method for using a wildcard-match flow table, reference may be made to an existing processing solution, which is not concerned herein. The wildcard-match flow entry shown in FIG. 4 is only used to more clearly describe the flow table, so as to better distinguish the concept of a "performing wildcard-match matching on an exact flow table" mentioned below.

In this step, the received TCP/IP packet has multiple pieces of feature information (such as destination MAC and a destination IP) corresponding to some match fields in a flow entry, and these pieces of feature information are encapsulated in the packet (for example, in a packet header); and an OFS receives the packet and can acquire these pieces of feature information by parsing the packet.

S23: Perform exact matching between the multiple pieces of feature information and an exact flow table in the second OFS, if the exact matching fails and it is determined that a received first TCP/IP packet carries a first type of TCP handshake message, perform wildcard-match matching between one or more pieces of feature information in the multiple pieces of feature information and the exact flow table, and if wildcard-match matching succeeds, process, according to an instruction in a wildcard-match matching entry that succeeds in the matching, the received first TCP/IP packet that carries the first type of TCP handshake message, to directly or indirectly forward the first TCP/IP packet to an OFC.

In this embodiment, flow table matching (herein, to emphasize again, unless otherwise stated, a flow table refers to an exact flow table) may include two cases: the first case is exact matching (exact-match) used in the prior art, that is, matching is performed between content on which matching needs to be performed and each match field in a matching flow entry, and it is considered that the matching succeeds only when each match field matches the content; the other case is wildcard-match matching (wildcard-match), and it may be considered that the wildcard-match matching succeeds if content on which matching needs to performed matches one or more match fields in a matching flow table, and it does not need each match field to match the content like the exact matching. It needs to be emphasized that, herein, the "wildcard-match matching" does not refer to performing wildcard-match matching based on the wildcard-match flow entry in FIG. 4, but performing wildcard-match matching based on an exact flow entry.

To give considerations to a speed and flexibility, in this embodiment, the exact matching may be implemented by using hardware, and the wildcard-match matching may be implemented by using software. In a system combining software and hardware, a CPU may interact with a hardware device by using an interface, to share a flow table, so as to implement flow table matching of the software and the hardware. There may be multiple manners of sharing a flow table, for example, when the software needs matching, the software acquires a copy from a hardware memory by using an interface, or when the hardware updates the flow table, the hardware sends a copy to the software by using an interface, and a specific manner of sharing a flow table or an equivalent manner similar to the manner (for example, only copying some specific flow entries by using a policy) is not limited in this embodiment, as long as flow table matching of the software and the hardware can be completed through sharing.

In this step, exact matching is first performed on the flow table, and if there is no flow entry that exactly matches (that is, there is no flow entry that can match each match field in the flow table), "wildcard-match matching" is performed on the flow table, that is, it is determined whether one or more pieces of feature information in the multiple pieces of feature information match one or more (not all are required) match fields in a flow entry in the flow table, if yes, the TCP handshake message is processed according to an instruction in a flow entry that succeeds in the matching, so as to directly or indirectly forward a handshake request message to an OFS. For example, after the second OFS receives a message of first handshake (a SYN message) sent by the first OFS, if a flow entry succeeds in the wildcard-match matching, processing is performed according to an instruction in a flow entry that succeeds in the matching, for example, being forwarded from a specific port, forwarded to another OFS, and forwarded to the OFC by using the another OFS. After receiving a packet forwarded by the second OFS, the another OFS may perform processing like the second OFS, or still perform processing through broadcasting or by using another form.

For ease of description, herein, a match field used for "wildcard-match matching" in an exact flow entry is a "wildcard-match match field", an exact flow entry having a "wildcard-match match field" is referred to as a "wildcard-match matching entry", and when these wildcard-match match fields all succeed in the matching, a packet can be forwarded to a second end by using an instruction corresponding to the wildcard-match match field. In this step, an objective of performing the "wildcard-match matching" on the flow table is directly or indirectly forwarding the handshake request message to the second end. When one or more match fields are specifically selected as "wildcard-match match fields", as long as a forwarding route determined by using an instruction corresponding to these several match fields is a route that can finally reach the second end, the message can be finally forwarded to the second end by using the instruction (content of the instruction generally is forwarding from which port) corresponding to the one or more match fields, thereby being used as match fields used during the wildcard-match matching. General wildcard-match match fields may be destination MAC, a destination IP, and a destination port (a protocol port), and generally, a specific application of the second end can be determined by using these several match fields; therefore, matching may be performed on the several fields to forward the message to the second end. Certainly, in an actual application, if two pieces of information (such as the destination IP and the destination port) thereof or even one piece of information can also determine an application of the second end, matching may be performed on two pieces or one piece of information thereof, and finally, the packet is sent to the second end by using an instruction corresponding to a match field. In order to improve accuracy, adding another field on which matching needs to be performed is not limited in this embodiment.

The foregoing flow entry used for the wildcard-match matching may be delivered by the OFC when the second OFS (or each of other intermediate OFSes) communicates with the OFC previously and obtained, and is still valid when the wildcard-match matching is performed. These flow entries are originally used for forwarding some other information, but because these flow entries may include a forwarding path between two nodes, this embodiment implements more accurate forwarding through the wildcard-match matching by using a path existing in these flow entries. Certainly, if such a flow entry is not stored previously or had been stored, but the flow entry is invalid and does not exist during the wildcard-match matching, the "wildcard-match matching" cannot succeed; in this case, the packet may be forwarded through broadcasting.

In this embodiment, the feature information may include destination MAC, a destination IP, and a destination port number, and match fields in a flow entry in the flow table include: destination MAC, a destination IP, and a destination port number, so that, in step S23, the "determining whether one or more pieces of feature information in the multiple pieces of feature information match one or more match fields in a flow entry in the flow table" may specifically include: determining whether the destination MAC, the destination IP, and the destination port number in the multiple pieces of feature information match destination MAC, a destination IP, and a destination port number in a flow entry in the flow table. The foregoing several pieces of feature information used for matching are relatively common feature information, reducing or adding one or more pieces of feature information is not limited in this embodiment.

Forwarding is implemented by performing wildcard-match matching on an exact flow table in this embodiment, so that a first type of handshake message can also be forwarded without a need of broadcasting, thereby reducing a quantity of broadcasting times, which can better reduce resources and suppress a broadcast storm.

Embodiment 3

Based on the foregoing embodiments, the exchange of the three-way TCP handshake message in Embodiment 2 is described in detail in this embodiment.

Figure 5:
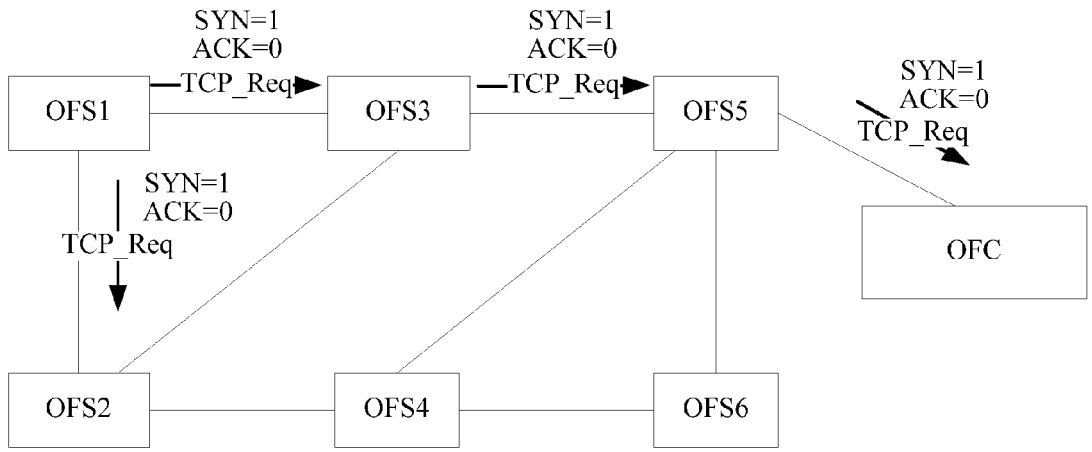
FIG. 5 is a schematic overview diagram of processing, by an OFS, a message of first TCP handshake according to Embodiment 3 of the present invention.

Refer to FIG. 5, which is a schematic diagram of an OpenFlow network in this embodiment, which includes multiple OFSes: an OFS1 to an OFS6, and one OFC. It is assumed that herein, the OFS1 is a first OFS, the OFS3 is a second OFS and is directly connected to the OFS1 (certainly, actually, multiple intermediate OFSes may be further included), the remaining OFS2 and OFS4 to OFS6 may be considered as "other OFSes" in the foregoing embodiment.

1. First Handshake

Based on the foregoing embodiments, FIG. 5 shows a brief procedure of an exchange of first TCP handshake, that is, the first OFS first broadcasts a message of first TCP handshake, which is indicated by TCP_Req. The message is specifically a TCP/IP packet, SYN in a packet header is set to 1, and ACK is set to 0. After reception, the second OFS (the OFS3) searches a flow table through wildcard-match, and if there is a matching flow entry, performs a forwarding policy by using an instruction, for example, forwards to the OFS5 in FIG. 5. Similarly, the OFS5 also searches the flow table through wildcard-match, and if there is a matching flow entry, may perform the forwarding policy by using an instruction. Because neither the OFS3 nor the OFS5 needs to broadcast in FIG. 5, and forwarding to a next hop node is performed through a specific port, network resources are reduced.

Figure 6:
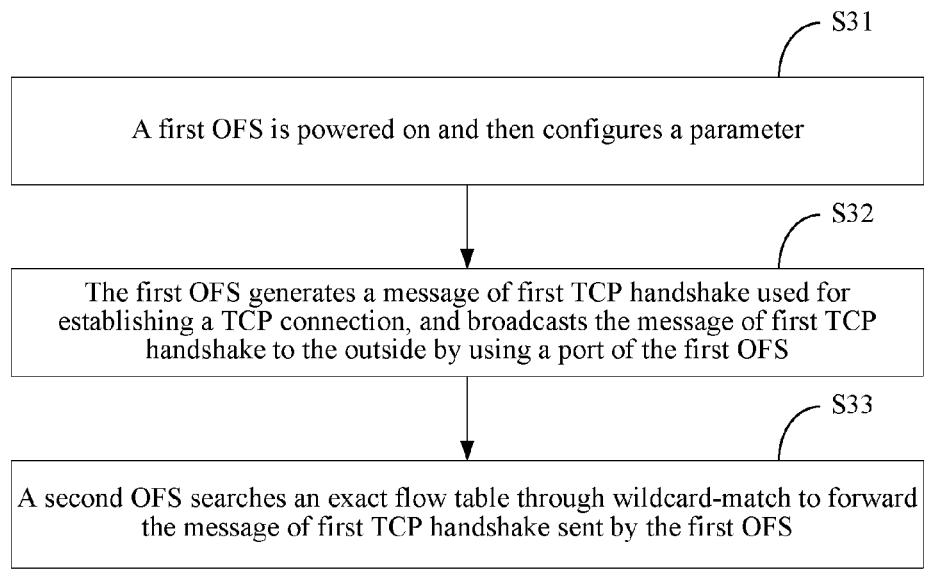
FIG. 6 is a flowchart of processing, by the OFS, the message of first TCP handshake according to Embodiment 3 of the present invention.

Specifically, based on FIG. 5, referring to FIG. 6, first handshake in the three-way TCP handshake in this embodiment may be completed by using the following method:

S31: A first OFS is powered on and then configures a parameter.

Herein, it is assumed that the first OFS is the OFS1 in FIG. 5, after a network cable is inserted into the OFS1 and the OFS1 is powered on, the OFS1 configures some parameters, including configuring an IP address of the OFS1 (for example, configuring by using a command line), and configures an IP address, a port number, and a connection manner (the TCP, the SSL, or the like) of an associated OFC, and a specific configuration method is the prior art, and is not described in detail herein.

Figure 7:
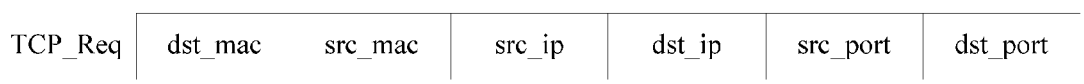
FIG. 7 is a schematic diagram of several fields in a packet header of a packet carrying the message of first TCP handshake according to Embodiment 3 of the present invention.

S32: The first OFS generates a message of first TCP handshake (TCP_Req) used for establishing a TCP connection, and broadcasts the message of first TCP handshake to the outside by using a port (a physical port) of the first OFS. The TCP_Req is specifically a TCP/IP packet, and refer to FIG. 7, which shows several fields included in the packet, and these fields are set as follows:

src_mac: a MAC address of the first OFS; and src is an abbreviation of source, and indicates "source", and the meaning of src in other places in the specification is the same unless otherwise stated;

src_ip: an IP address of the first OFS;

dst_ip: an IP address of an OFC specified in S31; and dst is an abbreviation of destination, and indicates "destination", and the meaning of dst in other places in the specification is the same unless otherwise stated;

src_port: may be set to a fixed port number (a protocol port number, which is a TCP port number because the TCP protocol is used herein, and the following protocol port number also refers to a TCP port number unless otherwise stated), for example, "36653";

dst_port: a port number (a protocol port number) of the OFC specified in S31, for example, "6633";

dst_mac: a pseudo MAC address, FF-FF-FF-FF-FF-FF, the address may also be another agreed value, used for enabling another OFS to know, after reception, a value used for a special purpose, and not to discard the packet; and because for all Fs, it is broadcast by default in an existing network, the value is set to be compatible with the existing network;

a SYN bit is set to 1, and an ASK bit is set to 0; and an initial TTL value is set, for example, 30, and a TTL value is used for defining a time to live of the packet in a network.

S33: A second OFS searches a flow table through wildcard-match to forward a packet of the message of first TCP handshake sent by the first OFS. After receiving the message of first TCP handshake, each of other OFSes also performs similar processing like the second OFS, and finally forwards the message of first TCP handshake to the OFC.

Figure 8:
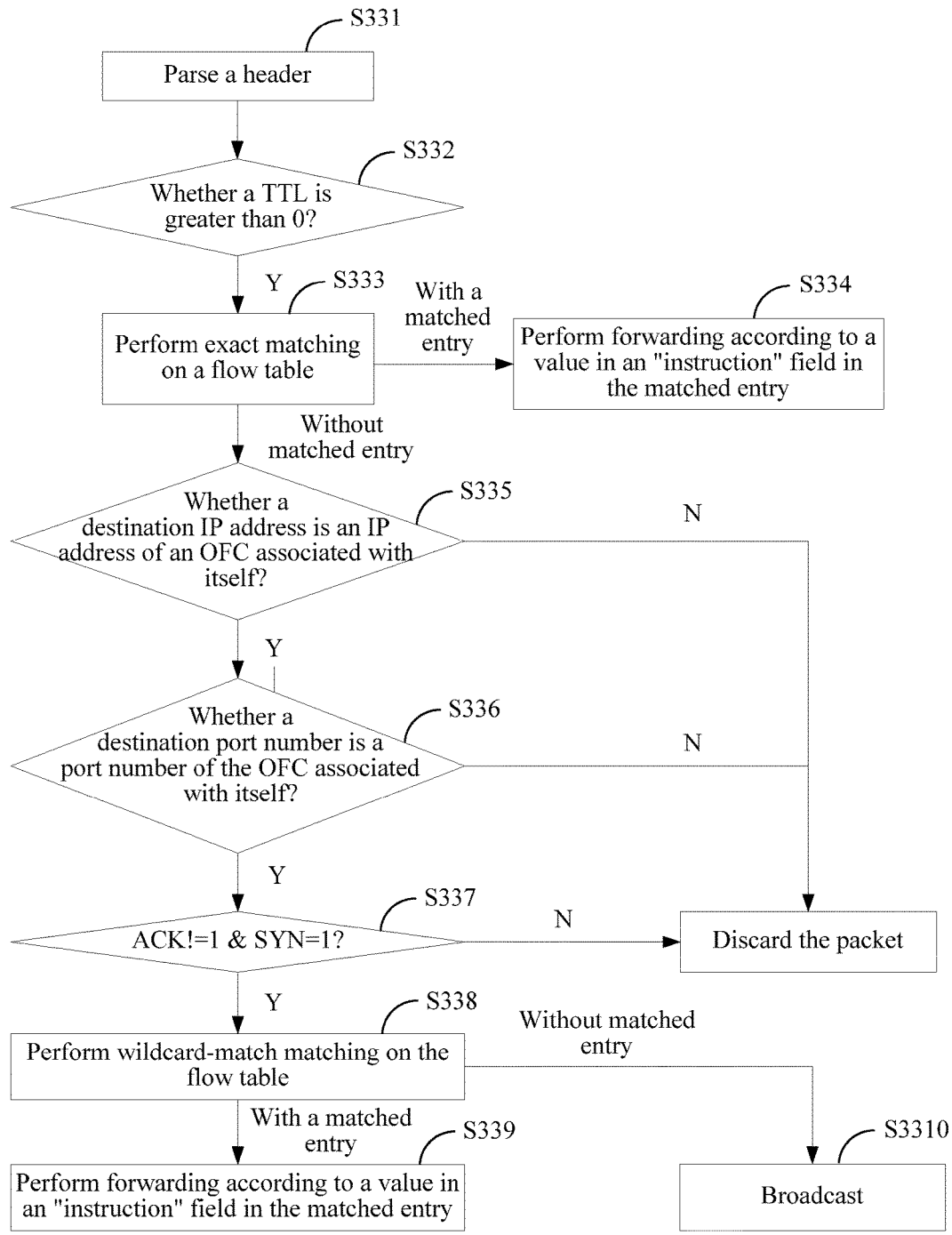
FIG. 8 is a schematic diagram of forwarding, by a second OFS, the packet of the message of first TCP handshake according to Embodiment 3 of the present invention.

Referring to FIG. 8, S33 specifically includes:

S331: Parse a header (header) of the packet.

Multiple pieces of information may be obtained after the header is parsed, such as the TTL, the source/destination MAC, the source/destination IP, and the source/destination port, used for determining in a subsequent step; and subsequently, when each OFS processes a message of second/third handshake, each OFS also obtains these pieces of information through parsing, and performs determination according to the information obtained through parsing.

S332: Determine whether a TTL is greater than 0, and if yes, perform S333; otherwise, discard the packet.

S333: Perform exact matching on the flow table, if there is a matched entry, perform S334 of performing forwarding according to a value in an "instruction" field in the matched entry, and if there is no matched entry, perform step S335.

In order to improve processing efficiency and give considerations to flexibility, the foregoing step S331 to step S334 may be implemented by using hardware (such as an ASIC or an FPGA) to increase a processing speed, and a subsequent step may be implemented by using software (a CPU executes software code), which is more flexible.

S335: Determine whether a destination IP address is an IP address of an OFC associated with itself, and if yes, perform step S336; otherwise, discard the packet.

S336: Determine whether a destination port number is a port number of the OFC associated with itself, and if yes, perform step S337; otherwise, discard the packet.

S337: Determine whether "ACK!=1 & SYN=1" (an ACK bit is not equal to 1 and a SYN bit is equal to 1), and if yes, perform step S338; otherwise, discard the packet. This step is used for determining whether it is a message of first handshake. It should be noted that, in this embodiment and the following embodiments, because the OFS receives many messages in an actual application, and has different processing manners for difference messages, the OFS needs to determine that a message is which type of message, and when it is implemented by code actually, there may be some other code used for determining whether it is another message before or after the step, and in this embodiment and the following embodiments, for ease of description, the code is not shown, but only code related to this embodiment is shown.

A function of step S335 to step S337 is discarding a packet that does not need to be processed by the OFS.

S338: Perform wildcard-match matching on the flow table, if there is a matched entry, perform S339 of performing forwarding according to a value in an "instruction" field in the matched entry, and if there is no matched entry, perform S3310 of broadcasting.

S339: When there is a matched entry that can succeed in the wildcard-match matching, perform forwarding according to the value in the "instruction" field in the matched entry. If there is no matched entry, broadcasting may be performed.

The foregoing S33 is a procedure of processing and forwarding, by the second OFS, the packet, and broadcasting is reduced by searching the flow table through wildcard-match, thereby reducing network resources and suppressing a broadcast storm.

Another OFS may also perform forwarding in a same manner used by the second OFS (for example, the OFS3), so as to finally transmit a request message of first handshake (TCP_Req) in the packet to the OFC.

For example, the OFS3 and the OFS5 may also use such a forwarding and processing procedure. In FIG. 5, it is assumed that both the OFS3 and the OFS5 can perform wildcard-match matching on the flow table, so that the two OFSes can forward the packet to the OFC without a need of broadcasting. Certainly, actually, if matching (including exact matching and wildcard-match matching on the flow table) on the flow table fails, the packet may still be forwarded through broadcasting, for example, the OFS3 broadcasts to the OFS5 and the OFS2, and the OFS5 broadcasts to the OFS4, the OFS6, and the OFC.

Subsequently, after receiving the packet, the OFC parses the header, and because the destination MAC address of the packet is all Fs, the OFC processes the packet as a general broadcast packet, removes a Layer 2 address, and performs the following processing on Layer 3 content of the packet (if an agreed MAC address is used, the OFC also performs the following processing after knowing that the destination MAC address is the agreed MAC address):

The OFC determines whether the destination IP in the packet is equal to the IP of the OFC and whether the destination port number in the packet is equal to a port number for listening, by the OFC, to a TCP connection and the port number of the OFC, discards the packet as long as one of them is no, and if both yes, continues to determine whether "ACK!=1 & SYN=1" are met; if yes, the first handshake succeeds, and if not, the OFC also discards the packet. It should be noted that, the foregoing several determining orders are not limited.

2. Second Handshake

Figure 9:
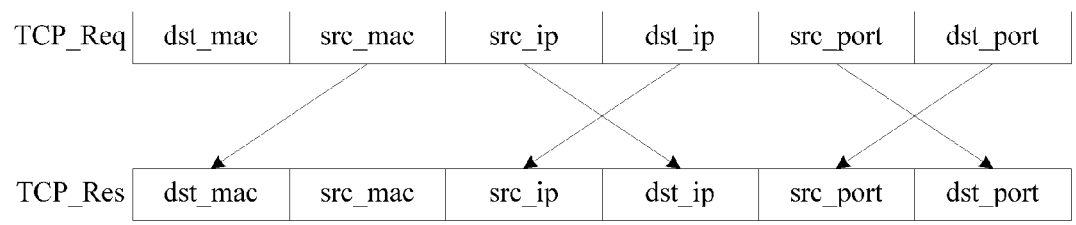
FIG. 9 is a schematic diagram of several fields in a packet header of a packet carrying a message of second TCP handshake according to Embodiment 3 of the present invention.

After the first handshake succeeds, the OFC constructs a message of second handshake (TCP_Res) according to the received TCP_Req message, where the message is specifically a TCP/IP packet. Refer to FIG. 9, which shows a diagram of a correspondence between fields in a packet header of a packet that carries the message of second handshake and the fields in the packet header of the packet that carries the message of first handshake, and a packet header of the TCP_Res is set as follows:

TCPdst_mac: a MAC address of the first OFS, equal to src_mac in the packet header of the TCP_Req;

src_mac: a MAC address of the OFC;

src_ip: an IP address of the OFC, equal to dst_ip in the packet header of the TCP_Req;

dst_ip: an IP address of the first OFS;

src_port: a TCP port number, used for listening to an Openflow application, of the OFC, equal to dst_port in the packet header of the TCP_Req;

dst_port: a TCP port number, used for listening to an Openflow application, of the OFS, equal to src_port in the packet header of the TCP_Req;

both an ACK bit and a SYN bit are set to "1"; and an initial TTL value is set.

After constructing the message of second handshake, the OFC sends the message of second handshake to an OFS and may send the message of second handshake to one or more OFSes connected to the OFC. Preferably, the OFC sends the message of second handshake to the OFS that receives the message of first handshake, or in an extreme case, the OFC may broadcast the message of second handshake.

After receiving the message of second handshake, each OFS first performs exact matching on the flow table, if the matching succeeds, forwards the message of second handshake by using a specific port, and if the matching fails, broadcasts the message of second handshake. When forwarding the message of second handshake, the OFS does not perform matching on the flow table in a wildcard-match matching manner. This is because, in an actual scenario, the first OFS generally is a new OFS, and a flow entry that is forwarded to the first OFS does not exist in another OFS, and therefore, the message of second handshake cannot be exactly forwarded in a manner of performing wildcard-match matching on the flow table. Certainly, in a scenario in which a flow entry that is forwarded to the first OFS actually exists in some flow entries, exact forwarding may be implemented from a port in a manner of performing wildcard-match matching on the flow table instead of performing forwarding through broadcasting.

In addition, when processing the message of second handshake, the OFS updates, if the OFS determines that the message of second handshake from the OFC is sent to the OFS, a mapping relationship between an IP and MAC of the OFC that is locally stored, and replaces original pseudo MAC (all Fs) with an actual MAC address of the OFC; so as to be used when a packet to be sent to an OFC is constructed subsequently.

Figure 10:
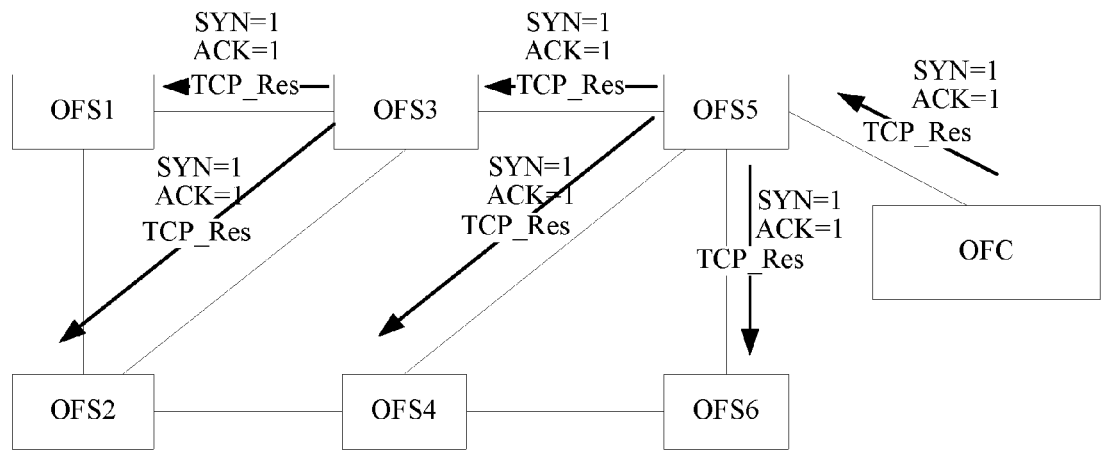
FIG. 10 is a schematic overview diagram of processing, by the OFS, the message of second TCP handshake according to Embodiment 3 of the present invention.
Figure 11:
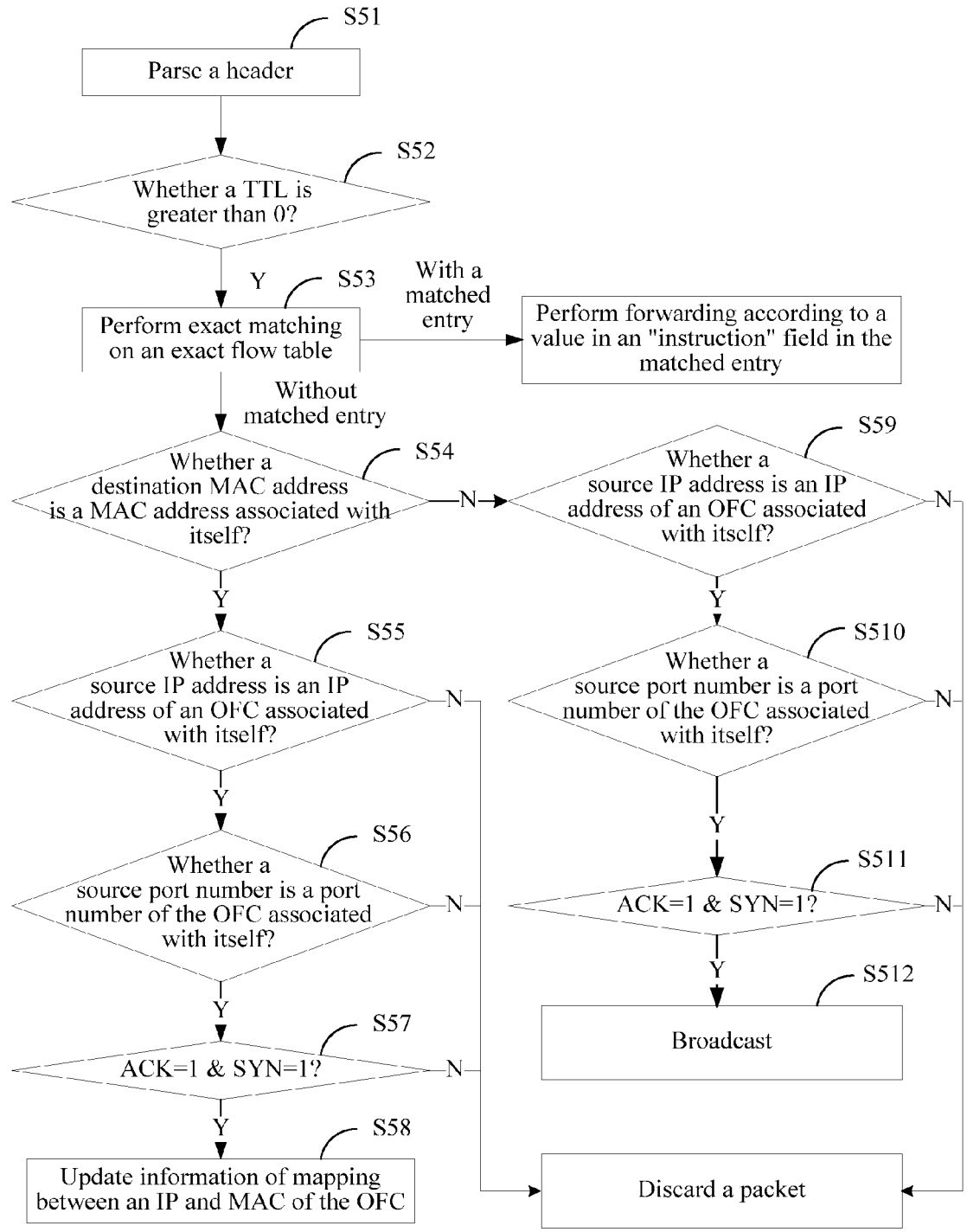
FIG. 11 is a flowchart of processing, by the OFS, the message of second TCP handshake according to Embodiment 3 of the present invention.

Refer to FIG. 10, which is a schematic diagram of processing, by each OFS, the message of second handshake, and specifically, refer to FIG. 11, each OFS may forward the message of second handshake by using the following method, which includes:

S51: Parse a header.

Multiple pieces of information may be obtained after the header is parsed, such as the TTL, the source/destination MAC, and the source/destination IP.

S52: Determine whether a TTL is greater than 0, and if yes, perform S53; otherwise, discard a packet.

S53: Perform exact matching on the flow table, if the matching succeeds, forward the packet according to a value in an "instruction" field (for example, forward the packet to a specific port), and if the matching fails, perform S54.

In order to improve processing efficiency and give considerations to flexibility, the foregoing several steps may be implemented by using hardware, and the following steps may be implemented by using software.

S54: Determine whether destination MAC is a MAC address of the OFS, and if yes, perform step S55; otherwise, perform step S59. If it is determined that the destination MAC address is the MAC address of the OFS, it indicates that the packet is sent to the OFS, and in this case, step S55 to step S58 are performed; otherwise, it indicates that the packet is sent to another OFS, the OFS is an intermediate OFS for performing forwarding, and in this case, step S59 to step S512 are performed. Whether it is a packet sent to the OFS may be determined by using a destination IP, however, actually, because MAC is a Layer 2 protocol and is obtained through parsing from the packet header before an IP, therefore, determining by using the MAC can increase a processing speed.

S55: Determine whether a source IP address is an IP address of an OFC associated with itself, and if yes, perform step S56; otherwise, discard the packet.

S56: Determine whether a source port number is a port number of the OFC associated with itself, and if yes, perform step S57; otherwise, discard the packet.

S57: Determine whether "ACK=1 & SYN=1" (both an ACK bit and a SYN are 1) are met, and if yes, perform S58; otherwise, discard the packet.

S58: The OFS updates a mapping relationship between IP and MAC addresses of the OFC, that is, record an actual MAC address corresponding to the IP address of the OFC (the pseudo MAC sent by first OFS is received during the first handshake, and needs to be updated herein), so that when a packet to be sent to the OFC is constructed subsequently, the MAC address of the OFC, which needs to be set, in the packet header can be set according to an updated value. At this point, the second TCP handshake is completed.

S59: Determine whether a source IP address is an IP address of an OFC associated with itself, and if yes, perform step S510; otherwise, discard the packet.

S510: Determine whether a source port number is a port number of the OFC associated with itself, and if yes, perform step S511; otherwise, discard the packet.

S511: Determine whether "ACK=1 & SYN=1" are met, and if yes, perform step S512; otherwise, discard the packet.

S512: Broadcast the packet.

By using the foregoing steps, the packet that carries the message of second handshake can be finally transmitted to the first OFS (the OFS1), so as to complete the second handshake.

3. Third Handshake

Figure 12:
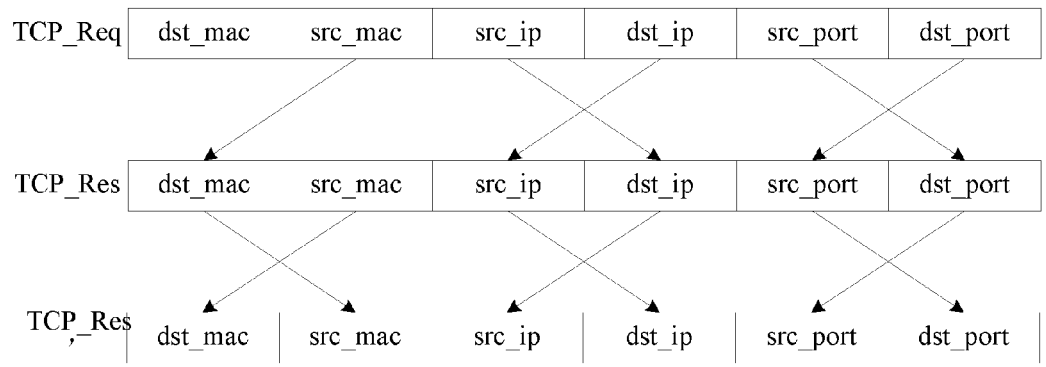
FIG. 12 is a schematic diagram of several fields in a packet header of a packet carrying a message of third TCP handshake according to Embodiment 3 of the present invention.

After receiving the TCP_Res sent by the OFC, the first OFS (the OFS1) constructs a message of third handshake (TCP_Req'), where the message is specifically a TCP/IP packet. Refer to FIG. 12, which is a table of correspondence between fields in a packet header of the message of third handshake and the fields in the packet headers of the messages of first and second handshake, and the fields in the packet header are set as follows:

dst_mac: a MAC address of the OFC;
src_mac: a MAC address of the first OFS;
src_ip: an IP address of the first OFS;
dst_ip: an IP address of the OFC;
src_port: a port number, used for listening to a TCP connection, of the first OFS;
dst_port: a port number, used for listening to a TCP connection, of the OFC;
ACK is set to "1", and SYN is set to "0"; and
an initial TTL value is set.

Figure 13:
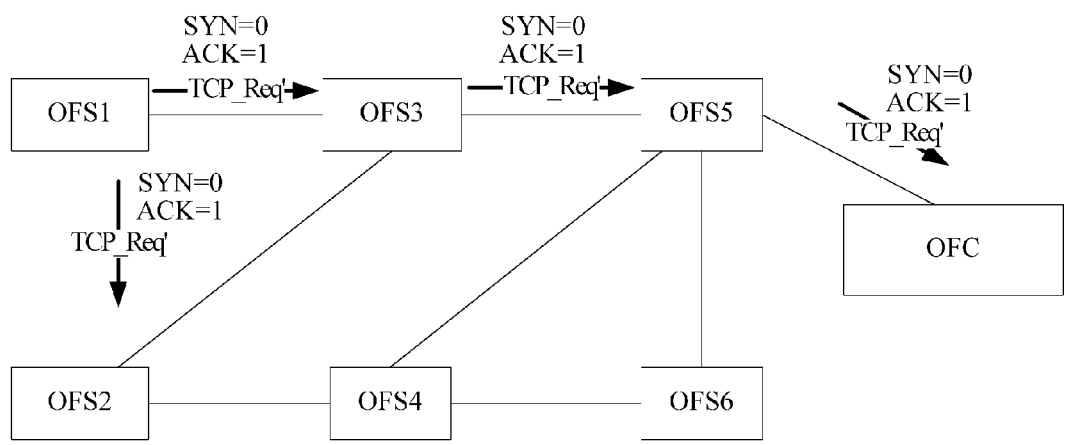
FIG. 13 is a schematic overview diagram of processing, by the OFS, the message of third TCP handshake according to Embodiment 3 of the present invention.
Figure 14:
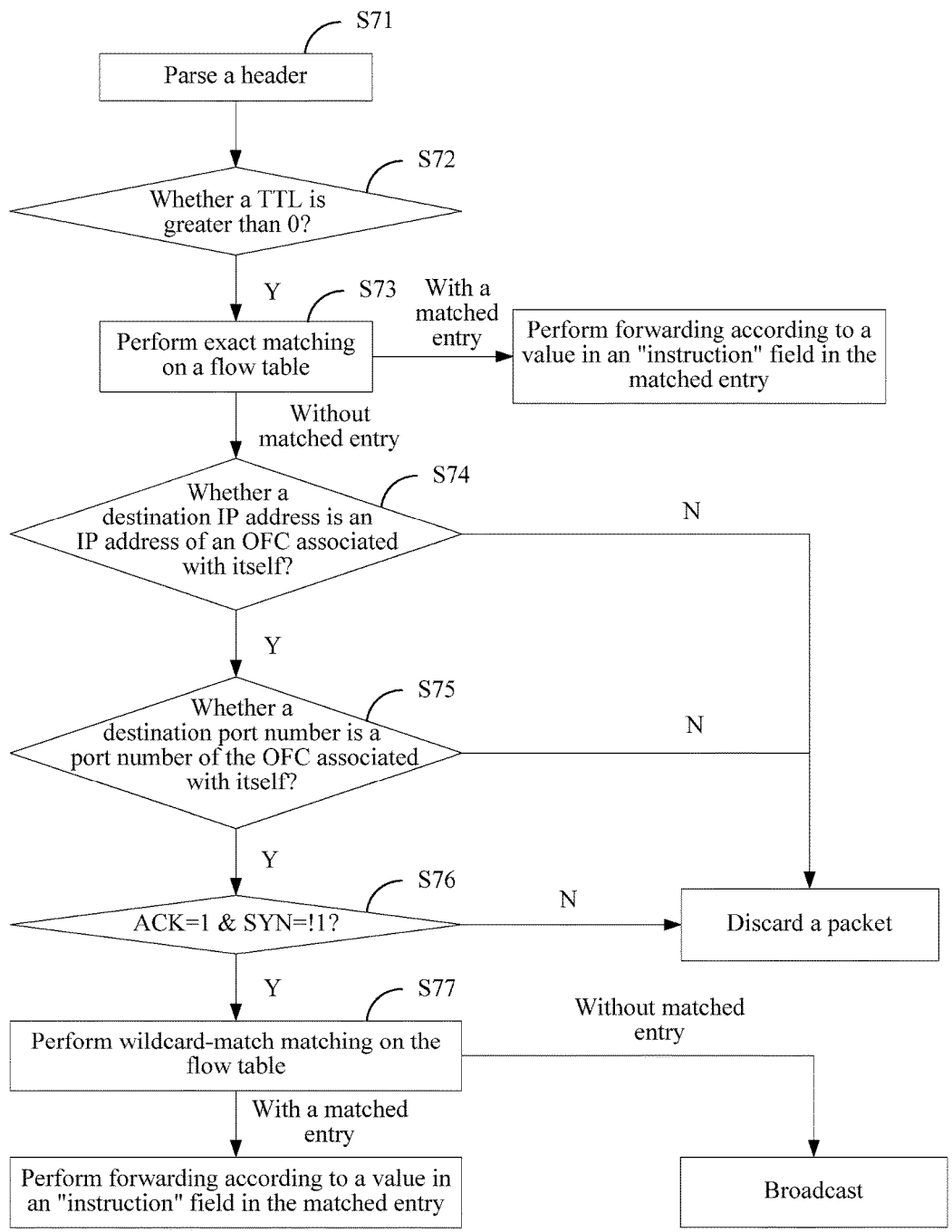
FIG. 14 is a flowchart of processing, by the OFS, the message of third TCP handshake according to Embodiment 3 of the present invention.

The first OFS broadcasts the constructed packet. Refer to FIG. 13, which is a schematic diagram of sending the message of third handshake from the first OFS to the OFC. Because the OFS1 still does not have a flow table, the OFS1 still needs to broadcast the packet, and after receiving the packed, each intermediate OFS may forward the packet from a specific port in a manner of performing wildcard-match matching on the flow table or forward the packet through broadcasting. Specifically, referring to FIG. 14, each OFS may perform processing according to the following method:

S71: Parse a header.

Information such as the TTL, the port number, and the IP address is obtained.

S72: Determine whether a TTL is greater than 0, and if yes, perform S73; otherwise, discard the packet.

S73: Perform exact matching on the flow table, if there is a matched entry, perform forwarding according to a value in an "instruction" field in the matched entry, and if there is no matched entry, perform S74.

The foregoing three steps may be processed by using hardware, to increase a processing speed, and a subsequent step may be processed by using software, to improve processing flexibility.

S74: Determine whether a destination IP address is an IP address of an OFC associated with itself, and if yes, perform S75; otherwise, discard the packet.

S75: Determine whether a destination port number is a port number of the OFC associated with itself, and if yes, perform S76; otherwise, discard the packet.

S76: Determine whether "ACK=1 & SYN!=1" (an ACK bit is 1, and a SYN bit is not 1), and if yes, perform S77; otherwise, discard the packet.

S77: Perform wildcard-match matching on the flow table, if the matching succeeds, forward the packet according to a value in an "instruction" field in a matched entry that succeeds in the matching, and if the matching fails, broadcast the packet.

A manner of performing the wildcard-match matching on the flow table in S77 can reduce resources and prevent a broadcast storm.

It should be noted that, a method for forwarding, by each OFS, the packet in a manner of performing the wildcard-match matching on the flow table is not necessarily limited in a specific application scenario of establishing a TCP connection, the manner of performing the "wildcard-match matching on the flow table" in this embodiment can be used as long as a scenario in which multiple OFSes are required to perform exchange and forwarding to an OFC is involved.

Embodiment 4

Based on the foregoing embodiments, a method of how each OFS adds path information to a control message is specifically described in this embodiment.

In this embodiment, a control message may use a user-defined control message in some protocols, or in order to better use existing resources and more easily implement, a control message in some existing protocols may be extended, so that the control message can carry path information. In this embodiment, a body field of an OPFT_HELLO message in the OpenFlow protocol is extended, so that the body field can carry path information.

The OpenFlow protocol is a protocol above a TCP/IP layer, and is carried in using the TCP/IP. The OPFT_HELLO message in the OpenFlow protocol is used for negotiating version information, and the body field thereof is reserved currently and is not used; therefore, the message may be extended based on the body field.

Path information is used for identifying information required by each node for forming a path in a network, a path (or, also referred to as a "routing path") in a network refers to a path on which a packet from a source node passes through another one or more nodes and arrives at a destination node (certainly, the packet may also directly arrive at the destination node without passing through an intermediate node). In the network, if that a packet is input from which port of a node thereof, and output from which port (herein, ports are all "physical" ports) is known, a segment of the path offered by the node for complete forming of the entire path in the path can be known, and if each node has such path information, the entire path from the source node to the destination node can be determined.

The path information may specifically include: an ID of the OFS, a port number (a physical port number) used by the OFS for receiving the control message, and a port number (a physical port number) used by the OFS for sending the control message. The ID of the OFS is used for identifying the OFS, and can enable an OFC to identify the OFS, for example, a user-defined unique value may be used as the ID, or some fields defined in an existing protocol may be used as the ID of the OFS, for example, a datapath ID commonly used in the OpenFlow protocol is used as the ID of the OFS. It should be noted that, sometimes, for each physical OFS, some virtualized operations may be performed to divide one physical OFS into several logical OFSes; in this case, an ID of the OFS may be considered as an ID of the several logical OFSes, and a procedure of processing, by the several logical OFSes, on each message remains consistent with a processing procedure of a single physical OFS.

In this embodiment, a triplet [datapath_id, input_no, output_no] is used to indicate the path information, if the OPFT_HELLO message received by an OFS already has the foregoing triplet, the OFS adds a triplet of this node based on the previous triplet, to form a triplet sequence, which may be expressed in the following manner:

<[datapath_id, input_no, output_no], [datapath_id, input_no, output_no] . . . > where:

datapath_id is used for identifying the OFS, the field is defined in the OpenFlow protocol, lower 48 bits thereof is a MAC address of a switch, and high 16 bits thereof is defined by an implementer (for example, an ID of a virtual network is used along to implement virtualization of the OFS);

input_no: a number of a port, to which a packet enters, of the OFS; and output_no: a number of a port, from which a packet is forwarded, of the OFS.

Figure 15:
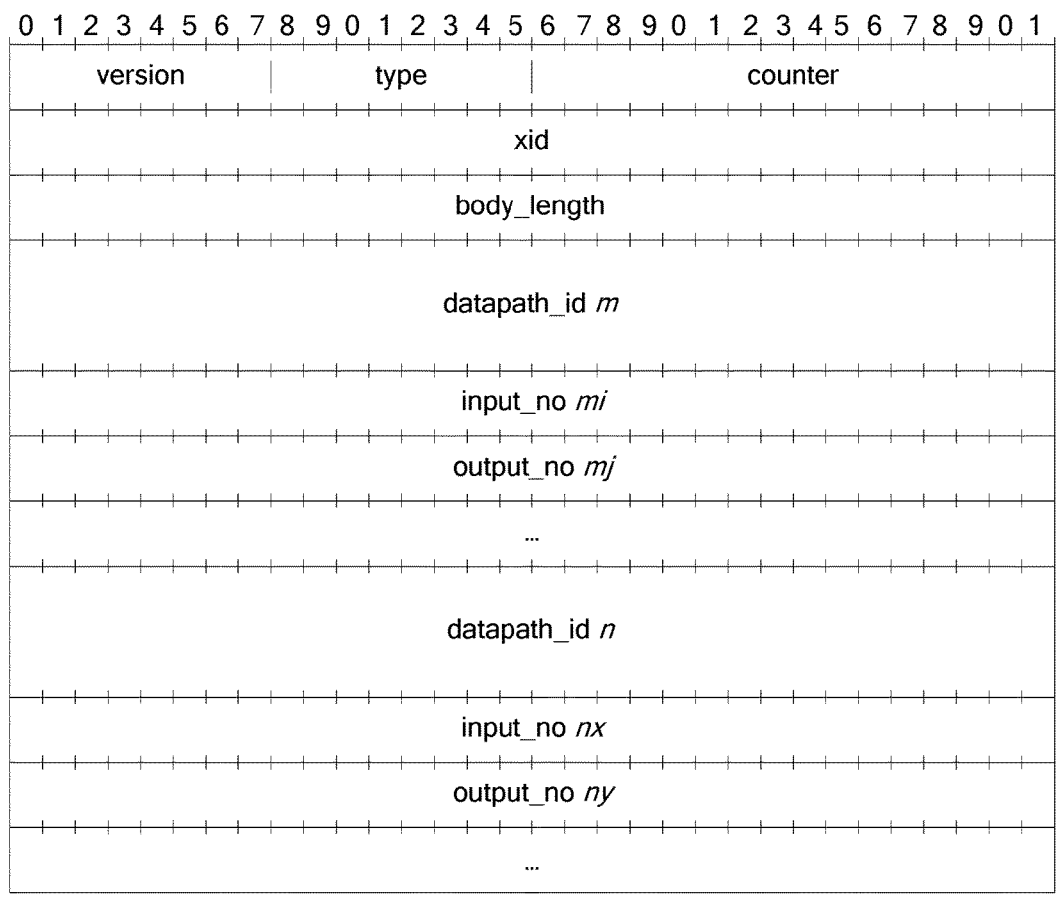
FIG. 15 is a schematic diagram of extending path information to a body field of an OPFT_HELLO message according to Embodiment 4 of the present invention.

Refer to FIG. 15, which is a schematic diagram of extending the path information to the body field of the OPFT_HELLO message in this embodiment. In the figure, a part below a body_length field is the path information, there may be multiple sets of path information, and each set of path information includes three parts: datapath_id, input_no, and output_no.

After an exchange of three-way TCP handshake is completed, the first OFS generates an OFPT_HELLO message, constructs a TCP/IP packet, and broadcasts the packet.

A header of the TCP/IP packet is set as follows:

dst_mac: a MAC address of the OFC;
src_mac: a MAC address of the first OFS;
src_ip: an IP address of the first OFS;
dst_ip: an IP address of the OFC;
src_port: a port number, used for listening to a TCP connection, of the first OFS;
dst_port: a port number, used for listening to a TCP connection, of the OFC;
an initial TTL value is set; and
payload in the packet carries the OFPT_HELLO message, a path triplet <[dpid_OFS1, --, output_no_OFS1]> is added to a body field of the OFPT_HELLO message, where dpid_OFS1 indicates a path ID, "--" indicates that a number of a port, to which the packet enters, of the OFS port is empty (because the OFS is an initial OFS, the OFS does not receive a packet from another OFS); and output_no_OFS1 indicates a number of a port, from which a packet is forwarded, of the first OFS (the OFS1).

After receiving the packet of the OFPT_HELLO message sent by the first OFS (the OFS1), the second OFS (the OFS3) adds path information to the body field of the OFPT_HELLO message. In this embodiment, when each OFS processes the packet of the OFPT_HELLO message, the OFS may also forward the packet based on the manner of performing the wildcard-match matching on the flow table mentioned in the Embodiment 2 and Embodiment 3, if the matching succeeds, the OFS may forward the packet from a specific port according to a value in an "instruction" field in a matched entry, and if the matching fails, the OFS may broadcast the packet or forward the packet from multiple ports that are defined in advance. Correspondingly, for a port from which the packet is forwarded, path information including information of the port is added to the body field of the OFPT_HELLO message. Specifically, after receiving the packet of the OFPT_HELLO message, the second OFS and each of other OFSes may forward the packet by using the following method, which, referring to FIG. 16, includes:

S91: Parse the packet to obtain information such as a TTL, a port number, an IP address, and a MAC address.

S92: Determine whether the TTL is greater than 0, and if yes, perform S93; otherwise, discard the packet.

S93: Perform exact matching on the flow table, if there is a matched entry, send the packet to a specified port according to a value in an "instruction" field in the matched entry, and if there is no matched entry, perform S94.

The foregoing steps may be implemented by using hardware, to increase a processing speed, and the following steps may be implemented by using software, to improve flexibility.

S94: Determine whether a destination IP address is an IP address of an OFC associated with itself, and if yes, perform S95; otherwise, discard the packet.

S95: Determine whether a destination port number is a port number of the OFC associated with itself, and if yes, perform S96; otherwise, discard the packet.

S96: Determine whether the packet carries a message of an OFPT type, and if yes, perform S97; otherwise, discard the packet. Specifically, the determining may be performed by parsing information in the payload in the packet.

S97: Determine whether a type of the message is an OFPT_HELLO message of the OFPT type, and if yes, perform S98; otherwise, discard the packet.

S98: Perform wildcard-match matching on the flow table, and if there is a matched entry, perform S99; otherwise, perform S910.

S99: Add path information of a current OFS to a body field of the OFPT_HELLO message, and perform S911.

S910: Acquire a currently available output port of the OFS, and perform S912.

Generally, all available output ports may be selected, and subsequently, broadcasting is performed from these ports. In an actual application, some ports may also be acquired to perform broadcasting (for example, some ports that are specified in advance are acquired), and it is not necessary to acquire all the available ports.

S911: Forward the packet of the OFPT_HELLO message according to a value in an "instruction" field in the matched entry, and the procedure ends.

S912: Add, to the body field of the OFPT_HELLO message, the path information of the current OFS corresponding to each available output port, for example, it is assumed that there are two output ports, which separately are a port11 and a port22, and it is assumed that datapath_id is datapath_id1 and input_no is input_no1, and then, the following information is added to the body field of the OFPT_HELLO message:

[datapath_id1, input_no1, port11], and [datapath_id1, input_no1, port22]

S913 continues to be performed.

S913: Acquire the available output port from step S910 for forwarding, and the procedure ends.

Figure 17:
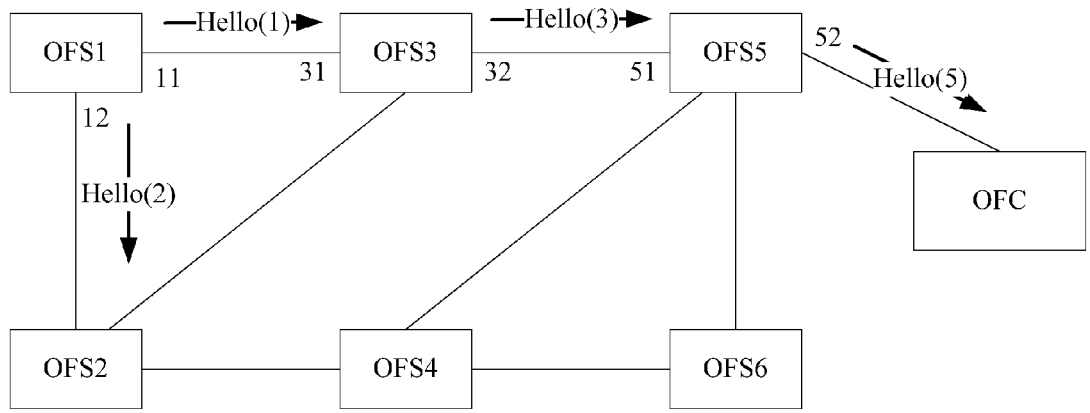
FIG. 17 is a schematic diagram of transmitting the OPFT_HELLO message to each OFS according to Embodiment 4 of the present invention.
Figure 18:
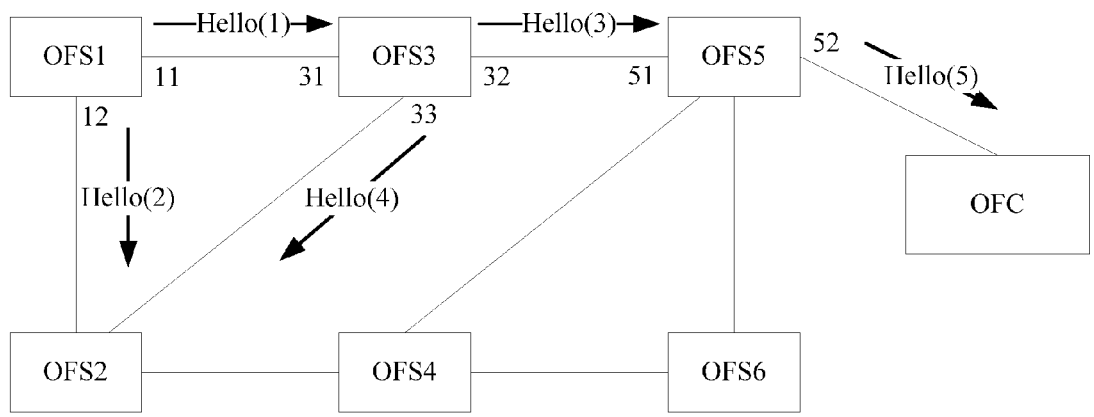
FIG. 18 is another schematic diagram of transmitting the OPFT_HELLO message to each OFS according to Embodiment 4 of the present invention.

Refer to FIG. 17 and FIG. 18, which are schematic diagrams of transmitting a OFPT_HELLO message to each OFS. In the figures, Hello indicates the OFPT_HELLO message (referred to as a "Hello message" for short below), a figure in the brackets after Hello indicates an OFPT_HELLO message to which different path information is added. A change in path information in a body field of a process of transmitting the OFPT_HELLO message is described by using FIG. 17 and FIG. 18.

Refer to FIG. 17, the OFS1 first broadcasts and sends a Hello message, and after receiving the Hello message, the OFS3 and the OFS5 perform wildcard-match matching on the flow table and then forward the Hello message by using a specific port (for example, the OFS3 uses a port 32); in this case, information in a body field of each Hello message is as follows:

Hello (1): <[dpid_OFS1, --, 11]>
Hello (2): <[dpid_OFS1, --, 12]>
Hello (3): <[dpid_OFS1, --, 11], [dpid_OFS3, 31, 32]>
Hello (4): <[dpid_OFS1, --, 11], [dpid_OFS3, 31, 33]>
Hello (5): <[dpid_OFS1, --, 11], [dpid_OFS3, 31, 33], [dpid_OFS5, 51, 52]>

Referring to FIG. 18, the OFS1 first broadcasts and sends a Hello message, the OFS3 performs wildcard-match matching on the flow table and finds that there is no matched entry, and therefore, also performs broadcasting, and after receiving the Hello message, the OFS5 performs wildcard-match matching on the flow table and then forwards the Hello message by using a specific port (52); in this case, information in a body field of each Hello message is as follows:

Hello (1): <[dpid_OFS1, --, 11]>
Hello (2): <[dpid_OFS1, --, 12]>
Hello (3): <[dpid_OFS1, --, 11], [dpid_OFS3, 31, 32]>
Hello (4): <[dpid_OFS1, --, 11], [dpid_OFS3, 31, 33]>
Hello (5): <[dpid_OFS1, --, 11], [dpid_OFS3, 31, 33], [dpid_OFS5, 51, 52]>

The OFC knows, according to path information carried in the received Hello (5) message, that the message is first sent from a port 11 of the OFS1 to a port 31 of the OFS3, then, is sent from the port 32 of the OFS3 to a port 51 of the OFS5, and finally, is sent from the port 52 of the OFS5 to the OFC. Correspondingly, a reverse path (a path from the OFC to the OFS1) can also be determined (for example, being sent from the port 51 of the OFS5 to the port 32 of the OFS3).

It should be noted that, in another embodiment, extension of the body field of the OFPT_HELLO message may not depend on the foregoing embodiments, for example, the foregoing steps of "first establishing a reliable connection", "first performing exact matching and then performing wildcard-match matching", and the like may be not used, but a focus is only put on that the body field of the OFPT_HELLO message is used for carrying the path information after being extended, and for details, reference may be made to a description in Embodiment 12.

Embodiment 5

Based on the foregoing embodiments, this embodiment provides a method for delivering a flow entry (a flow entry) after an OFC acquires path information.

Figure 16:
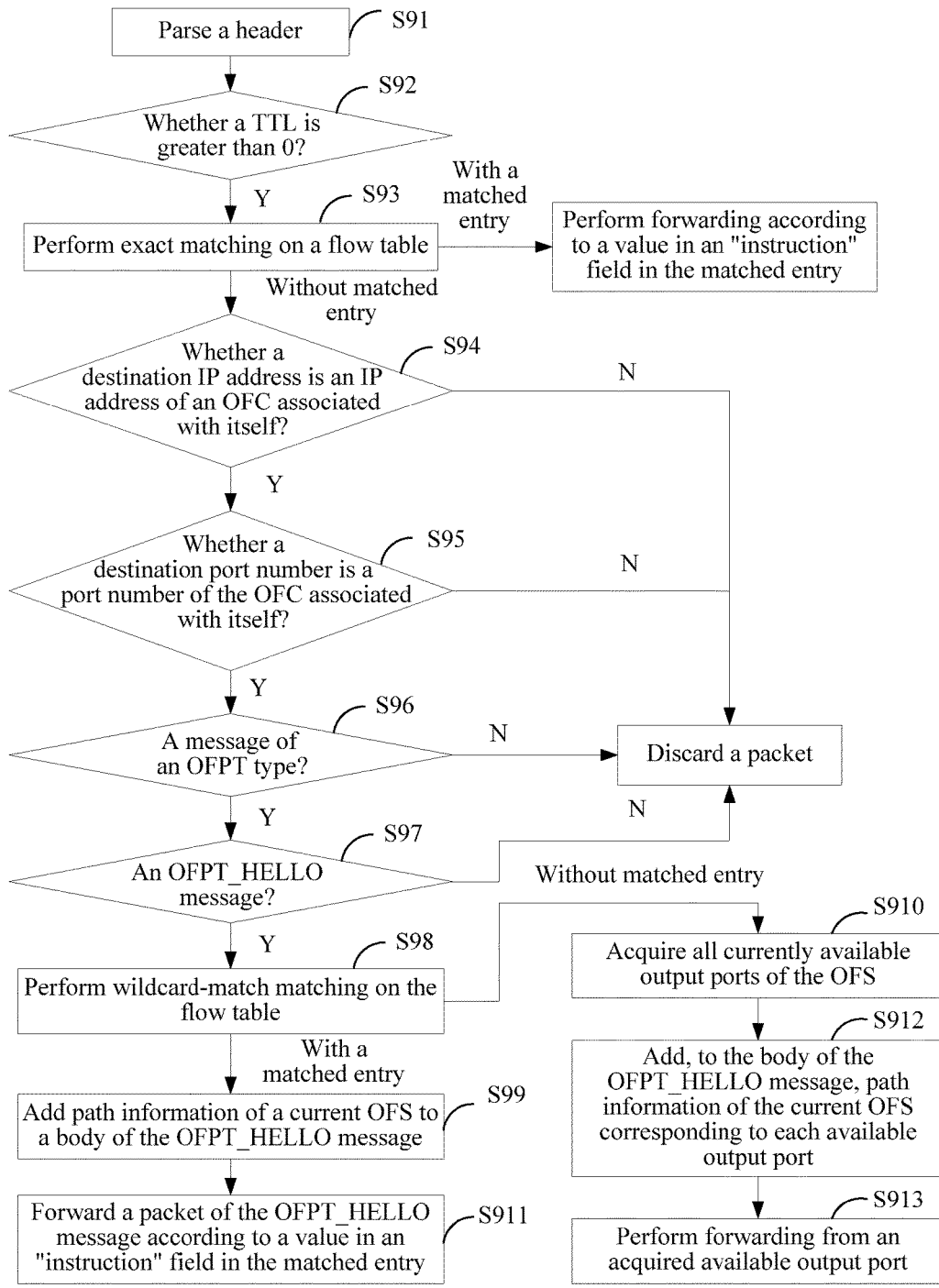
FIG. 16 is a flowchart of processing, by an OFS, an OPFT_HELLO message according to Embodiment 4 of the present invention.

A function of a flow entry is to enable an OFS not to need to perform broadcasting, and exact forwarding can be implemented by using the flow entry, for example, currently, in the schematic diagram in FIG. 16, a flow entry is delivered to the OFS1, the OFS3, and the OFS5, so that a message from the OFS1 to the OFC can be transmitted to the OFC through a unidirectional path: OFS1→OFS3→OFS5→OFC (or the message may be reversely transmitted) without a need of broadcasting (for example, the OFS1 sends the message to the OFS2, and the OFS3 sends the message to the OFS2).

After acquiring the path information, the OFC formulates a flow entry required by each OFS. For example, for a demand that the OFS1 needs to send a packet to the OFC in FIG. 16, there are several main related fields in a flow entry in the OFS1, for example, a destination IP, destination MAC, and a destination port (a software port) are an IP, MAC, and a port of the OFC; a source IP, source MAC, and a source port (a software port) are an IP, MAC, and a port of the OFS1, and an instruction is a port (a physical port) number 11. For a flow entry in another OFS, it is similar, and it only needs to correspondingly adjust various pieces of destination/source information and a port number in an instruction.

Refer to FIG. 19, which is a schematic diagram of flow entries for some OFSes. In FIG. 19, it is assumed that an OFC collects path information: OFS1→OFS3→OFS5→OFC, and then, the OFC may send a flow entry to a related OFS, for example, a forward flow entry may be delivered to an OFS1, an OFS3, and an OFS5, so that a packet can be forwarded from the OFS1 to the OFC; and for the OFS3, the OFS5 delivers a reverse flow entry, so that a packet can be forwarded from the OFC to the OFS1 and the OFS3.

In FIG. 19, a MAC address of each OFS is indicated by a "MAC_OFS name", for example, MAC_OFS1 indicates a MAC address of the OFS1. It is assumed that an IP address of the OFS1 is 192.169.1.5, it is assumed that an IP address of the OFS3 is 192.168.1.12, it is assumed that an IP address of the OFS5 is 192.168.1.9, it is assumed that an IP address of the OFC is 192.168.1.21, it is assumed that a TCP port number of each OFS is 6633, and it is assumed that a TCP port number of the OFC is 36653. Fields separately are a switch port (an input port of a Switch), destination MAC, source MAC, a source IP, a destination IP, a source port, a destination port, and instruction executed when matching succeeds, and the left-most flow_entry indicates a flow entry.

In FIG. 19, flow_entry(51) to flow_entry(55) are specific to the OFS5, flow_entry(31) to flow_entry(33) are specific to the OFS3, and flow_entry(11) is specific to OFS1. Specifically, using a flow entry in the OFS3 as an example, flow_entry(31) is used for forwarding a packet that is sent by the OFC to the OFS3, flow_entry(32) is used for forwarding a packet that is sent by the OFC to the OFS1, and flow_entry (33) is used for forwarding a packet that is sent by the OFS1 to the OFC.

It should be noted that, an example in FIG. 19 only lists some related fields in a flow entry, values of other fields in the flow entry may be obtained by a person skilled in the art very easily with reference to an actual application scenario, details are not described herein again.

When the OFC delivers a flow table, the OFC may deliver a flow entry to each OFS in ascending order of hop counts of the OFS and the OFC; in this way, after receiving the flow entry, an OFS with a smallest hop count (nearest) can perform exact forwarding on a subsequent packet without a need of broadcasting. Certainly, if broadcasting overheads are not considered, the flow entry may be delivered through broadcasting.

Figure 20:
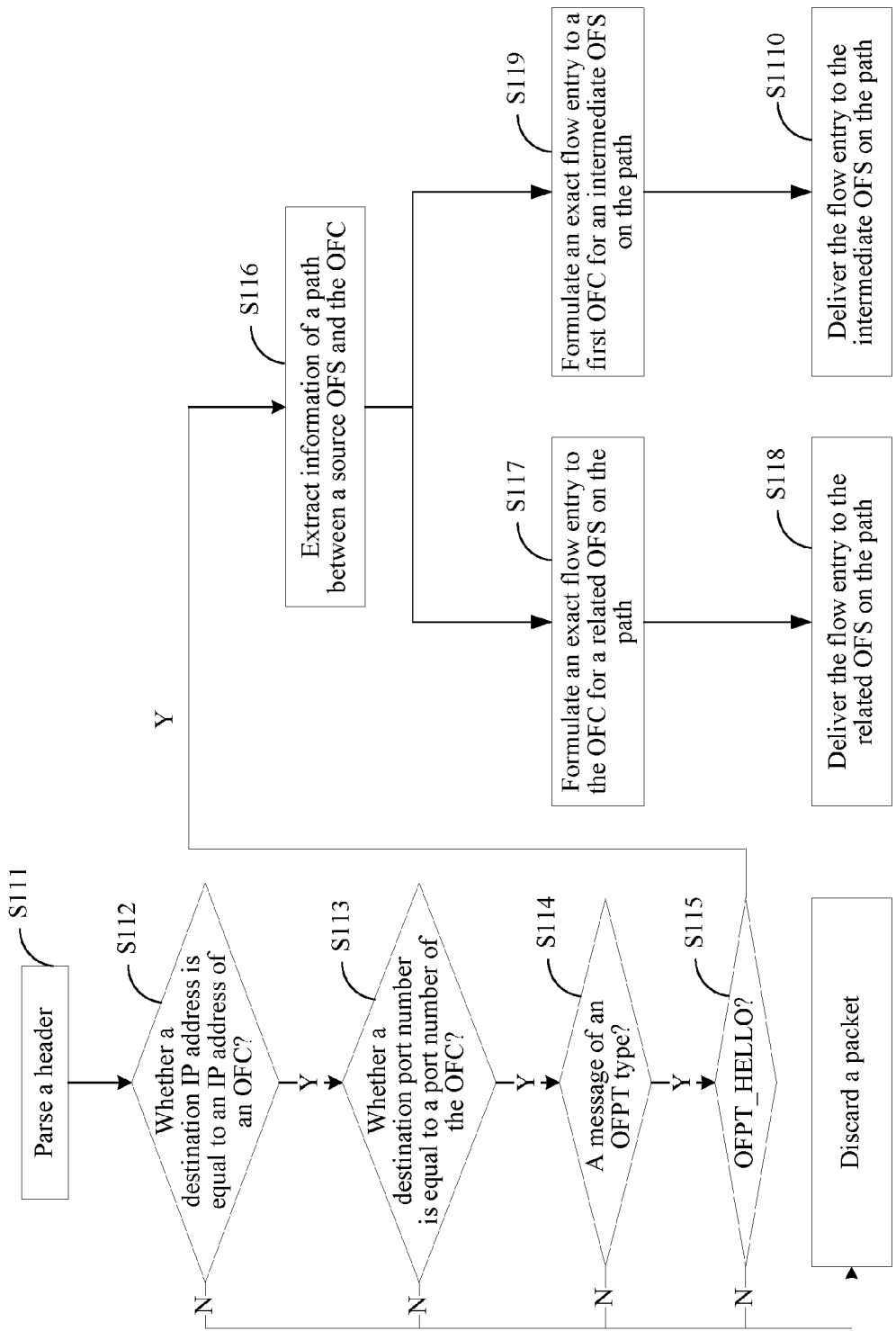
FIG. 20 is a flowchart of delivering, by an OFC, a flow entry after the OFC receives a Hello message according to Embodiment 5 of the present invention.

Referring to FIG. 20, an example in which the OFC delivers a flow entry after receiving a Hello message is used, and a main procedure includes:

S111: Parse a header.

S112: Determine whether a destination IP address in a packet is equal to an IP address of the OFC, and if yes, perform S113; otherwise, discard a packet.

S113: Determine whether a destination port number in the packet is equal to a port number, for listening to a TCP connection, of the OFC, and if yes, perform S114; otherwise, discard the packet.

S114: Determine whether the packet carries a message of an OFPT type, and if yes, perform S115; otherwise, discard the packet.

S115: Determine whether a type of an OFPT message is an OFPT_HELLO message, and if yes, perform S116; otherwise, discard the packet.

S116: Extract information of a path between a source OFS and the OFC, and subsequently perform step S117 and step S119 of formulating a flow entry (S117 is specific to a flow entry for a forward path, and S119 is specific to a reverse path).

S117: Formulate a flow entry to the OFC for a related OFS on the path, and perform S118.

The flow entry to the OFC is formulated for a first OFS and an intermediate OFS for forwarding.

S118: Deliver the flow entry to the related OFS on the path.

The OFC may deliver or broadcast a flow entry to each OFS in ascending order of hop counts of the OFS and the OFC on the path; and the procedure ends.

If the OFC cannot find a corresponding IP address and MAC address by using datapath_id in the path information, the OFC sets a MAC address in the delivered flow entry to a pseudo MAC address (for example, FF-FF-FF-FF-FF-FF), if it is an IPv4 address, the OFC sets an address corresponding to datapath_id to an IPv4 multicast address or broadcast address, and if it is an IPv6 address, the OFC sets the address corresponding to datapath_id to an IPv6 multicast address.

S119: Formulate a flow entry to a first OFS for an intermediate OFS on the path, and perform S1110.

The intermediate OFS refers to an OFS that is configured to forward, to the first OFS, the packet sent by the OFC.

S1110: Deliver the flow entry to the intermediate OFS on the path, and similar to S118, the flow entry may be delivered or broadcast based on a hop count, and the procedure ends.

Similarly, in a process of performing the branch, if the OFC cannot find a corresponding IP address and MAC address by using datapath_id in the path information, the OFC sets a MAC address in the delivered flow entry to a pseudo MAC address (for example, FF-FF-FF-FF-FF-FF), if it is an IPv4 address, the OFC sets an address corresponding to datapath_id to an IPv4 multicast address or broadcast address, and if it is an IPv6 address, the OFC sets the address corresponding to datapath_id to an IPv6 multicast address.

A method for constructing and delivering a flow entry is described in detail below.

Method 1

The existing OpenFlow protocol is followed, a flow entry is carried by using an OFPT_FLOW_MOD message, and each OFPT_FLOW_MOD message includes only one flow_entry.

Using the OpenFlow Spec 1.2 specification as an example, the structure of an OFPF_FLOW_MOD message is as follows:

```
struct ofp_flow_mod {
struct ofp_header header;
uint64_t cookie;
uint64_t cookie_mask;
uint8_t table_id;
uint8_t command;
uint16_t idle_timeout;
uint16_t hard_timeout;
uint16_t priority;
uint32_t buffer_id;
uint32_t out_port;
uint32_t out_group;
uint16_t flags;
uint8_t pad[2];
struct ofp_match match;//defines a struct variable in a "match field".
struct ofp_instruction instructions[0];//defines a struct variable in
an "instruction".
};
struct ofp_header {
    uint8_t version;
    uint8_t type;
    uint16_t length;
    uint32_t xid;
}
```

The OFC constructs a TCP/IP packet used for carrying the OFPT_FLOW_MOD message, and a packet header is set as follows:

dst_mac: a MAC address of an OFS;
src_mac: a MAC address of the OFC;
src_ip: an IP address of the OFC;
dst_ip: an IP address of the OFS;
src_port: a port, used for listening, of the OFC;
dst_port: a port number, used for listening to a TCP connection, of the OFS; and
an initial TTL value is set.

The OFS refers to an OFS that needs to acquire a flow entry on the path, and for example, may be the first OFS or an intermediate OFS for forwarding.

Figure 21:
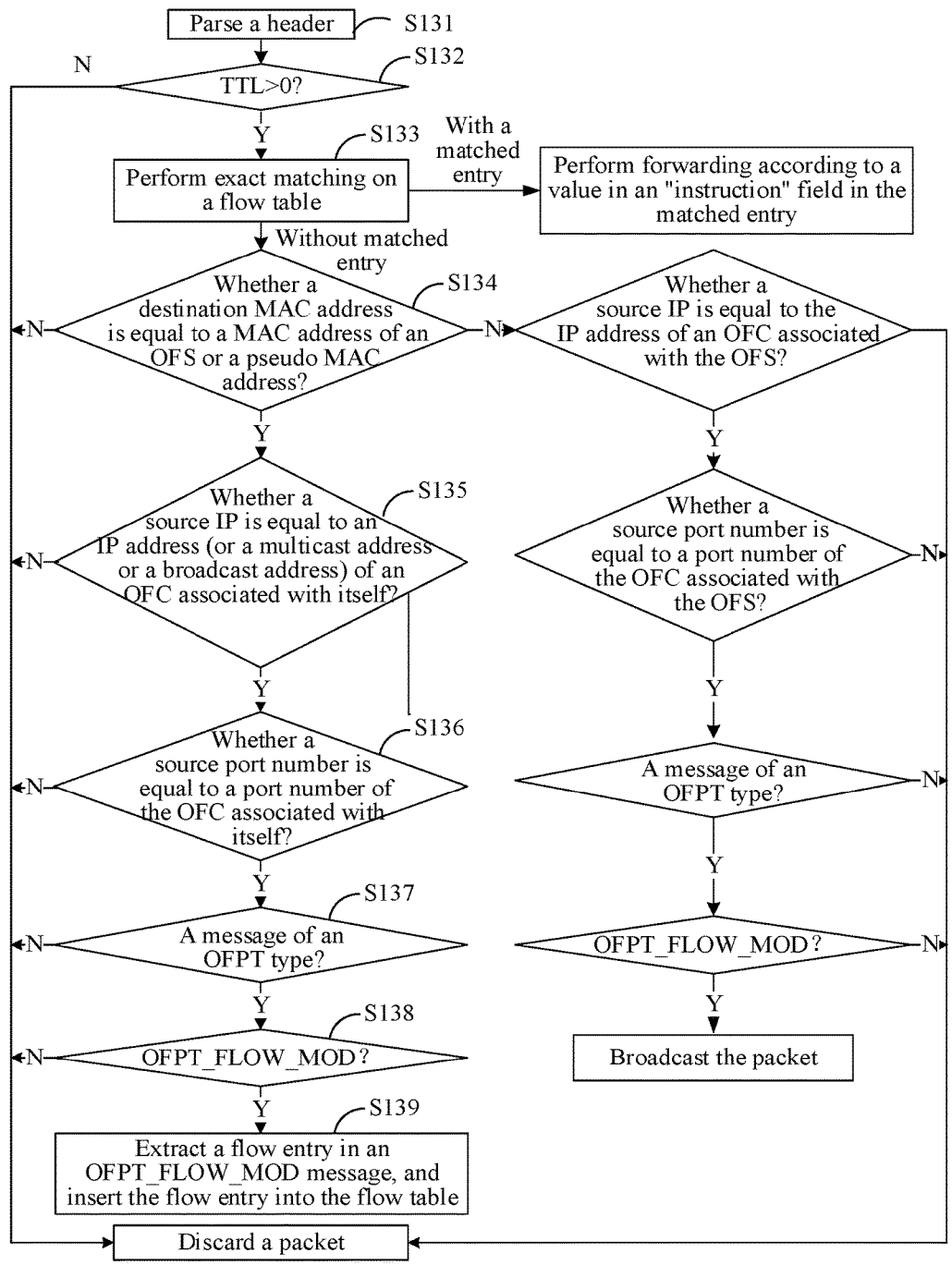
FIG. 21 is a flowchart of processing after the OFS receives the flow entry delivered by the OFC according to Embodiment 5 of the present invention.

After constructing the packet completely, the OFC sends the packet to each OFS, and referring to FIG. 21, after receiving the packet, each OFS performs the following processing:

S131: Parse a header.

S132: Determine whether a TTL is greater than 0, and if yes, perform S133; otherwise, discard the packet.

S133: Perform exact matching on a flow table, if there is a matched entry, perform forwarding according to a value in an "instruction" field in the matched entry, and if there is no matched entry, perform S134.

The foregoing steps may be implemented by using hardware, and the following steps may be implemented by using software.

S134: Determine whether a destination MAC address is a MAC address of the OFS or a pseudo MAC address (for example, all Fs), if yes, perform S135; otherwise, perform S1310.

S135: Determine whether a source IP is an IP address (or a multicast address or a broadcast address) of an OFC associated with itself, and if yes, perform S136; otherwise, discard the packet.

S136: Determine whether a source port number is a port number of the OFC associated with itself, and if yes, perform S137; otherwise, discard the packet.

S137: Determine whether it is a message of an OFPT type, and if yes, perform S138; otherwise, discard the packet.

S138: Determine whether a type of an OFPT message is OFPT_FLOW_MOD, and if yes, perform S139; otherwise, discard the packet.

S139: Extract a flow entry in the OFPT_FLOW_MOD message, and insert the flow entry into the flow table. Specifically, the OFS determines whether the OFPT_FLOW_MOD includes datapath_id of the OFS, if yes, the OFS adds one or more flow entries that are associated with the datapath and exactly match to the flow table, and if a value of a MAC field included in the OFPT_FLOW_MOD is equal to FF-FF-FF-FF-FF-FF, and an IP address corresponding to a MAC address is a multicast address or a broadcast address, the OFS updates a MAC address and an IP address of the switch to the flow entry, and the procedure ends.

S1310: Determine whether a source IP is an IP address of the OFC associated with itself, and if yes, perform S1311; otherwise, discard the packet.

S1311: Determine whether a source port number is a port number of the OFC associated with itself, and if yes, perform S1312; otherwise, discard the packet.

S1312: Determine whether it is a message of an OFPT type, and if yes, perform S1313; otherwise, discard the packet.

S1313: Determine whether a type of an OFPT message is OFPT_FLOW_MOD, and if yes, perform S1314; otherwise, discard the packet.

S1314: Broadcast the packet, and the procedure ends.

Method 2

Another constructing method is extending an OFPT_FLOW_MOD message in the OpenFlow protocol, so that one OFPT_FLOW_MOD message can include multiple flow_entries related to an OFS. Referring to the following struct, a struct: of p_multi_flow_mod_list is an extended part in the OFPT_FLOW_MOD message:

```
struct ofp_multi_flow_mod_list {
    ofp_multi_flow_mod head;
    ofp_multi_flow_mod tail;
    uint8_t flow_entry_number;
}; //extended struct
struct ofp_multi_flow_mod {
    struct ofp_flow_mod;
    struct ofp_multi_flow_mod *prior, *next;
}; //extended struct
struct ofp_header {
    uint8_t version;
    uint8_t type;
    uint16_t length;
    uint32_t xid;
};
struct ofp_flow_mod_body {
    uint64_t cookie;
    uint64_t cookie_mask;
    uint8_t table_id;
    uint8_t command;
    uint16_t idle_timeout;
    uint16_t hard_timeout;
    uint16_t priority;
    uint32_t buffer_id;
    uint32_t out_port;
    uint32_t out_group;
    uint16_t flags;
    uint8_t pad[2];
    struct ofp_match match;
    struct ofp_instruction instructions[0];
};
```

A forwarding procedure is similar to a forwarding procedure in the method 1, but in step S139, multiple flow entries may be extracted one time.

Method 3

An OFPT_FLOW_MOD message in the OpenFlow protocol is extended, so that one OFPT_FLOW_MOD message can include multiple flow entries (for example, all flow_entries listed in FIG. 30) of all related OFSes (for example, the OFS1, the OFS3, and the OFS5) on a path (using a path formed by the OFS1, the OFS3, the OFS5, and the OFC as an example). Because sending to all devices on the path is performed, a datapath_id identifier is added to a struct: ofp_flow_mod_body in this embodiment, so as to identify a device on the path, so that information on the path can be forwarded subsequently:

```
struct ofp_multi_flow_mod_list {
    ofp_multi_flow_mod head;
    ofp_multi_flow_mod tail;
    uint8_t flow_entry_number;
}; //extended struct
struct ofp_multi_flow_mod {
    struct ofp_flow_mod;
    struct ofp_multi_flow_mod *prior, *next;
}; //extended struct
struct ofp_header {
    uint8_t version;
    uint8_t type;
    uint16_t length;
    uint32_t xid;
};
struct ofp_flow_mod_body{
    uint64_t datapath_id; //extended item
    uint64_t cookie;
    uint64_t cookie_mask;
    uint8_t table_id;
    uint8_t command;
    uint16_t idle_timeout;
    uint16_t hard_timeout;
```

-continued

```
    uint16_t priority;
    uint32_t buffer_id;
    uint32_t out_port;
    uint32_t out_group;
    uint16_t flags;
    uint8_t pad[2];
    struct ofp_match match;
    struct ofp_instruction instructions[0];
};
```

Payload in a packet carries the extended OFPT_FLOW_MOD and includes a flow entry related to each switch (the OFS1, the OFS3, and the OFS5) on the path (using the path formed by the OFS1, the OFS3, the OFS5, and the OFC as an example).

After receiving a TCP/IP packet, if the OFS determines that a message type is OFPT_FLOW_MOD, the OFS extracts several flow_entries related to the OFS (that is, ofp_flow_mod_body. datapath_id is equal to datapath_id of the OFS) from the TCP/IP packet, inserts the several flow_entries into an exact table indicated by table_id, and then, continues to broadcast the packet until OFSes involved in the OFPT_FLOW_MOD all receive the message.

Embodiment 6

Figure 22:
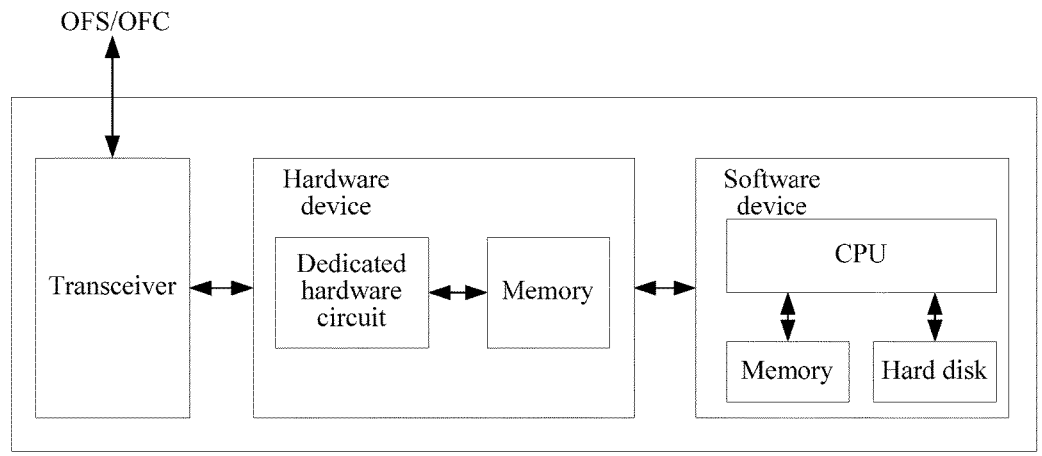
FIG. 22 is a diagram of a hardware structure of an OFS according to Embodiment 6 of the present invention.

Based on the foregoing embodiments, this embodiment provides a hardware structure of an SDN switch, which, referring to FIG. 22, using a hardware structure of an OFS as an example, may include:

a transceiver, a hardware device, and a software device.

The transceiver is a hardware circuit configured to send and receive a packet, or may be manufactured into a physical chip with the hardware device.

The hardware device may also be referred to as a "hardware processing module", or more simply, may also be referred to as "hardware" for short, and is configured to process a received packet. The hardware device mainly includes a dedicated hardware circuit (which may also be used in combination with another accessory device such as a memory) based on an FPGA, an ASIC, and the like to implement a hardware circuit with some specific functions, a processing speed thereof is generally much higher than that of a general CPU, but a function is very difficult to change after being customized; therefore, implementation is not flexible and generally it is configured to process some fixed functions. It should be noted that, in an actual application, the hardware device may also include an MCU (a microprocessor such as a single-chip microcomputer), or a processor such as a CPU, but a main function of these processors is not completing processing on big data but is mainly used to perform some control. In this application scenario, a system combined by these devices is the hardware device.

The software device (or, also referred to as "software" for short) mainly includes a general CPU and some accessory devices (a storage device such as a memory or a hard disk), the CPU may have a corresponding processing function through software programming, and when the software device is implemented by using software, the software device may be flexibly configured according to a service demand, but a speed is generally much lower than that of the hardware device. After the software completes processing, data that is processed completely may be sent by the hardware device by using the transceiver, or data that is processed completely may be sent to the transceiver by using an interface connected to the transceiver.

In this embodiment, the hardware device may be configured to perform the exact matching mentioned in the foregoing embodiments, and the software device is configured to perform the wildcard-match matching mentioned in the foregoing embodiments. That is, after receiving a packet through a sending and receiving circuit, an OFS also sends the packet to the hardware device for processing, if matching succeeds, the OFS forwards the packet, and if the matching fails, the OFS sends the packet to the software device for processing (for example, a packet_in message defined in the OpenFlow protocol may be generated, and the packet is sent to the software device).

Both the hardware and the software store an exact flow table, the two may retain a mapping relationship, which is described in detail in Embodiment 2 and is not described in detail again herein.

By using a method combining software and hardware in this embodiment, a processing speed is ensured and flexibility is maintained.

Figure 23:
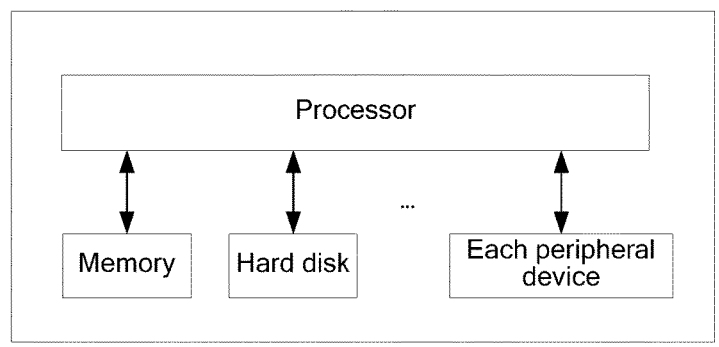
FIG. 23 is a schematic diagram of implementing an OFS by using a software device according to Embodiment 6 of the present invention.

Certainly, this embodiment is not limited to being implemented by using a software device, for example, refer to FIG. 23, which is a solution implemented by using hardware, that is, a processor runs code stored in a memory (such as a hard disk or a memory) to perform a corresponding operation.

Embodiment 7

Figure 24:
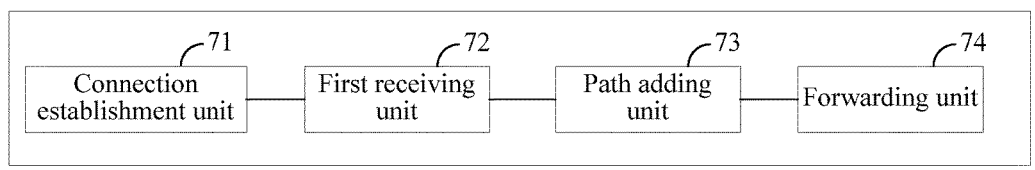
FIG. 24 is a schematic structural diagram of an SDN switch according to Embodiment 7 of the present invention.

Based on the foregoing embodiments, referring to FIG. 24, this embodiment provides an SDN switch, where the SDN switch is a second SDN switch, the second SDN switch is connected to a first SDN switch and an SDN controller, to form an SDN network, the SDN controller communicates with each SDN switch in an inband communication manner, and the second SDN switch includes:

a connection establishment unit 71, configured to perform message exchange between the first SDN switch and the SDN controller, so that a reliable connection is established between the first SDN switch and the SDN controller;

a first receiving unit 72, configured to receive a first control message sent by the first SDN switch and used for collecting path information, where the first control message carries path information of the first SDN switch, and the first control information is carried in a packet corresponding to a protocol used by the reliable connection;

a path adding unit 73, configured to add path information of the second SDN switch to the first control message received by the first receiving unit, to obtain an updated first control message; and a forwarding unit 74, configured to forward, to the SDN controller, the updated first control message to which the path adding unit adds the path information of the second SDN switch, so that after receiving a finally updated first control message including the updated first control message, the SDN controller determines a routing path between the SDN controller and the first SDN switch according to path information added by each SDN switch to the finally updated first control message, and delivers an exact flow entry to the first SDN switch according to the routing path.

In this embodiment, the reliable connection established between the first SDN switch and the SDN controller includes a TCP connection, and the packet corresponding to the protocol used by the reliable connection is a TCP/IP packet; and the connection establishment unit is specifically configured to forward a TCP/IP packet carrying a message of three-way TCP handshake performed between the first SDN switch and the SDN controller, so that a TCP connection is established between the first SDN switch and the SDN controller.

Figure 25:
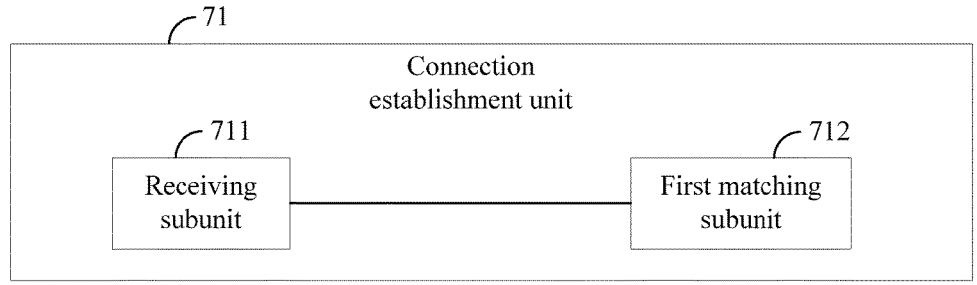
FIG. 25 is a schematic structural diagram of a connection establishment unit in the SDN switch according to Embodiment 7 of the present invention.

In this embodiment, the second SDN switch includes an exact flow table, where the exact flow table includes multiple exact flow entries, and each exact flow entry includes multiple match fields and an instruction corresponding to the multiple match fields;

referring to FIG. 25, the connection establishment unit 71 specifically includes:

a receiving subunit 711, configured to receive a first TCP/IP packet sent from the first SDN switch;

a feature information acquiring subunit, configured to acquire multiple pieces of feature information in the first TCP/IP packet received by the receiving subunit, where the feature information corresponds to match fields in an exact flow entry in the exact flow table in the second SDN switch; and a first matching subunit 712, configured to perform exact matching between the multiple pieces of feature information in the first TCP/IP packet that are acquired by the feature information acquiring subunit and the exact flow table in the second SDN switch, if the exact matching fails and it is determined that the received first TCP/IP packet carries a first type of TCP handshake message, perform wildcard-match matching between one or more pieces of feature information in the multiple pieces of feature information and the exact flow table, where a forwarding route determined by using an instruction corresponding to one or more match fields used during the wildcard-match matching is a route that can finally reach the SDN controller, and if the wildcard-match matching succeeds, process, according to an instruction in an exact flow entry that succeeds in the wildcard-match matching, the received first TCP/IP packet that carries the first type of TCP handshake message, so as to forward the first TCP/IP packet to the SDN controller, where the first type of TCP handshake message is a message of first TCP handshake or a message of third TCP handshake.

In this embodiment, the receiving subunit is further configured to receive a third TCP/IP packet sent from the SDN controller, where the third TCP/IP packet carries a message of second handshake;

the feature information acquiring subunit is further configured to acquire multiple pieces of feature information in the third TCP/IP packet received by the receiving subunit, where the feature information corresponds to match fields in an exact flow entry in the exact flow table in the second SDN switch; and the first matching subunit is further configured to perform exact matching between the multiple pieces of feature information in the third TCP/IP packet that are acquired by the feature information acquiring subunit and the exact flow table in the second SDN switch, if the exact matching succeeds, perform forwarding according to an instruction in an exact flow entry that succeeds in the matching, and if the matching fails and it is determined that the third TCP/IP packet carries the message of second TCP handshake, broadcast the third TCP/IP packet.

Figure 26:
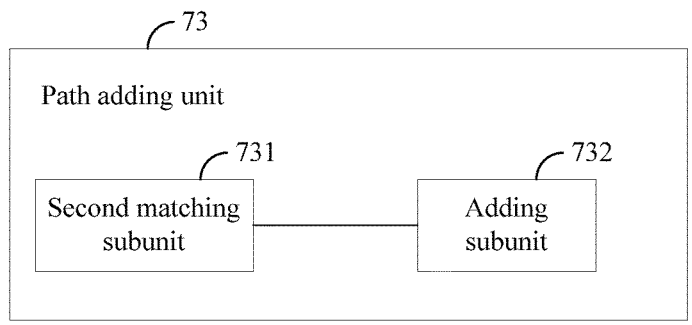
FIG. 26 is a schematic structural diagram of a path adding unit in the SDN switch according to Embodiment 7 of the present invention.
Figure 27:
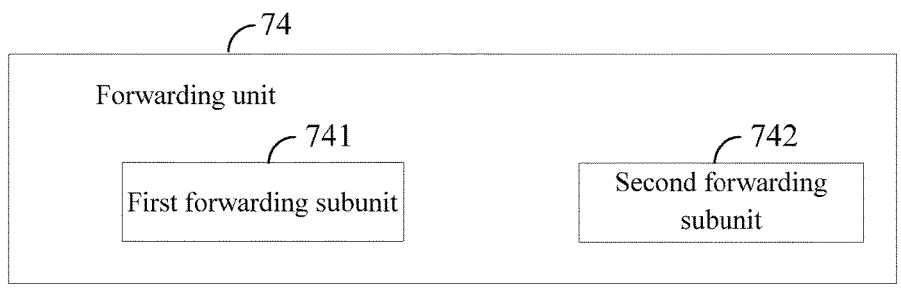
FIG. 27 is a schematic structural diagram of a forwarding unit in the SDN switch according to Embodiment 7 of the present invention.

In this embodiment, the second SDN switch stores the exact flow table, where the exact flow table includes multiple exact flow entries, and each exact flow entry includes multiple match fields and an instruction corresponding to the multiple match fields;

the first receiving unit is specifically configured to:

receive a second TCP/IP packet sent from the first SDN switch and carrying the first control message, where the second TCP/IP packet includes multiple pieces of feature information, where the feature information corresponds to match fields in an exact flow entry in the exact flow table in the second SDN switch; and referring to FIG. 26, the path adding unit includes:

a second matching subunit 731, configured to perform exact matching according to the feature information in the second TCP/IP packet received by the second receiving subunit and the exact flow table, and after the exact matching fails and it is determined that the received second TCP/IP packet carries the first control message, perform wildcard-match matching according to one or more pieces of feature information in the TCP/IP packet and the exact flow table, where a forwarding route determined by using an instruction corresponding to one or more match fields used during the wildcard-match matching is a route that can finally reach the SDN controller; and an adding subunit 732, configured to: when the wildcard-match matching of the second matching subunit succeeds, add the path information of the second SDN switch to the first control message, to obtain the updated first control message to which the path information of the second SDN switch is added; and Referring to FIG. 27, the forwarding unit 74 includes a first forwarding subunit 741, configured to forward the updated first control message obtained after processing of the adding subunit to the SDN controller according to an instruction in an exact flow entry that succeeds in the wildcard-match matching.

In this embodiment, the adding subunit 732 is further configured to: if the wildcard-match matching of the second matching subunit 731 fails, acquire an available output port of the second SDN switch, and add the path information, of the second SDN switch, corresponding to each available output port to the first control message; and referring to FIG. 27, the forwarding unit 74 further includes a second forwarding subunit 742, configured to forward, to the SDN controller from the available output port, the updated first control message to which the adding subunit adds the path information, of the second SDN switch, corresponding to each available output port.

Similar to the embodiments mentioned above, in this embodiment, the SDN network may be implemented based on the OpenFlow protocol; in this scenario, the first control message includes an OFPT_HELLO message defined in the OpenFlow protocol, and a body field of the OFPT_HELLO message is used for carrying the path information after being extended;

the first receiving unit is specifically configured to receive, by using the reliable connection established by the connection establishment unit, the OFPT_HELLO message sent by the first SDN switch and used for collecting the path information, where the extended body field, used for carrying the path information, in the OFPT_HELLO message carries the path information of the first SDN switch;

the path adding unit is specifically configured to add the path information of the second SDN switch to the extended body field, used for carrying the path information, in the OFPT_HELLO message received by the first receiving unit, to obtain an updated OFPT_HELLO message; and the forwarding unit is specifically configured to forward, to the SDN controller, the updated OFPT_HELLO message to which the path adding unit adds the path information of the second SDN switch, so that after receiving a finally updated OFPT_HELLO message including the updated OFPT_HELLO message, the SDN controller determines, according to the path information added by each SDN switch to the finally updated OFPT_HELLO message, the routing path between the SDN controller and the first SDN switch, and delivers an exact flow entry to the first SDN switch according to the routing path.

In this embodiment, the forwarding unit is specifically configured to directly forward, to the SDN controller, the updated first control message to which the path information of the second SDN switch is added, where the finally updated first control message is the updated first control message; or, indirectly forward, to the SDN controller by using one or more other SDN switches, the updated first control message to which the path information of the second SDN switch is added, where the finally updated first control message is a first control message that is finally sent by each of the other SDN switches to the SDN controller after each of the other SDN switches receives a first control message sent by a previous SDN switch and adds path information of each of the other SDN switches to the first control message.

In this embodiment, the SDN network is implemented based on the OpenFlow protocol, and the SDN switch further includes:

a second receiving unit, configured to receive an OFPT_FLOW_MOD message sent from the SDN controller and defined in the OpenFlow protocol, where the OFPT_FLOW_MOD message carries multiple exact flow entries required by a destination SDN switch; and a first flow entry processing unit, configured to: when it is determined that the message received by the second receiving unit is an OFPT_FLOW_MOD message sent to the second SDN switch, extract the multiple exact flow entries carried in the OFPT_FLOW_MOD message and then add the multiple exact flow entries to a local exact flow table.

Alternatively, when the SDN network is implemented based on the OpenFlow protocol, this embodiment may further include:

a third receiving unit, configured to receive an OFPT_FLOW_MOD message sent from the SDN controller and defined in the OpenFlow protocol, where the OFPT_FLOW_MOD message carries multiple exact flow entries required by multiple SDN switches located on the routing path and path information corresponding to each SDN switch on the routing path, where each SDN switch on the routing path uses one or more exact flow entries; and a second flow entry processing unit, configured to: when it is determined that the message received by the third receiving unit is an OFPT_FLOW_MOD message sent to the second SDN switch, extract, according to the path information corresponding to the second SDN switch, one or more exact flow entries that need to be used by the second SDN switch, and forward the OFPT_FLOW_MOD message after the extraction is completed to a next node on the routing path.

In this embodiment, the path information includes: an ID of an SDN switch that sends or receives the first control message, a port number used for receiving the first control message, and a port number used for sending the first control message.

By using this embodiment, costs can be reduced, forwarding efficiency of an SDN switch can be improved, and a broadcast storm can be reduced; and for a specific reason, refer to an analysis in the foregoing embodiments, details are not described herein again.

Embodiment 8

Figure 28:
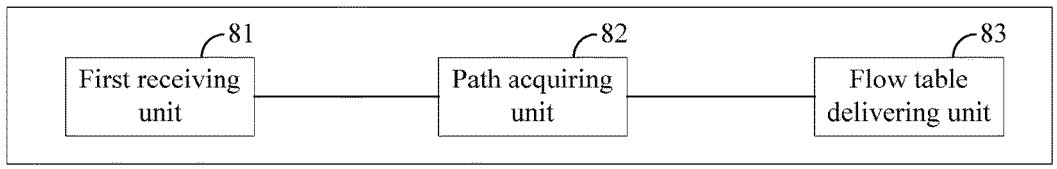
FIG. 28 is a schematic structural diagram of an SDN controller according to Embodiment 8 of the present invention.

Based on the foregoing embodiments, this embodiment discloses an SDN controller, where the SDN controller is connected to a second SDN switch, the second SDN switch is connected to a first SDN switch, to form an SDN network, the SDN controller communicates with each SDN switch in an inband communication manner, and referring to FIG. 28, the SDN controller includes:

a first receiving unit 81, configured to receive a finally updated first control message forwarded by the second SDN switch, where the finally updated first control message includes an updated first control message, the updated first control message is obtained by adding, by the second SDN switch after the second SDN switch receives a first control message sent by the first SDN switch and used for collecting path information, path information of the second SDN switch to the first control message, the first control message carries path information of the first SDN switch, and the first control information is carried in a packet corresponding to a protocol used by a reliable connection established between the first SDN switch and the SDN controller;

a path acquiring unit 82, configured to acquire a routing path between the SDN controller and the first SDN switch according to path information added by each SDN switch and carried in the finally updated first control message received by the first receiving unit; and a flow table delivering unit 83, configured to deliver an exact flow entry to the first SDN switch through the routing path acquired by the path acquiring unit.

In this embodiment, the reliable connection established between the first SDN switch and the SDN controller includes a TCP connection, the packet corresponding to the protocol used by the reliable connection is a TCP/IP packet, and the TCP connection is established by forwarding, by the second SDN switch, a TCP/IP packet carrying a message of three-way TCP handshake performed between the first SDN switch and the SDN controller.

In this embodiment, the SDN network may be implemented based on the OpenFlow protocol; in this scenario, the first control message includes an OFPT_HELLO message, and a body field of the OFPT_HELLO message is used for carrying the path information after being extended.

In this embodiment, the first receiving unit is specifically configured to:

directly receive the finally updated first control message forwarded by the second SDN switch, where the finally updated first control message is the updated first control message;

or, indirectly receive, by using one or more other SDN switches, the finally updated first control message forwarded by the second SDN switch, where the finally updated first control message is a first control message that is finally sent by each of the other SDN switches to the SDN controller after each of the other SDN switches receives a first control message sent by a previous SDN switch and adds path information of each of the other SDN switches to the first control message.

In this embodiment, the SDN network may be implemented based on the OpenFlow protocol, and correspondingly, the flow table delivering unit is specifically configured to:

add an exact flow entry required by the first SDN switch to an OFPT_FLOW_MOD message defined in the OpenFlow protocol; and send the OFPT_FLOW_MOD message to the first SDN switch through the routing path, so that the first SDN switch acquires an exact flow entry according to the OFPT_FLOW_MOD message.

Alternatively, the flow table delivering unit is specifically configured to:

add multiple exact flow entries required by multiple OFSes located on the routing path and path information corresponding to each SDN switch on the routing path to an OFPT_FLOW_MOD message defined in the OpenFlow protocol, where each SDN switch on the routing path needs one or more exact flow entries; and deliver the OFPT_FLOW_MOD message to the other SDN switch through the routing path, so that after receiving the OFPT_FLOW_MOD message, the other SDN switch extracts, according to the path information and the path information in the OFPT_FLOW_MOD message, an exact flow entry required by the other SDN switch, forwards a remaining exact flow entry, and finally forwards an exact flow entry required by the first SDN switch to the first SDN switch.

Embodiment 9

Figure 29:
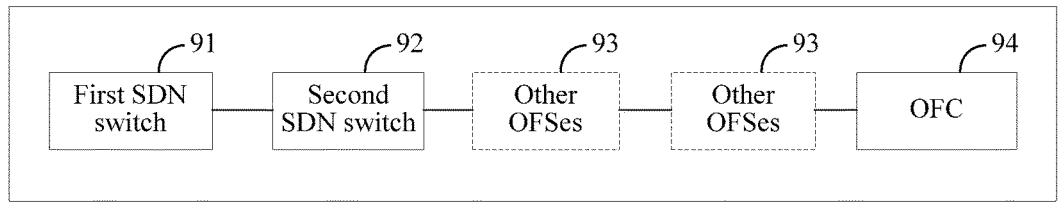
FIG. 29 is a schematic structural diagram of an SDN system according to Embodiment 9 of the present invention.

Referring to FIG. 29, this embodiment discloses a software defined network SDN system, including: a first SDN switch 91, a second SDN switch 92, and an SDN controller 94 (there may be one or more other intermediate SDN switches 93), where the second SDN switch is connected to the first SDN switch and the SDN controller, to form an SDN network, and the SDN controller communicates with each SDN switch in an inband communication manner;

the first SDN switch 91 is configured to send a first control message used for collecting path information to the second SDN switch 92, where the first control message carries path information of the first SDN switch 91, and the first control information is carried in a packet corresponding to a protocol used by a reliable connection established between the first SDN switch 91 and the SDN controller 94;

the second SDN switch 92 is configured to receive the first control message, add path information of the second SDN switch 92 to the first control message, to obtain an updated first control message, and forward, to the SDN controller 94, the updated first control message to which the path information of the second SDN switch 92 is added; and the SDN controller 94 is configured to receive a finally updated first control message sent by the second SDN switch 92 and including the updated first control message, determine a routing path between the SDN controller 94 and the first SDN switch 91 according to path information added by each SDN switch to the finally updated first control message, and deliver an exact flow entry to the first SDN switch 91 according to the routing path.

In this embodiment, the reliable connection established between the first SDN switch 91 and the SDN controller 94 includes a TCP connection, the packet corresponding to the protocol used by the reliable connection is a TCP/IP packet, and the TCP connection is established by forwarding, by the second SDN switch 92, a TCP/IP packet carrying a message of three-way TCP handshake performed between the first SDN switch 91 and the SDN controller 94.

In this embodiment, the second SDN switch stores an exact flow table, where the exact flow table includes multiple exact flow entries, and each exact flow entry includes multiple match fields and an instruction corresponding to the multiple match fields;

the second SDN switch is specifically configured to receive a first TCP/IP packet sent from the first SDN switch; acquire multiple pieces of feature information in the received first TCP/IP packet, where the feature information corresponds to match fields in an exact flow entry in the exact flow table in the second SDN switch; and perform exact matching between the multiple pieces of feature information and the exact flow table in the second SDN switch, if the exact matching fails and it is determined that the received first TCP/IP packet carries a first type of TCP handshake message, perform wildcard-match matching between one or more pieces of feature information in the multiple pieces of feature information and the exact flow table, where a forwarding route determined by using an instruction corresponding to one or more match fields used during the wildcard-match matching is a route that can finally reach the SDN controller, and if the wildcard-match matching succeeds, process, according to an instruction in an exact flow entry that succeeds in the wildcard-match matching, the received first TCP/IP packet that carries the first type of TCP handshake message, so as to forward the first TCP/IP packet to the SDN controller, where the first type of TCP handshake message is a message of first TCP handshake or a message of third TCP handshake, so as to implement an exchange, of a message used for establishing the reliable connection, between the first SDN switch, the other OFS, and the SDN controller, to establish the reliable connection.

The second SDN switch is further specifically configured to receive a second TCP/IP packet sent from the first SDN switch and carrying the first control message, where the second TCP/IP packet includes multiple pieces of feature information, where the feature information corresponds to match fields in an exact flow entry in the exact flow table in the second SDN switch; and perform exact matching according to the feature information in the second TCP/IP packet and the exact flow table, after the exact matching fails and it is determined that the received second TCP/IP packet carries the first control message, perform wildcard-match matching according to one or more pieces of feature information in the TCP/IP packet and the exact flow table, where a forwarding route determined by using an instruction corresponding to one or more match fields used during the wildcard-match matching is a route that can finally reach the SDN controller, and if the wildcard-match matching succeeds, add the path information of the second SDN switch to the first control message, to obtain the updated first control message to which the path information of the second SDN switch is added, and forward the updated first control message to the SDN controller according to an instruction in an exact flow entry that succeeds in the wildcard-match matching.

In this embodiment, the SDN network is implemented based on the OpenFlow protocol; in this case, the first control message includes an OFPT_HELLO message defined in the OpenFlow protocol, and a body field of the OFPT_HELLO message is used for carrying the path information after being extended.

In this embodiment, the second SDN switch may forward the first control message to the SDN controller in a direct or indirect manner, during direct forwarding, the finally updated first control message is the updated first control message, and during indirect forwarding, the finally updated first control message is a first control message that is finally sent by each of the other SDN switches to the SDN controller after each of the other SDN switches receives a first control message sent by a previous SDN switch and adds path information of each of the other SDN switches to the first control message.

In this embodiment, when the SDN network is implemented based on the OpenFlow protocol, an exact flow entry may be carried based on a message in the OpenFlow protocol by using several methods.

In an embodiment corresponding to a first method, the second SDN switch receives an OFPT_FLOW_MOD message sent from the SDN controller and defined in the OpenFlow protocol, where the OFPT_FLOW_MOD message carries multiple exact flow entries required by a destination SDN switch; and when it is determined that the received message is an OFPT_FLOW_MOD message sent to the second SDN switch, the second SDN switch extracts the multiple exact flow entries carried in the OFPT_FLOW_MOD message and then adds the multiple exact flow entries to a local exact flow table.

In an embodiment corresponding to a second method, the second SDN switch receives an OFPT_FLOW_MOD message sent from the SDN controller and defined in the OpenFlow protocol, where the OFPT_FLOW_MOD message carries multiple exact flow entries required by multiple SDN switches located on the routing path and path information corresponding to each SDN switch on the routing path, where each SDN switch on the routing path uses one or more exact flow entries; and when it is determined that the received message is an OFPT_FLOW_MOD message sent to the second SDN switch, the second SDN switch extracts, according to the path information corresponding to the second SDN switch, one or more exact flow entries that need to be used by the second SDN switch, and forwards the OFPT_FLOW_MOD message after the extraction is completed to a next node on the routing path.

In this embodiment, the path information includes: an ID of an SDN switch that sends or receives the first control message, a port number used for receiving the first control message, and a port number used for sending the first control message.

Embodiment 10

Figure 30:
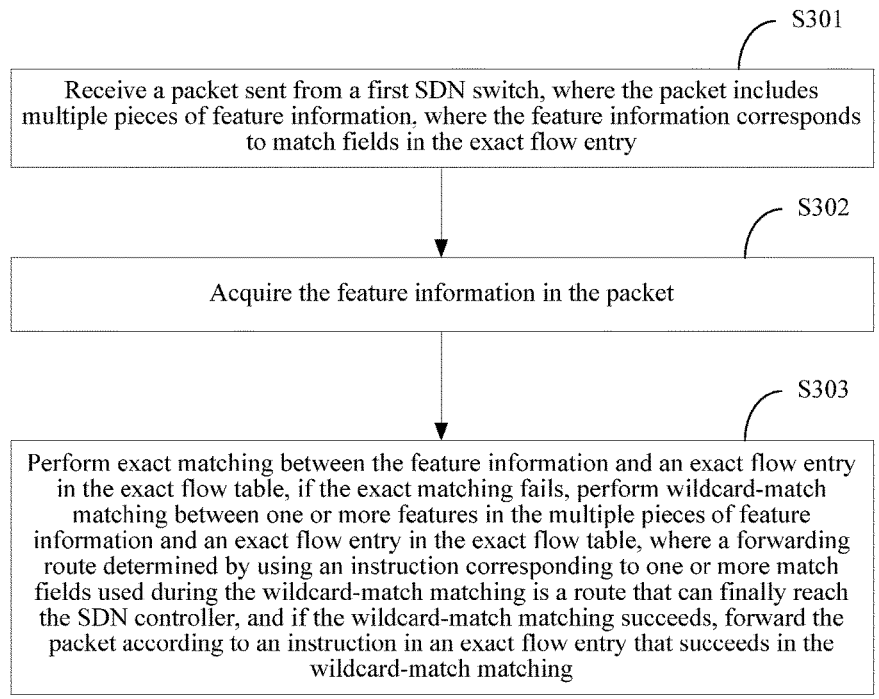
FIG. 30 is a schematic flowchart of a method for forwarding, by an SDN switch, a packet according to Embodiment 10 of the present invention.

Based on the foregoing embodiments, this embodiment discloses a method for forwarding, by an SDN switch, a packet, where the SDN switch is a second SDN switch, the second SDN switch stores an exact flow table, where the exact flow table includes at least one exact flow entry, and each exact flow entry includes multiple match fields and an instruction corresponding to the multiple match fields, and referring to FIG. 30, the method includes:

S301: Receive a packet sent from a first SDN switch, where the packet includes multiple pieces of feature information, where the feature information corresponds to match fields in the exact flow entry.

S302: Acquire the feature information in the packet.

S303: Perform exact matching between the feature information and an exact flow entry in the exact flow table, if the exact matching fails, perform wildcard-match matching between one or more features in the multiple pieces of feature information and an exact flow entry in the exact flow table, where a forwarding route determined by using an instruction corresponding to one or more match fields used during the wildcard-match matching is a route that can finally reach the SDN controller, and if the wildcard-match matching succeeds, forward the packet according to an instruction in an exact flow entry that succeeds in the wildcard-match matching.

In this embodiment, if the exact matching succeeds, forwarding is performed according to an instruction in an exact flow entry that succeeds in the matching, and if the wildcard-match matching fails, the received packet is forwarded through broadcasting.

In this embodiment, the second SDN switch is connected to the first SDN switch and the SDN controller, to form an SDN network, and the SDN controller communicates with each SDN switch in an inband communication manner.

In this embodiment, the packet is a packet corresponding to a protocol used by a reliable connection established between the first SDN switch and the SDN controller, and the packet is used for carrying a first control message sent by the first SDN switch and used for collecting path information.

By using this embodiment, forwarding efficiency of an SDN switch can be improved; in addition, a type of a packet forwarded based on a solution in this embodiment is not limited in this embodiment.

Embodiment 11

Figure 31:
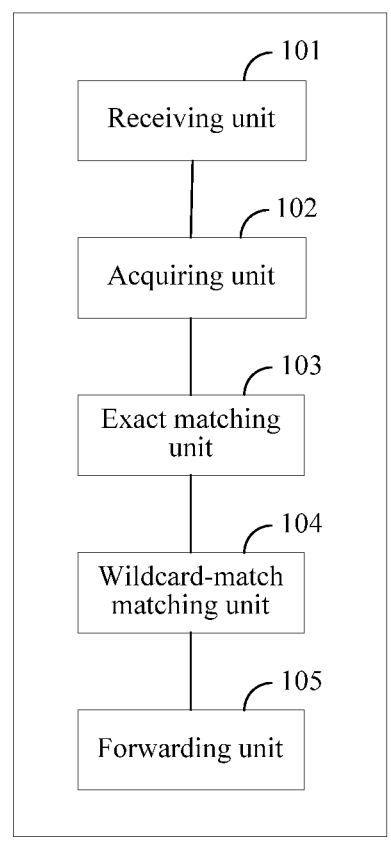
FIG. 31 is a schematic structural diagram of an SDN switch according to Embodiment 11 of the present invention.

Based on the foregoing embodiments, this embodiment provides an SDN switch corresponding to the method in Embodiment 10, where the SDN switch is a second SDN switch, the second SDN switch stores an exact flow table, where the exact flow table includes multiple exact flow entries, and each exact flow entry includes multiple match fields and an instruction corresponding to the multiple match fields, and referring to FIG. 31, the second SDN switch includes:

a receiving unit 101, configured to receive a packet sent from a first SDN switch, where the packet includes one or more pieces of feature information;

an acquiring unit 102, configured to acquire the feature information in the packet received by the receiving unit;

an exact matching unit 103, configured to perform exact matching between the one or more pieces of feature information acquired by the acquiring unit and an exact flow entry in the exact flow table, where the one or more pieces of feature information correspond to a match field in the exact flow entry in the exact flow table;

a wildcard-match matching unit 104, configured to: if the exact matching performed by the exact matching unit fails, perform wildcard-match matching between one or more features in the multiple pieces of feature information and an exact flow entry in the exact flow table, where a forwarding route determined by using an instruction corresponding to one or more match fields used during the wildcard-match matching is a route that can finally reach the SDN controller; and a forwarding unit 105, configured to: if the wildcard-match matching performed by the wildcard-match matching unit succeeds, forward the packet according to an instruction in an exact flow entry that succeeds in the matching.

In this embodiment, the matching and forwarding unit is further configured to:

if the exact matching succeeds, perform forwarding according to an instruction in an exact flow entry that succeeds in the matching; and if the wildcard-match matching fails, perform forwarding through broadcasting.

The second SDN switch is connected to (may be directly or indirectly connected to) the first SDN switch and the SDN controller, to form an SDN network, and the SDN controller communicates with each SDN switch in an inband communication manner.

The packet is a packet corresponding to a protocol used by a reliable connection established between the first SDN switch and the SDN controller, and the packet is used for carrying a first control message sent by the first SDN switch and used for collecting path information.

Embodiment 12

Figure 32:
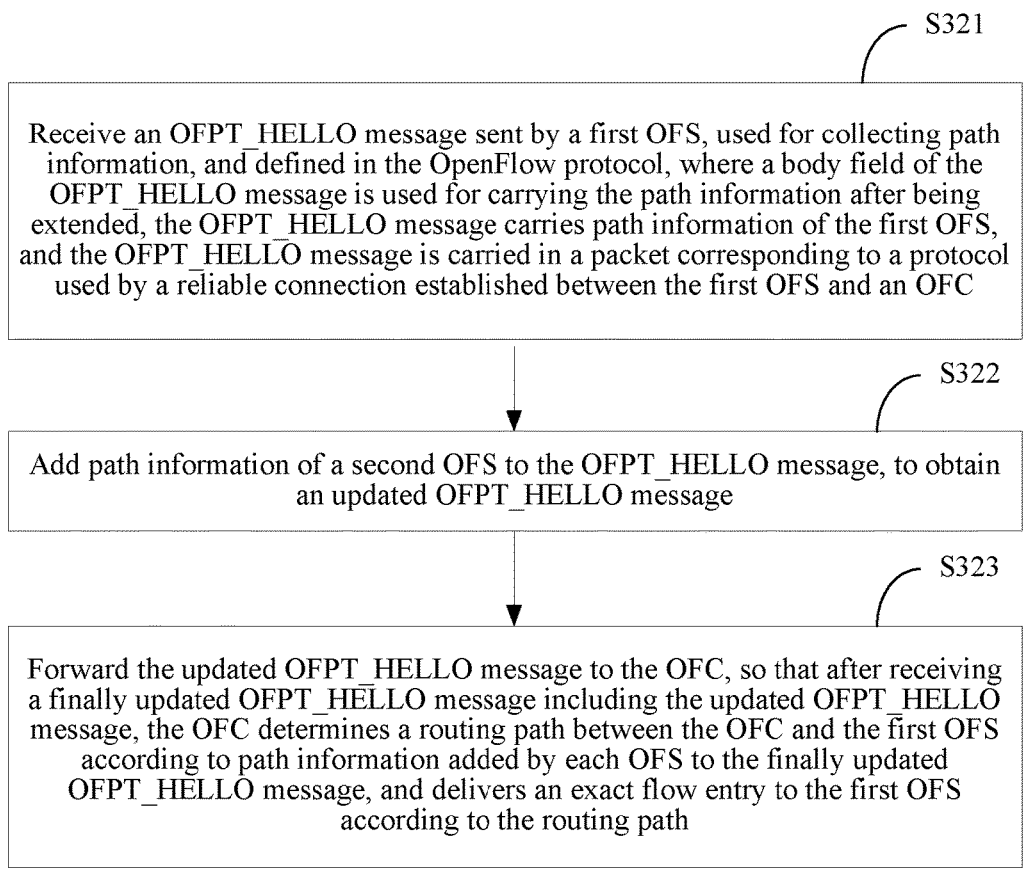
FIG. 32 is a schematic flowchart of a method for collecting, by an OFS, path information according to Embodiment 12 of the present invention.

Based on the foregoing embodiments, this embodiment provides a method for collecting, by an openflow switch OpenFlow Switch OFS, path information, applied to a second OFS, where the second OFS is connected to a first OFS and an openflow controller OpenFlow Controller OFC, to form an OpenFlow network, the OFC communicates with each OFS in an inband communication manner, and referring to FIG. 32, the method includes:

S321: Receive an OFPT_HELLO message sent by the first OFS, used for collecting path information, and defined in the OpenFlow protocol, where a body field of the OFPT_HELLO message is used for carrying the path information after being extended, the OFPT_HELLO message carries path information of the first OFS, and the OFPT_HELLO message is carried in a packet corresponding to a protocol used by a reliable connection established between the first OFS and the OFC.

S322: Add path information of the second OFS to the OFPT_HELLO message, to obtain an updated OFPT_HELLO message.

S323: Forward the updated OFPT_HELLO message to the OFC, so that after receiving a finally updated OFPT_HELLO message including the updated OFPT_HELLO message, the OFC determines a routing path between the OFC and the first OFS according to path information added by each OFS to the finally updated OFPT_HELLO message, and delivers an exact flow entry to the first OFS according to the routing path.

The path information includes: an ID of an OFS that sends or receives the OFPT_HELLO message, a port number used for receiving the OFPT_HELLO message, and a port number used for sending the OFPT_HELLO message.

In this embodiment, the forwarding the updated OFPT_HELLO message to the OFC includes:

directly forwarding the updated OFPT_HELLO message to the OFC, where the finally updated OFPT_HELLO message is the updated OFPT_HELLO message; or, indirectly forwarding the updated OFPT_HELLO message to the OFC by using one or more other OFSes, where the other OFS adds path information to the received updated OFPT_HELLO message, to obtain the finally updated OFPT_HELLO message.

By using this embodiment, path information may be carried based on a message in the existing OpenFlow protocol, and the protocol does not need to be changed, which saves development costs.

Embodiment 13

Figure 33:
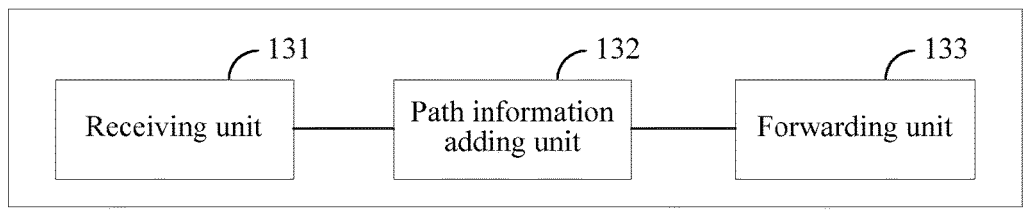
FIG. 33 is a schematic structural diagram of an OFS according to Embodiment 13 of the present invention.

Based on the foregoing embodiments, this embodiment discloses an OFS corresponding to the method in Embodiment 12, where the OFS is a second OFS, the second OFS is connected to a first OFS, an openflow controller OpenFlow Controller OFC; and at least one other OFS, to form an OpenFlow network, the OFC communicates with each OFS in an inband communication manner, and referring to FIG. 33, the second OFS includes:

a receiving unit 131, configured to receive an OFPT_HELLO message sent by the first OFS, used for collecting path information, and defined in the OpenFlow protocol, where a body field of the OFPT_HELLO message is used for carrying the path information after being extended, the OFPT_HELLO message carries path information of the first OFS, and the OFPT_HELLO message is carried in a packet corresponding to a protocol used by a reliable connection established between the first OFS and the OFC;

a path information adding unit 132, configured to add path information of the second OFS to the OFPT_HELLO message received by the receiving unit, to obtain an updated OFPT_HELLO message; and a forwarding unit 133, configured to forward, to the OFC, the updated OFPT_HELLO message to which the path information adding unit adds the path information of the second OFS, so that after receiving a finally updated OFPT_HELLO message including the updated OFPT_HELLO message, the OFC determines a routing path between the OFC and the first OFS according to path information added by each OFS to the finally updated OFPT_HELLO message, and delivers an exact flow entry to the first OFS according to the routing path.

The path information includes: an ID of an OFS that sends or receives the OFPT_HELLO message, a port number used for receiving the OFPT_HELLO message, and a port number used for sending the OFPT_HELLO message.

In this embodiment, the forwarding unit 133 is specifically configured to:

directly forward the updated OFPT_HELLO message to the OFC, where the finally updated OFPT_HELLO message is the updated OFPT_HELLO message; or, indirectly forward the updated OFPT_HELLO message to the OFC by using one or more other OFSes, where the other OFS adds path information to the received updated OFPT_HELLO message, to obtain the finally updated OFPT_HELLO message.

Specific steps of solutions involved in Embodiment 7 to Embodiment 13 may be obtained by a person skilled in the art with reference to specific descriptions of the foregoing embodiments (for example, Embodiment 1 to Embodiment 5), and are not described in detail in Embodiment 7 to Embodiment 13. In addition, it should be noted that, units (or subunits) involved in apparatuses in Embodiment 7 to Embodiment 13 are a logical function division, and specific implementation manners of these units are not limited. For example, these units may be implemented based on an architecture combining software and hardware in Embodiment 6 or implemented by using a software-only architecture. Because functions involved in the units correspond to steps in the methods in the foregoing method embodiments, a person skilled in the art may implement each unit according to a specific device in Embodiment 6, for example, uses the transceiver to implement some receiving units involved in the apparatus embodiments.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be: a magnetic disk, an optical disc, a read-only memory (Read-Only Memory, ROM), a random access memory (Random Access Memory, RAM), or the like.

In the foregoing exemplary embodiments, the objectives, technical solutions, and advantages of the present invention are further described in detail. It should be understood that the foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. A method for controlling a software defined network (SDN), the method comprising:
    providing an SDN controller connected to first and second switch devices, the SDN controller being configured to communicate with the first and second switch devices via inband communications;
    sending a first control message from the first switch device to the second switch device, the first control message including path information of the first switch device and being carried in a packet corresponding to a protocol used by a reliable connection established between the first switch device and the SDN controller;
    generating, by the second switch device, an updated first control message obtained by adding, to the first control message, path information of the second switch device, and sending the updated first control message to the SDN controller;
    determining, by the SDN controller, a routing path between the SDN controller and the first switch device in accordance with the path information of the updated first control message; and
    sending, from the SDN controller to the first switch device, an exact flow entry according to the routing path.

2. The method according to claim 1, wherein the reliable connection established between the first switch device and the SDN controller comprises a TCP connection utilizing a TCP/IP packet carrying information about a three-way TCP handshake between the first switch device and the SDN controller.

3. The method according to claim 1, wherein the SDN network is implemented based on an OpenFlow protocol, the first control message comprising an OFPT_HELLO message as defined in the OpenFlow protocol, a body field of the OFPT_HELLO message carrying the path information.

4. The method according to claim 1, further comprising receiving a final updated first control message forwarded by the second switch device.

5. The method according to claim 4, wherein receiving a final updated first control message comprises:
    when the SDN network includes a single second switch device, directly receiving the final updated first control message from the second switch device;
    and when the SDN network includes a plurality of second switch devices, receiving the final first control message through multiple, interconnected second switch devices, wherein the final updated first control message includes path information of the interconnected second switch devices in the routing path.

6. The method according to claim 1, wherein the SDN network is implemented based on an OpenFlow protocol, and sending the exact flow entry from the SDN controller to the first switch device according to the routing path comprises:

adding multiple exact flow entries by the first switch device to an OFPT_FLOW_MOD message defined in the OpenFlow protocol; and sending the OFPT_FLOW_MOD message to the first switch device according to the routing path.

7. The method according to claim 6, wherein, the first switch device extracts the multiple exact flow entries carried in the OFPT_FLOW_MOD message and adds the multiple exact flow entries to a local exact flow table.

8. The method according to claim 1, wherein the SDN network is implemented based on an OpenFlow protocol, and sending the exact flow entry to the first switch device according to the routing path comprises:

adding to an OFPT_FLOW_MOD message defined in the OpenFlow protocol, multiple exact flow entries from corresponding multiple switch devices positioned along the routing path and path information corresponding to each switch device on the routing path; and delivering the OFPT_FLOW_MOD message to the switch devices according to the routing path, each switch device extracting from the OFPT_FLOW_MOD message an exact flow entry required by the next switch device in the routing path.

9. A controller device connectable to first and second switch devices in a software defined network (SDN), the second switch device connected to a first switch device in the SDN, the controller device being configured to communicate with each of the first and second switch devices in an inband communication manner and to:

receive an updated first control message forwarded by the second switch device, wherein the updated first control message is obtained by adding path information of the second switch device to the first control message, the first control message carrying path information of the first switch device and being carried in a packet corresponding to a protocol used by a reliable connection established between the first switch device and the controller device;

acquire a routing path between the controller device and the first switch device according to path information added by each switch device and carried in the updated first control message; and deliver an exact flow entry to the first switch device through the routing path.

10. The controller device according to claim 9, wherein the reliable connection established between the first switch device and the controller device comprises a TCP connection utilizing a TCP/IP packet carrying a message of a three-way TCP handshake performed between the first switch device and the controller device.

11. The controller device according to claim 9, wherein the SDN network is implemented based on an OpenFlow protocol, the first control message comprising an OFPT_HELLO message as defined in the OpenFlow protocol, a body field of the OFPT_HELLO message carrying the path information.

12. The controller device according to claim 9, wherein the controller device is configured to directly receive a final updated first control message forwarded by the second switch device.

13. The controller device according to claim 8, wherein the controller device is configured to receive a final updated first control message forwarded by a plurality of interconnected switch devices, the final updated first control message including path information that has been added by each switch device in the routing path between the controller device and the first of the switch devices.

14. The controller device according to claim 9, wherein the SDN network is implemented based on an OpenFlow protocol, and the controller device is configured to:

add an exact flow entry to an OFPT_FLOW_MOD message as defined in the OpenFlow protocol; and send the OFPT_FLOW_MOD message to the first switch device through the routing path.

15. The controller device according to claim 9, wherein the SDN network is implemented based on the OpenFlow protocol, and the controller device is configured to:

add, to an OFPT_FLOW_MOD message as defined in the OpenFlow protocol, multiple exact flow entries corresponding to respective ones of multiple OpenFlow switches located along the routing path and path information corresponding to each OpenFlow switch along the routing path; and deliver the OFPT_FLOW_MOD message to a respective OpenFlow switch along the routing path.

16. A method for collecting path information in an OpenFlow network comprising an OpenFlow controller (OFC) connected to first and second OpenFlow Switches (OFS), the OFC communicating with each OFS in an inband communication manner, the method comprising:

receiving an OFPT_HELLO message sent by the first OFS and carried in a packet corresponding to a protocol used by a reliable connection established between the first OFS and the OFC, a body field of the OFPT_HELLO message carrying path information;

generating an updated OFPT_HELLO message by adding path information of the second OFS to the OFPT_HELLO message;

forwarding the updated OFPT_HELLO message to the OFC, the OFC determining a routing path between the OFC and the first OFS according to path information added by each OFS to the updated OFPT_HELLO message; and sending an exact flow entry to the first OFS according to the routing path.

17. The method according to claim 16, wherein the path information comprises an ID of an OFS that sends or receives the OFPT_HELLO message, a port number used for receiving the OFPT_HELLO message, and a port number used for sending the OFPT_HELLO message.

18. The method according to claim 16, wherein forwarding the updated OFPT_HELLO message to the OFC comprises:

when there is a single second OFS and the updated OFPT_HELLO message represents a final updated OFPT_HELLO message, directly forwarding the updated OFPT_HELLO message to the OFC from the second OFS; and when there is a plurality of second OFSs in the OpenFlow network, indirectly forwarding the updated OFPT_HELLO message to the OFC through one or more other OFSs along the routing path, each of the OFSs in the routing path adding path information to the received updated OFPT_HELLO message to generate a final updated OFPT_HELLO message that is sent to the OFC.

19. A switch deployable in an OpenFlow network, the switch being connectable to an OpenFlow controller (OFC), the switch being configured to communicate with the OFC in an inband manner and to:

receive an OFPT_HELLO message sent by another switch, a body field of the OFPT_HELLO message carrying path information of the switch sending the OFPT_HELLO message;

add path information to the received OFPT_HELLO message, to produce an updated OFPT_HELLO message; and forward, to the OFC, the updated OFPT_HELLO message.

20. The switch according to claim 19, wherein the path information comprises:

an ID of an switch that sends or receives the OFPT_HELLO message, a port number used by the switch for receiving the OFPT_HELLO message, and a port number used for sending the OFPT_HELLO message.

21. The OFS according to claim 20, wherein the switch is configured to:

forward a final updated OFPT_HELLO message to the OFC received from another switch in the OpenFlow network.

* * * * *